United States Patent
Dayrit et al.

(10) Patent No.: US 9,561,889 B2
(45) Date of Patent: *Feb. 7, 2017

(54) EASY OPENING PACKAGING ARTICLE MADE FROM HEAT-SHRINKABLE FILM EXHIBITING DIRECTIONAL TEAR

(75) Inventors: Richard M. Dayrit, Simpsonville, SC (US); Robert A. Odabashian, Greer, SC (US); Janet W. Rivett, Simpsonville, SC (US); Thomas D. Kennedy, Simpsonville, SC (US); Diana Huerta, Moore, SC (US); Tom Bonner, Springdale, AR (US); Rodney R. Hodgson, Greenville, SC (US); Mendy W. Mossbrook, Woodruff, SC (US); H. Walker Stockley, Spartanburg, SC (US); Richard K. Watson, Simpsonville, SC (US)

(73) Assignee: Cryovac, Inc., Charlotte, NC (US)

( * ) Notice: Subject to any disclaimer, the term of this patent is extended or adjusted under 35 U.S.C. 154(b) by 1707 days.

This patent is subject to a terminal disclaimer.

(21) Appl. No.: 12/152,686

(22) Filed: May 16, 2008

(65) Prior Publication Data

US 2008/0292821 A1 Nov. 27, 2008

Related U.S. Application Data

(60) Provisional application No. 60/931,270, filed on May 21, 2007.

(51) Int. Cl.
*B65D 75/00* (2006.01)
*B65D 65/26* (2006.01)
(Continued)

(52) U.S. Cl.
CPC ............ *B65D 75/002* (2013.01); *B29C 65/02* (2013.01); *B29C 65/405* (2013.01);
(Continued)

(58) Field of Classification Search
CPC ....... B32B 1/02; B65D 75/58; B65D 75/5805; B65D 75/5833; B65D 75/5838; B65D 75/5844; B65D 75/68; B29C 65/02; B29C 65/405; B29C 66/112; B29C 66/1122
(Continued)

(56) References Cited

U.S. PATENT DOCUMENTS 2,139,040 A * 12/1938 Salfisberg .............. B65D 75/20
206/466
3,405,796 A 10/1968 Misik
(Continued)

FOREIGN PATENT DOCUMENTS

EP 0957044 A1 * 11/1999
JP 10 237 234 A 9/1998

OTHER PUBLICATIONS

Wittcoff, Harold A.; Reuben, Bryan G.; Plotkin, Jeffery S. (2004). Industrial Organic Chemicals (2nd Edition).. John Wiley & Sons. Online version available at: http://www.knovel.com/web/portal/browse/display?_EXT_KNOVEL_DISPLAY_bookid=4631&VerticalID=0.*

(Continued)

*Primary Examiner* — Walter B Aughenbaugh

(57) ABSTRACT

A packaging article has tear initiators for initiating a manual tear that can be propagated to open a package and allow a product to be readily removed therefrom, without the use of a knife or scissors or any other implement. The packaging article is made from a heat-shrinkable multilayer film having at least one layer containing an incompatible polymer blend, and/or a layer containing an inorganic filler, and/or a layer having a high Young's modulus. The film also has a Peak Load Impact Strength of at least 50 Newtons per mil, The tear initiators can be used to generate a manual machine direction tears to open the package, with the manual machine direction tear being capable of propagating in the
(Continued)

machine direction to the opposite edge of the packaging article. A process for making a package and manually opening the package is also disclosed.

27 Claims, 29 Drawing Sheets

(51) Int. Cl.
| | |
|---|---|
| B65D 75/58 | (2006.01) |
| B65D 75/68 | (2006.01) |
| B29C 65/00 | (2006.01) |
| B29C 65/40 | (2006.01) |
| B29C 65/02 | (2006.01) |
| B32B 27/20 | (2006.01) |
| B32B 27/32 | (2006.01) |
| B32B 27/34 | (2006.01) |

(52) U.S. Cl.
CPC .......... *B29C 66/112* (2013.01); *B32B 27/20* (2013.01); *B32B 27/32* (2013.01); *B32B 27/34* (2013.01); *B65D 75/58* (2013.01); *B65D 75/5805* (2013.01); *B65D 75/5833* (2013.01); *B65D 75/5838* (2013.01); *B65D 75/5844* (2013.01); *B65D 75/68* (2013.01); *Y10T 428/1328* (2015.01)

(58) Field of Classification Search
USPC ......... 428/35.7, 35.2, 35.4, 35.9, 36.6, 36.7; 383/6, 37, 201, 207, 908; 53/451, 467, 53/477, 479
See application file for complete search history.

(56) References Cited

U.S. PATENT DOCUMENTS

| | | | | |
|---|---|---|---|---|
| 3,815,810 | A * | 6/1974 | Wellman | 383/204 |
| 4,120,716 | A | 10/1978 | Bonet | |
| 4,194,039 | A * | 3/1980 | Mueller | B32B 27/32 156/229 |
| 4,598,826 | A | 7/1986 | Shinbach | |
| 5,749,657 | A * | 5/1998 | May | B31B 19/90 383/17 |
| 5,891,500 | A | 4/1999 | Brodie, III | |
| 5,921,390 | A | 7/1999 | Simhaee | |
| 5,984,088 | A | 11/1999 | Dietz et al. | |
| 6,342,258 | B1 | 1/2002 | Berings et al. | |
| 6,355,287 | B2 * | 3/2002 | Noel | B32B 27/08 426/127 |
| 7,048,125 | B2 * | 5/2006 | Mize | B31B 19/86 206/484 |
| 7,255,903 | B1 | 8/2007 | Mudar et al. | |
| 7,338,691 | B2 | 3/2008 | Pollok et al. | |
| 2002/0126919 | A1 | 9/2002 | Jackson et al. | |
| 2003/0021870 | A1 | 1/2003 | Pollok et al. | |
| 2004/0118735 | A1 * | 6/2004 | Mize et al. | 206/497 |
| 2004/0241481 | A1 | 12/2004 | Ichige et al. | |
| 2005/0053313 | A1 | 3/2005 | Lucas et al. | |
| 2005/0129969 | A1 * | 6/2005 | Schell et al. | 428/516 |
| 2005/0254731 | A1 | 11/2005 | Berbert et al. | |
| 2006/0144019 | A1 * | 7/2006 | Kettner et al. | 53/451 |
| 2006/0286321 | A1 | 12/2006 | Broadus et al. | |
| 2008/0292225 | A1 | 11/2008 | Dayrit et al. | |
| 2009/0116768 | A1 | 5/2009 | Huerta et al. | |

OTHER PUBLICATIONS

Kontopoulou, M., Huang, L. C. and Lee, J. A. (2003), Binary blends of EVA and metallocene-catalyzed ethylene-α-olefin copolymers and their film properties. Adv. Polym. Technol., 22: 209-217. doi: 10.1002/adv.10049. Online version available at: http://onlinelibrary.wiley.com/doi/10.1002/adv.10049/pdf.*
Office Action in U.S. Appl. No. 11/895,960 dated Nov. 9, 2011, 11 pages.
Office Action in U.S. Appl. No. 12/313,396 dated Nov. 30, 2011, 8 pages.
Office Action in U.S. Appl. No. 11/895,960 dated Oct. 2, 2012, 15 pages.
Office Action in U.S. Appl. No. 12/313,396 dated Nov. 8, 2012, 9 pages.
Office Action in U.S. Appl. No. 12/313,396 dated Jul. 3, 2014, 9 pages.
Office Action in U.S. Appl. No. 11/895,960 dated Jul. 9, 2014, 13 pages.

* cited by examiner

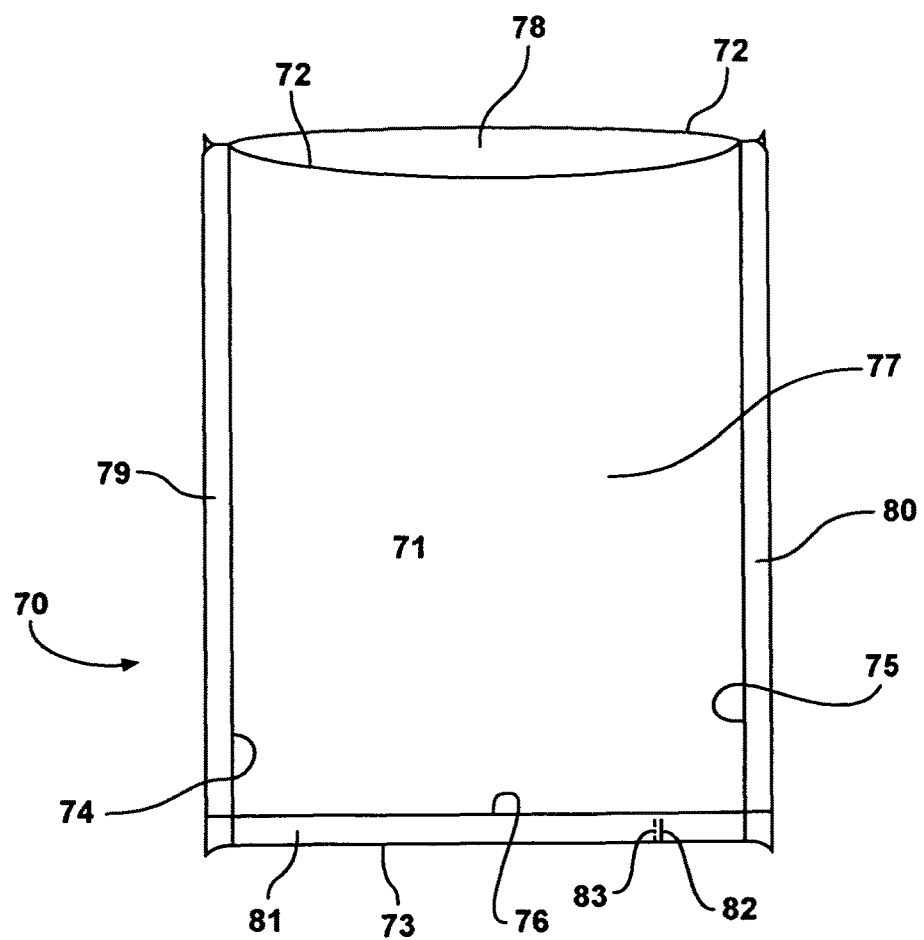

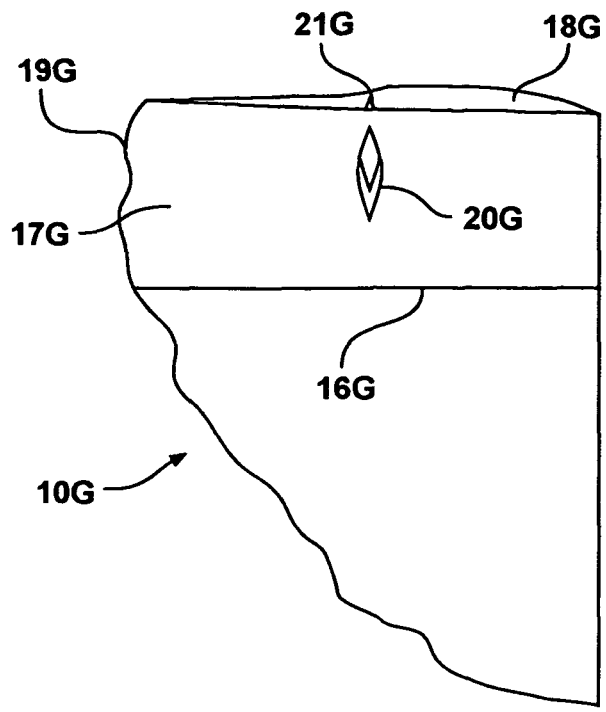
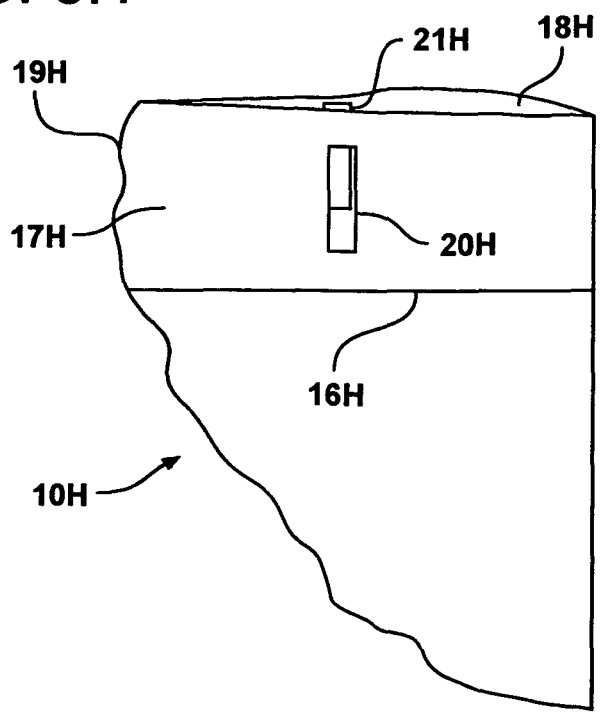

(Comparative)

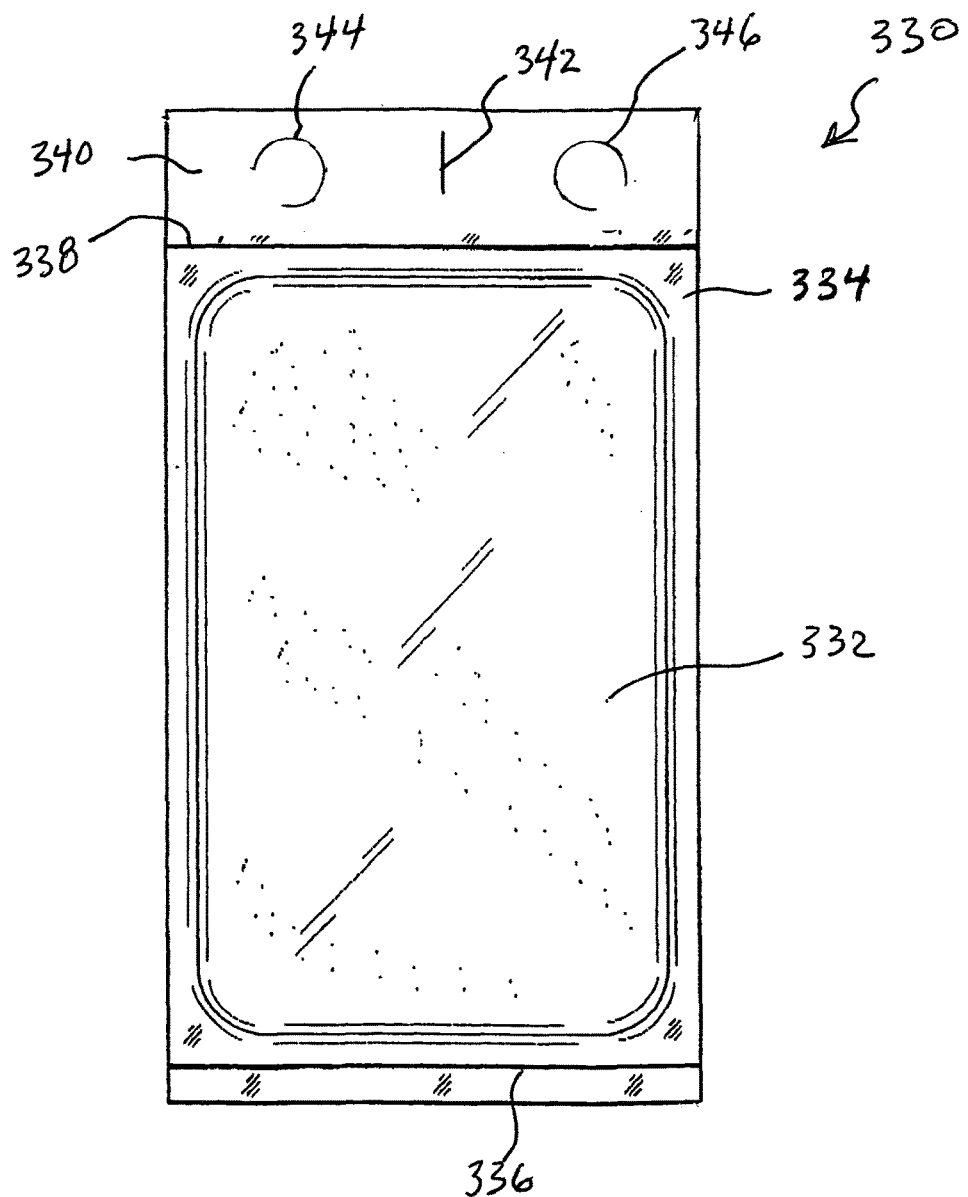

EASY OPENING PACKAGING ARTICLE MADE FROM HEAT-SHRINKABLE FILM EXHIBITING DIRECTIONAL TEAR

This application claims the benefit of provisional application U.S. Ser. No. 60/931,270 filed 21 May 2007, and non-provisional application U.S. Ser. No. 11/895,960, filed 28 Aug. 2007, each of which is incorporated, in its entirety, by reference thereto.

FIELD

The present invention pertains to heat-shrinkable packaging articles that are easy to open, particularly packaging articles for food packaging end use.

BACKGROUND

For several decades, heat-shrinkable packaging articles have been used for the packaging of a variety of products. Food, particularly meat, has been vacuum packaged in such packaging articles. Through the years, these heat-shrinkable packaging articles have developed higher impact strength and higher seal strength, while simultaneously becoming easier to seal, having improved oxygen and moisture barrier properties, and having higher total free shrink at lower temperatures. High seal strength, high impact strength, and high puncture-resistance are particularly important for the packaging of fresh meat products, as leaking packages are less desirable to consumers and retailers alike. Moreover, leaking packages reduce shelf life by allowing atmospheric oxygen and microbes to enter the package.

As a result, the packaging articles used for food packaging, particularly meat packaging, have evolved into being quite tough, and therefore difficult to open. Typically, knives and scissors are used for opening the packaging articles that have been evacuated, sealed around, and shrunken against the food product in the package. The use of knives and scissors to open these tough packaging articles increases the risk of injury for consumers and retailers. Moreover, the opening of such tough packaging requires more time and effort due to the toughness of the shrunken packaging article. For many years, the marketplace has desired a tough, heat-shrinkable, packaging article that can be opened quickly and easily, without the need for knives and scissors, so that the product can be easily removed from the packaging article.

SUMMARY

The heat-shrinkable packaging article of the invention has tear initiators for manually initiating a manual tear that opens the packaging article and allows the product to be readily removed from the torn packaging article, without the use of a knife or scissors or any other implement. A first aspect is directed to a heat-shrinkable packaging article comprising a heat-shrinkable multilayer film having an inside seal layer heat sealed to itself at a heat seal. The packaging article further comprises a first side, a second side, and a skirt or header outward of the heat seal. The skirt or header comprises an article edge and a first tear initiator. The first tear initiator is in the first side of the article. The article skirt or header further comprises a second tear initiator in the second side of the article. The article is capable of having a manually-initiated, manually-propagated first tear in the first side, and a manually-initiated and manually-propagated second tear in the second side, with the first tear and the second tear each being capable of being propagated in a machine direction from the respective first and second tear initiators, with each tear being propagated in the machine direction through the heat seal and down the length of the article, or across the article, with each tear being capable of being manually propagated through to an opposite article edge, so that upon using the multilayer film to make a packaged product by providing a product inside the article with the article being sealed closed around the product so that a package is formed, and thereafter shrinking the film around the product, the resulting package can be manually opened, and the product readily removed from the article, by manually initiating machine-direction tears from the first and second tear initiators, with the tears being manually propagated through the seal and toward the opposite edge of the article. The multilayer film exhibits a Peak Load Impact Strength of at least 50 Newtons per mil measured using ASTM D 3763-95A. The multilayer film has at least one layer containing at least one incompatible polymer blend selected from the group consisting of:

(A) a blend of from 90 to 30 weight percent ethylene homopolymer and/or ethylene/alpha-olefin copolymer with from 10 to 70 weight percent ethylene/unsaturated ester copolymer having an unsaturated ester content of at least 10 weight percent;

(B) a blend of ionomer resin with ethylene/unsaturated ester copolymer, and/or polybutylene, and/or propylene homopolymer and/or propylene copolymer (C) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, anhydride-modified ethylene/alpha-olefin copolymer, and antiblocking agent;

(D) a blend of ethylene/unsaturated ester copolymer with polypropylene and/or propylene/ethylene copolymer, and/or polybutylene, and/or modified ethylene/alpha-olefin copolymer, and/or styrene homopolymer, and/or styrene/butadiene copolymer;

(E) a blend of ethylene/norbornene copolymer with ethylene/unsaturated ester copolymer and/or polypropylene and/or polybutylene;

(F) a blend of ethylene/alpha-olefin copolymer with polypropylene and/or polybutylene and/or ethylene/norbornene;

(G) a blend of homogeneous propylene homopolymer and/or homogeneous propylene copolymer with homogeneous ethylene/alpha-olefin copolymer and/or ethylene/unsaturated ester copolymer;

(H) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer;

(I) a blend of polyamide with polystyrene and/or ethylene/alpha-olefin copolymer and/or ethylene/vinyl acetate copolymer and/or styrene/butadiene copolymer; and (J) a blend of polyamide 6 and polyamide 6I6T.

In one embodiment, the packaging article can be torn in the machine direction after the product is placed into the article and the atmosphere evacuated from the packaging article before the article is sealed closed around the product and the film thereafter shrunk around the product.

A second aspect is directed to a heat-shrinkable packaging article as in the first aspect, except that instead of the multilayer, heat-shrinkable film having at least one layer containing an incompatible polymer blend, at least one layer of the multilayer film contains: (A) at least one member selected from the group consisting of ethylene/alpha-olefin copolymer, polypropylene, propylene/ethylene copolymer, polybutylene, polystyrene/butadiene copolymer, ionomer resin, ethylene/vinyl acetate copolymer, ethylene/butyl acrylate copolymer, ethylene/methyl acrylate copolymer, ethylene/acrylic acid copolymer, polyester, and polyamide, and (B) an inorganic filler selected from the group consisting of silicates, silica, siloxane, silicone resin, zinc sulfide, wollastonite, microspheres, glass fiber, metal oxide, calcium carbonate, sulfate, aluminum trihydrate, feldspar, perlite, gypsum, iron, fluoropolymer, crosslinked polymethylmethacrylate, talc, diatomaceous earth, zeolites, mica, kaolin, carbon black, and graphite. The inorganic filler is present in the at least one layer in an amount of at least 5 weight percent, based on layer weight.

A third aspect is directed to a heat-shrinkable packaging article as in the first aspect, except that instead of at least one of the film layers comprising an incompatible polymer blend, at least one of one layer of the multilayer film comprises a polymer having a Young's modulus of at least 80,000 psi, the polymer comprising at least one polymer selected from the group consisting of high density polyethylene, ultra high molecular weight polyethylene, polypropylene, styrene copolymer, ethylene/norbornene copolymer, polycarbonate, and polyester.

A fourth aspect is directed to a plurality of heat-shrinkable bags in a continuous strand. Each of the bags is connected to an adjacent bag along a weakened tear line. Each bag is a packaging article in accordance with the first, second, and/or third aspects set forth above.

A fifth aspect is directed to a process for making an easy-open packaged product. The process comprises (A) inserting a product into a lay-flat packaging article having at least one layer comprising an incompatible polymer blend in accordance with the first aspect or an inorganic filler in accordance with the second aspect or a high modulus polymer in accordance with the third aspect; (B) sealing the packaging article closed with at least one heat seal, thereby forming a packaged product in which the packaging article surrounds or substantially surrounds the product, with the packaging article having at least one header portion between the at least one heat seal and at least one edge of the package; (C) making a first tear initiator at a first location of the packaging article that is, or later becomes, the header portion of a first side of the packaging article, and a second tear initiator at a second location of the packaging article that is, or later becomes, the header portion of a second side of the packaging article, wherein the first side of the packaging article corresponds with the first lay-flat side of the packaging article, and the second side of the packaging article corresponds with the second lay-flat side of the packaging article; and (D) heating the heat-shrinkable film to shrink the package around the product. The heat-shrinkable multilayer film exhibits a Peak Load Impact Strength, determined using ASTM D 3763-95A, of at least 50 Newtons per mil. While this process can be carried out using a packaging article that is a bag or pouch, it can also be carried out using a seamless or backseamed lay-flat tubing, wherein after the product is inserted into the tubing, a first heat seal is made across the tubing on a first end of the product and a second heat seal is made across the tubing on a second end of the product.

A sixth aspect is directed to a process for making a package and manually opening the package, comprising: (A) placing a product inside a heat-shrinkable packaging article in accordance with the first, second, or third aspects above; (B) sealing the bag closed so that a package is formed; (C) shrinking the film around the product; and (D) manually initiating and manually propagating a first tear in the first side of the package, and a second tear in the second side of the package, the first tear and the second tear each being manually propagated from the respective first and second tear initiators, with each tear being manually propagated through the heat seal and across the package, or down the length of the bag, with the first and second tears being manually propagated towards an opposite edge of the packaging article, so that the product can be readily removed from the package.

In one embodiment, the atmosphere is evacuated from the packaging article before the packaging article is sealed closed with the product therein. The packaging article used in the process is a packaging article in accordance with the first aspect and/or the second aspect and/or the third aspect set forth above.

BRIEF DESCRIPTION OF THE DRAWINGS

FIG. 1D is an enlarged, detailed view of a second less desirable embodiment of a bag otherwise corresponding with the bag of FIG. 1B.

FIG. 5 is a schematic of a second heat-shrinkable, side-seal bag in lay-flat configuration.

FIG. 6G is an enlarged detailed view of an alternative tear initiation feature to be used on another alternative heat-shrinkable, end-seal bag.

FIG. 6H is an enlarged detailed view of an alternative tear initiation feature to be used on another alternative heat-shrinkable, end-seal bag.

FIGS. 6M, 6N, 6O, 6P, 6Q, 6R, 6S, 6T, 6U, 6V, 6W, 6X, 6Y, 6Z, 6AA, 6BB, 6CC, 6DD, 6EE, and 6FF are enlarged detailed views of various alternative tear initiation features, some of which include manual grip enhancer.

FIG. 18 illustrates a schematic of an easy open package in which the easy open feature is similar to the feature in FIG. 6J, but which is designed for automated package opening.

DETAILED DESCRIPTION

Figure 1A:
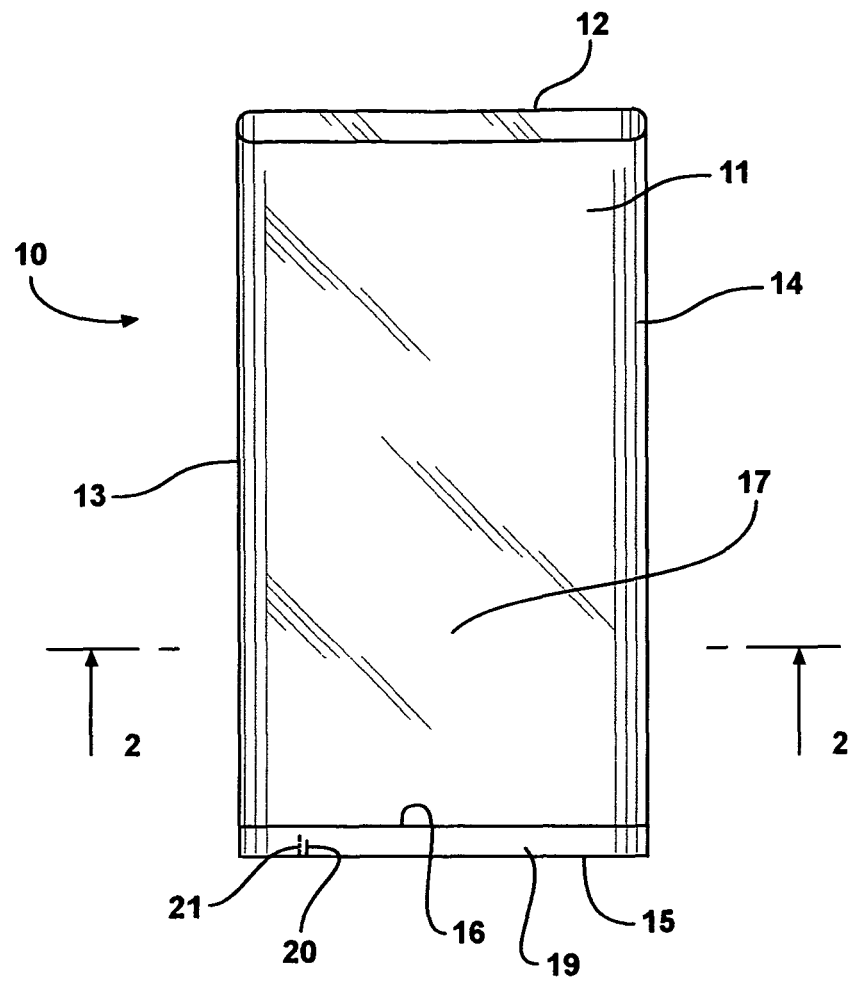
FIG. 1A is a schematic of a first heat-shrinkable, end-seal bag in lay-flat configuration.

As used herein, the term "film" is inclusive of plastic web, regardless of whether it is film or sheet. The film can have a total thickness of 0.25 mm or less, or a thickness of from 1.5 mils to 10 mils, or from 1.5 to 5 mils, or from 1.8 mils to 4 mils, or from 2 mils to 3 mils.

The multilayer, heat-shrinkable film from which the packaging article is made exhibits a Peak Load Impact Strength, determined using ASTM D 3763-95A, of at least 50 Newtons per mil. ASTM D 3763-95A is hereby incorporated, in its entirety, by reference thereto. The heat-shrinkable film can have a Peak Load Impact Strength, determined using ASTM 3763-95A, of from 50 to 250 Newtons per mil, or from 60 to 200 Newtons per mil, or from 70 to 170 Newtons per mil; or from 80 to 150 Newtons per mil; or from 85 to 140 Newtons per mil; or from 95 to 135 Newtons per mil. In one embodiment, the heat-shrinkable multilayer film exhibits a Peak Load Impact Strength, determined using ASTM D 3763-95A, of from 50 to 250 Newtons per mil, and the multilayer film has a total thickness, before shrinking, of from 1.5 mils to 5 mils.

The multilayer film has a seal layer and at least one additional layer. At least one layer of the multilayer film contains a blend of incompatible polymers.

As used herein, the phrase "machine direction" refers to the direction in which the film emerges from the die. Of course, this direction corresponds with the direction the extrudate is forwarded during the film production process. The phrase "machine direction" corresponds with "longitudinal direction". Machine direction and longitudinal direction are abbreviated as "MD" and "LD", respectfully. However, as used herein, the phrase "machine direction" includes not only the direction along a film that corresponds with the direction the film traveled as it passed over idler rollers in the film production process, it also includes directions that deviate up to 44 degrees from the direction the film traveled as it passed over idler rollers in the production process.

As used herein, the phrase "transverse direction" refers to a direction perpendicular to the machine direction. Transverse direction is abbreviated as "TD". The transverse direction also includes directions that deviate up to 44 degrees from the direction the film traveled as it passed over idler rollers in the production process.

As used herein, the phrase "packaging article" is inclusive end-seal bags, side-seal bags, L-seal bags, U-seal bags (also referred to as "pouches"), gusseted bags, backseamed tubings, and seamless casings, as well as packages made from such articles by placing a product in the article and sealing the article so that the product is substantially surrounded by the heat-shrinkable multilayer film from which the packaging article is made.

As used herein, packaging articles have two "sides". Generally, a "side" of a packaging article corresponds with half of the article. For example, an end-seal bag is a lay-flat bag and has two sides (in this case two lay-flat sides), with each side corresponding with a lay-flat side of the seamless tubing from which the end-seal bag is made. Each lay-flat side of a seamless tubing is bounded by the creases formed as the tubing is collapsed into its lay-flat configuration between nip rollers. Each side of an end-seal bag is bounded by the bag top edge, the bag bottom edge, and the two tubing creases running the length of the bag. Likewise, a side-seal bag also has two sides, with each side also being a lay-flat side, with each side of the side-seal bag being bounded by bag side edges, a bag top edge, and a bag bottom corresponding with a tubing crease. A casing, whether seamless or backseamed, also has two sides, with each side being bounded by the ends of the casing and by creases formed as the casing is configured into its lay-flat configuration. While gusseted bags and other packaging articles may not be fully lay-flat in their structure because they have more than two flat sides, they nevertheless have "sides" bounded by creases and edges.

As used herein, the term "package" refers to packaging materials configured around a product being packaged. As such, the term "package" includes all of the packaging around the product, but not the product itself.

As used herein, the phrase "packaged product" refers to the combination of a product and the package that surrounds or substantially surrounds the product. The packaged product can be made by placing the product into a packaging article made from the heat-shrinkable multilayer film, with the article then being sealed closed so that the multilayer film surrounds or substantially surrounds the product. The film can then be shrunk around the product.

As used herein, the term "bag" refers to a packaging article having an open top, side edges, and a bottom edge. The term "bag" encompasses lay-flat bags, pouches, casings (seamless casings and backseamed casings, including lap-sealed casings, fin-sealed casings, and butt-sealed back-seamed casings having backseaming tape thereon). Various casing configurations are disclosed in U.S. Pat. No. 6,764,729 B2, to Ramesh et al, entitled "Backseamed Casing and Packaged Product Incorporating Same, which is hereby incorporated in its entirety, by reference thereto. Various bag configurations, including L-seal bags, backseamed bags, and U-seal bags (also referred to as pouches), are disclosed in U.S. Pat. No. 6,970,468, to Mize et al, entitled "Patch Bag and Process of Making Same", which is hereby incorporated, in its entirety, by reference thereto. While the bag configurations illustrated in the '468 patent have a patch thereon, for purposes of the present invention, the patch is optional.

In one embodiment, the packaging article is a lay-flat, end-seal bag made from a seamless tubing, the end-seal bag having an open top, first and second folded side edges, and an end seal across a bottom of the bag, with the first and second tear initiators being in the bag skirt that is outward of the end seal, with the first tear being a machine-direction tear of the film, and the second tear being a machine-direction tear of the film, with each tear being capable of being manually propagated down the length of the end-seal bag to the opposite edge of the end-seal bag.

In one embodiment, the packaging article is a lay-flat, side-seal bag made from a seamless tubing, the side-seal bag having an open top, a folded bottom edge, and first and second side seals with respective first and second bag skirts outward of respective first and second side seals, with the first and second tear initiators being in the first bag skirt and outward of the first side seal, with the first tear being a machine-direction tear and the second tear being a machine-direction tear, with each tear being capable of being manually propagated across the full width of the side-seal bag to the opposite edge of the side-seal bag.

In one embodiment, the packaging article is a lay-flat, side-seal bag made from a seamless tubing, the side-seal bag having an open top, a folded bottom edge, a first side seal with a first bag skirt outward thereof, a second side seal with a second bag skirt outward thereof, and a third seal that extends from the first side seal to the second side seal, the third seal being at an opposite end of the bag from the open top, the third seal having a third bag skirt outward thereof, the folded bottom edge being in the third bag skirt, the third bag skirt comprising the first and second tear initiators, with the first tear being a transverse-direction tear and the second tear being a transverse-direction tear, with the first and second tears each being capable of being manually propagated down the length of the side-seal bag and to the opposite edge of the side-seal bag.

In one embodiment, the packaging article is a lay-flat pouch made by heat sealing two flat films to one another, the pouch having an open top, a first side seal with a first bag skirt outward thereof, a second side seal with a second bag skirt outward thereof, a bottom seal with a third bag skirt outward thereof, the bottom seal extending from the first side seal to the second side seal, the bottom seal being at an opposite end of the bag from the open top, with at least one of the bag skirts having first and second tear initiators for tearing each of the two flat films in the machine direction.

End-seal bags, side-seal bags, L-seal bags, T-seal bags (also referred to as backseamed bags), and U-seal bags all have an open top, closed sides, a closed bottom, and at least one heat seal. Each of these heat seals is referred to as a "factory seal" because these seals are made in a bag-making factory, rather than in a packaging factory where the bag is used to package a product. Each of the heat seals illustrated in FIGS. 1A-1F, 3, 4, 5, 6A-6FF, 7A-C, and 13-16 is a factory seal. Each of the factory seals is generally made a short distance inward of the edge of the article, so that a relatively small amount of film remains outward of the heat seal, i.e., on the other side of the seal from the film that envelopes the product. A gusseted bag can also be made with a bottom seal that has a skirt, and a casing (backseamed or seamless) can have a transverse heat seal with a skirt. As used herein, the term "skirt" refers to the film that is outward of any one or more of the factory seals.

Figure 9:
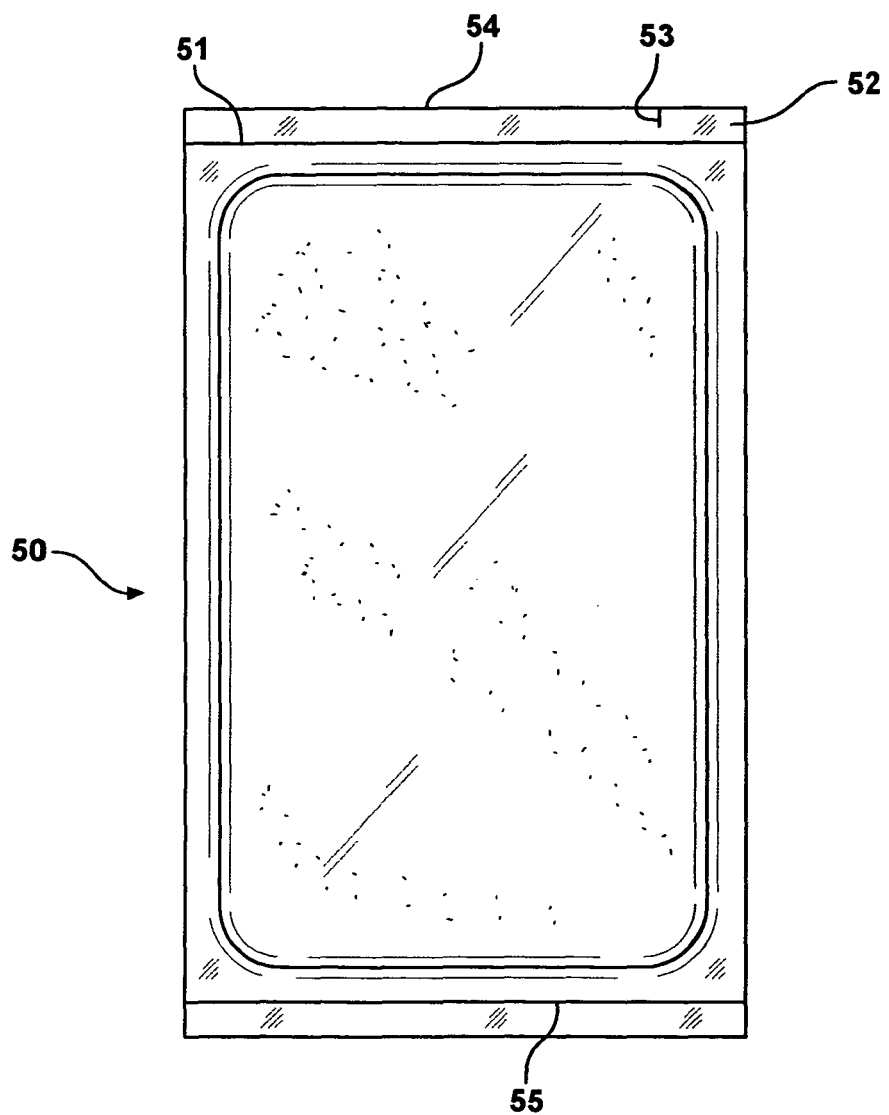
FIG. 9 is a schematic of a packaged product made up of a meat product vacuum packaged in a shrunken end-seal bag having the tear initiation feature in the bag skirt.

In contrast, only one of the heat seals on the packaged product of FIGS. 9-12 is a factory seal. The other seal is made after the product is placed in the packaging article, and is herein referred to as a "packers seal" or as an "applied seal" or as a "customer seal". While the film outward of a factory heat seal is referred to as a "skirt", the film outward of a customer seal is referred to as a "tail" or "header" of the packaging article. In the packaged product illustrated in FIGS. 9-12 and 18, one of the heat seals is a factory seal and the other heat seal is a customer seal. If tear initiator 53 in FIG. 9 is in the skirt, then heat seal 51 is the factory seal and heat seal 55 is the customer seal. While a tear initiator may be in a skirt, it may also be in a header region of the bag. If tear initiator 53 is in the header, then heat seal 51 is the customer seal and heat seal 55 is the factory seal. Usually, the header is larger (i.e., longer) than the skirt.

The term "bag" also includes that portion of a package that is derived from a bag. That is, once a product is placed inside a bag, the bag is sealed closed so that it surrounds the product. Excess bag length (i.e., the bag tail or bag header) can optionally be cut off along a line close to the seal made across the bag to enclose the product within the bag, and thereafter optionally the film can be shrunk around the product. The portion of the bag that remains and is configured around the product is herein also within the term "bag". The phrase "an opposite edge of the packaging article" refers to the edge of the bag that is directly across from the edge of the packaging article having the tear initiator. For example, a bag top edge is opposite the bag bottom edge; a first bag side edge is opposite the second bag side edge. As used herein, the phrase "a side of the bag" is used with reference to each of the first and second sides of a lay-flat bag, as well as each of the two principal, flat sides of a gusseted bag.

As used herein, the phrase "skirt" refers to that portion of the packaging article that is outward of a heat seal, e.g., the excess length or width on the non-product side of any factory heat seal on the packaging article. In an end-seal bag, the bag skirt is short in the machine direction and long in the transverse direction. In a side-seal bag, the bag skirt is long in the machine direction and short in the transverse direction. In either case, the "width" of the bag skirt is the shorter dimension of the skirt, and the "length" of the bag skirt is the longer dimension of the skirt. A bag skirt (or any skirt of any packaging article) can have a width, before the film is shrunk, of at least 5 millimeters, or at least 10 millimeters, or at least 15 millimeters, or at least 20 millimeters, or at least 25 millimeters, or at least 30 millimeters. Alternatively, the skirt can have a width of from 5 to 100 millimeters, or from 10 to 50 millimeters, or from 15 to 40 millimeters, or from 20 to 35 millimeters.

As used herein, the phrase "lay-flat bag" refers generically to non-gusseted bags used for the packaging of a variety of products, particularly food products. More specifically, the phrase "lay-flat bag" includes side seal bag, end-seal bag, L-seal bag, U-seal bag (also referred to as a pouch), and backseamed bag (also referred to as T-seal bag). The backseam can be a fin seal, a lap seal, or a butt-seal with a backseaming tape. Before the bag is shrunk, it can have a length-to-width ratio of from 1:1 to 20:1; or from 1.5:1 to 8:1; or from 1.8:1 to 6:1; or from 2:1 to 4:1.

The tear initiator can be a cut in the skirt or header of the packaging article. As used herein, the term "cut" refers to the penetration through the film, or shearing through the film, with a shearing means or edged instrument. Preferably the cut is made through both sides of the packaging article. The term "cut" is inclusive of both slits and notches. As used herein, the term "slit" refers to a cut through the film without the separation and removal of a piece of film from the packaging article. A slit can be from the edge of the packaging article (i.e., an "edge slit") or internal, i.e., not extending to an edge (i.e., "internal slit" also referred to as a "slit hole"). The slit can be straight or curved or wavy.

The term "hole", as used herein, includes both an internal puncture (i.e., internal hole) or internal cut (i.e., an internal slit) through the packaging article, as well as an internal cut that removes a piece of film from the article. The hole can utilize a straight cut or a curved cut. The hole can be round or square or rectangular or irregular in shape.

A "notch" is formed by a cut that removes a piece of film along an otherwise straight or smooth curved edge of an article skirt or Tail®, producing a point for stress concentration during the subsequent manual application of tearing force. A notch can be V-shaped or round or square or rectangular or oval or of any regular or irregular profile.

The slit or notch or hole in the skirt or tail can extend across at least 10 percent of the width of the skirt before the bag is shrunk; or at least 20 percent, or at least 30 percent or at least 40 percent, or at least 50 percent, or at least 60 percent, or at least 70 percent, or at least 80 percent, or at least 90 percent, of the width of the skirt or tail. The slit or notch or hole can angle inward, toward the center of the packaging article.

In end-seal and side-seal bags, as well as other packaging articles, a portion of the skirt is in a first lay-flat side of the article (e.g., bag), and a portion of the same skirt is in a second lay-flat side of the article (e.g., bag). The first lay-flat side of the skirt can have a first tear initiator, and the second lay-flat side of the skirt can have a second tear initiator.

The first tear initiator can overlap the second tear initiator when the end-seal or side-seal bag (or any other packaging article) is in its lay-flat configuration, as well as in the shrunken package. Overlapping enhances the ease of simultaneously initiating and propagating the tears in the first and second sides of the packaging article. Moreover, the first tear initiator can coincide (i.e., be positioned directly over and correspond with in length and shape) with the second tear initiator when the packaging article is in its lay-flat configuration.

The packaging article can be provided with both a first tear initiator that is overlapping or coincident with the second tear initiator, and a third tear that is overlapping or coincident with a fourth tear initiator. The first and second tear initiators can be positioned in a skirt or header portion of the article for making a manual tear in a machine direction, with the third and fourth tear initiators being positioned for making a manual tear in a transverse direction. The third and fourth tear initiators can be positioned in a skirt or a header.

As used herein, the verb "to tear" refers to pulling an object apart by force. The noun "tear" refers to the resulting break in the object being torn. The tearing of the film results from placing the film under enough tension that it is pulled apart by the force. The pulling force is concentrated by the tear initiator, which allows a smaller pulling force to pull the film apart, i.e., tear the film. High impact strength heat-shrinkable films are not susceptible to being manually torn without the presence of the tear initiator. In the heat-shrinkable packaging article, the high impact strength multilayer film undergoes tearing from the tear initiator toward the opposite edge of the packaging article.

Figure 6A:
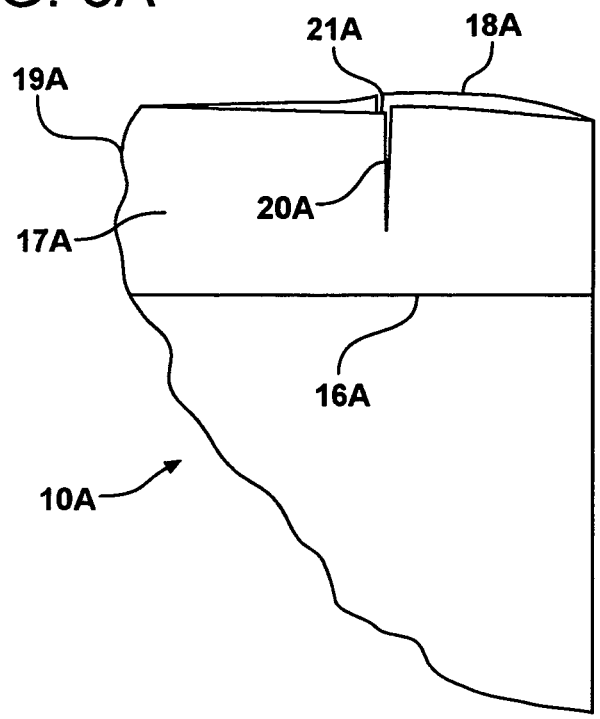
FIG. 6A is an enlarged detailed view of the tear initiation feature of the heat-shrinkable, end-seal bag of FIG. 1.

The phrase "tear initiator", as used herein, refers to any one or more of a variety of means that can be located in the skirt or header of a packaging article. The tear initiator allows manual tearing force to be concentrated on a point or small region of the film(s), so that tear initiation and tear propagation can be produced manually. A slit in the bag skirt, as illustrated in FIG. 6A, can serve as the tear initiator. Alternatively, the tear initiator can be a V-shaped notch in a bag skirt (see FIG. 6B) or a rounded notch in the bag skirt (see FIG. 6C), or a rectangular notch in the bag skirt (see FIG. 6D), or a slit hole in the bag skirt (see FIG. 6E) or a round hole in the bag skirt (see FIG. 6F), or a pointed oval hole in the bag skirt (see FIG. 6G), or a rectangular hole in the bag skirt (see FIG. 6H).

As used herein, the terms "overlapping" and "coincident" are used with respect to the relative positioning of paired tear initiators both when the article is in its lay-flat configuration and/or after a product is placed in the article and the article sealed closed around the product. The term "coincident" refers to two paired tear initiators that are directly on top of one another. The term "overlapping" refers to two paired tear initiators that are close enough to one another than an effort to manually tear one side of the packaging article at one of the tear notches results in tearing both sides of the article, i.e., from each of the paired tear initiators. The phrase "substantially coincident" is used interchangeably with the term "overlapping". Typically, tear initiators within one half inch of being coincident with one another are deemed to be "overlapping".

As used herein, the phrase "manual" and the term "manually" are both used with reference to tearing with the hands alone i.e., without the need for a knife, scissors, or any other implement to assist with initiating or propagating tearing of the film. The term "manual" is used with respect to tear initiation, i.e., the manual starting of the tearing action, as well as with respect to tear propagation, i.e., the manual continuation (i.e., extension) of a tear that has been manually initiated.

In addition to the tear initiator, the packaging article can be provided with "grip assister", also referred to herein as a "grip enhancer". The grip assister can enhance the ease with which the film can be torn. The grip assister can be in one lay-flat side of the packaging article or in both lay-flat sides of the packaging article. The grip assister can be a hole in the skirt (and/or in the header), an integral extension of the skirt or header, or a separate film tab fastened to the skirt or header. The separate film tab can be made from a thermoplastic polymer, paper, or other material, and can be heat-shrinkable or non-heat-shrinkable. The packaging article can be provided with the combination of a tear-initiator and a grip-assister. For example, the skirt can have a slit as the tear-initiator and a hole as the grip-assister. See FIG. 6I. The skirt can have a slit as the tear initiator and two holes providing serving as the grip assister. See FIG. 6J. Alternatively, the grip assister can be a tab, as illustrated in FIG. 6K, this figure further illustrating the tab being used in combination with a slit.

With respect to the tearing of the film from which the packaging article is made, as used herein the phrase "the tear is capable of being propagated . . . " refers to the manner in which the film tends to propagate the tear when the bag is subjected to an ordinary manual opening thereof, i.e., the packaging article can be "gripped and ripped" or "gripped and torn" in the ordinary course of opening. The packaging article exhibits substantially linear tear. Usually, the linear tear is substantially in line with the machine direction, or substantially in line with the transverse direction. The tearing is carried out after shrinking the heat-shrinkable film.

If the tear is being made in the machine direction of the film, the tear may be within from 0 to 44 degrees of the actual machine direction of the film, i.e., so long as the tear can be propagated toward and to the opposite side edge of the bag; or the tear may be within from 0 to 20 degrees, or within from 0 to 15 degrees, or within from 1 to 20 degrees, or within from 0 to 10 degrees; or within from 0 to 5 degrees, or within from 0 to 2 degrees of the machine direction of the film. The same holds true of transverse direction tearing, i.e., the tear may be within from 0 to 44 degrees of the actual transverse direction of the film; or the tear may be within 0 to 20 degrees, or within 1 to 20 degrees, or within from 0 to 10 degrees; or within from 0 to 5 degrees, or within from 0 to 2 degrees of the transverse direction of the film.

As used herein, the phrase "readily removed" is applied to the removal of a product from a packaging article surrounding or substantially surrounding the product. As used herein, the phrase "readily removed" refers to the manual removal of the product from within the confines of the packaging article without any further substantial amount of tearing, and without any substantial further permanent deformation of the film. As used herein, the phrase "substantial tearing of the film" refers to tearing greater than or equal to 2 millimeters in length. As used herein, the phrase "substantial permanent deformation of the film" refers to a permanent stretching of the film greater than or equal to 2 millimeters at any location on the film.

As used herein, the phrases "seal layer," "sealing layer," "heat seal layer," and "sealant layer," refer to an outer film layer, or layers, involved in heat sealing the film to itself, another film layer of the same or another film, and/or another article which is not a film. Heat sealing can be performed in any one or more of a wide variety of manners, such as melt-bead sealing, thermal sealing, impulse sealing, ultrasonic sealing, hot air sealing, hot wire sealing, infrared radiation sealing, ultraviolet radiation sealing, electron beam sealing, etc.). A heat seal is usually a relatively narrow seal (e.g., 0.02 inch to 1 inch wide) across a film. One particular heat sealing means is a heat seal made using an impulse sealer, which uses a combination of heat and pressure to form the seal, with the heating means providing a brief pulse of heat while pressure is being applied to the film by a seal bar or seal wire, followed by rapid cooling.

In some embodiments, the seal layer can comprise a polyolefin, particularly an ethylene/alpha-olefin copolymer and/or an ionomer resin. For example, the seal layer can contain a polyolefin having a density of from 0.88 g/cc to 0.917 g/cc, or from 0.90 g/cc to 0.917 g/cc. More particularly, the seal layer can comprise at least one member selected from the group consisting of very low density polyethylene and homogeneous ethylene/alpha-olefin copolymer. Very low density polyethylene is a species of heterogeneous ethylene/alpha-olefin copolymer. The heterogeneous ethylene/alpha-olefin (e.g., very low density polyethylene) can have a density of from 0.900 to 0.917 $g/cm^3$. The homogeneous ethylene/alpha-olefin copolymer in the seal layer can have a density of from 0.880 $g/cm^3$ to 0.910 $g/cm^3$, or from 0.880 $g/cm^3$ to 0.917 $g/cm^3$. Homogeneous ethylene/alpha-olefin copolymers useful in the seal layer include metallocene-catalyzed ethylene/alpha-olefin copolymers having a density of from 0.917 $g/cm^3$ or less, as well as a very low density polyethylene having a density of 0.912 $g/cm^3$, these polymers providing excellent optics. Plastomer-type metallocene sealants with densities less than 0.910 $g/cm^3$ also provided excellent optics.

As used herein, the term "barrier", and the phrase "barrier layer", as applied to films and/or film layers, are used with reference to the ability of a film or film layer to serve as a barrier to one or more gases. The multilayer heat-shrinkable film used to make the article can optionally comprise a barrier layer. In the packaging art, oxygen (i.e., gaseous $O_2$) barrier layers can comprise, for example, at least one member selected from the group consisting of hydrolyzed ethylene/vinyl acetate copolymer (designated by the abbreviations "EVOH" and "HEVA", and also referred to as "saponified ethylene/vinyl acetate copolymer" and "ethylene/vinyl alcohol copolymer"), polyvinylidene chloride, amorphous polyamide, polyamide MXD6 (particularly MXD6/MXDI copolymer), polyester, polyacrylonitrile, etc., as known to those of skill in the art. In addition to the first and second layers, the heat-shrinkable film may further comprise at least one barrier layer.

The heat-shrinkable film can exhibit $O_2$-transmission rate of from 1 to 20 $cc/m^2$ day atm at 23° C. and 100% relative humidity, or from 2 to 15 $cc/m^2$ day atm at 23° C. and 100% relative humidity, or from 3 to 12 $cc/m^2$ day atm at 23° C. and 100% relative humidity, or from 4 to 10 $cc/m^2$ day atm at 23° C. and 100% relative humidity. Alternatively, the heat-shrinkable film can exhibit an $O_2$-transmission rate of from 21 $cc/m^2$ day atm to 15,000 $cc/m^2$ day atm, or from 500 $cc/m^2$ day atm to 10,000 $cc/m^2$ day atm, or from 2000 $cc/m^2$ day atm to 6,000 $cc/m^2$ day atm.

As used herein, the phrase "tie layer" refers to any internal layer having the primary purpose of adhering two layers to one another. Tie layers can comprise any polymer having a polar group grafted thereon. Such polymers adhere to both nonpolar polymers such as polyolefin, as well as polar polymers such as polyamide and ethylene/vinyl alcohol copolymer. Tie layers can comprise at least one member selected from the group consisting of polyolefin (particularly homogeneous ethylene/alpha-olefin copolymer), anhydride-modified polyolefin, ethylene/vinyl acetate copolymer, and anhydride-modified ethylene/vinyl acetate copolymer, ethylene/acrylic acid copolymer, and ethylene/methyl acrylate copolymer. Typical tie layer polymers comprise at least one member selected from the group consisting of anhydride modified linear low density polyethylene, anhydride modified low density polyethylene, anhydride modified polypropylene, anhydride modified methyl acrylate copolymer, anhydride modified butyl acrylate copolymer, homogeneous ethylene/alpha-olefin copolymer, and anhydride modified ethylene/vinyl acetate copolymer.

As used herein, the phrases "inner layer" and "internal layer" refer to any layer, of a multilayer film, having both of its principal surfaces directly adhered to another layer of the film.

As used herein, the phrase "outer layer" refers to any film layer having less than two of its principal surfaces directly adhered to another layer of the film. A multilayer film has two outer layers, each of which has a principal surface adhered to only one other layer of the multilayer film.

As used herein, the term "adhered" is inclusive of films which are directly adhered to one another using a heat seal or other means, as well as films which are adhered to one another using an adhesive which is between the two films. This term is also inclusive of layers of a multilayer film, which layers are of course adhered to one another without an adhesive therebetween. The various layers of a multilayer film can be "directly adhered" to one another (i.e., no layers therebetween) or "indirectly adhered" to one another (i.e., one or more layers therebetween).

Once a multilayer film is heat sealed to itself or another member of the package being produced (i.e., is converted into a packaging article, e.g., a bag, pouch, or casing), one outer layer of the film is an inside layer of the packaging article and the other outer layer becomes the outside layer of the packaging article. The inside layer can be referred to as an "inside heat seal/product contact layer", because this is the film layer that is sealed to itself or another article, and it is the film layer closest to the product, relative to the other layers of the film. The other outer layer can be referred to as the "outside layer" and/or as the "outer abuse layer" or "outer skin layer", as it is the film layer furthest from the product, relative to the other layers of the multilayer film. Likewise, the "outside surface" of a packaging article (i.e., bag) is the surface away from the product being packaged within the article.

While the multilayer heat-shrinkable film can be sealed to itself to form a packaging article, optionally a heat-shrinkable patch film can be adhered to article (particularly to a bag). The patch film can be heat-shrinkable, and can have a total free shrink at 185° F. of at least 35 percent, measured in accordance with ASTM D-2732. The bag film and the patch film can have a total free shrink at 185° F. that are within 50 percent of one another, or within 20 percent of one another, or with 10 percent of one another, or within 5 percent of one another, or within 2 percent of one another. The patch may or may not cover the heat seal. If the patch covers a heat seal, optionally the heat seal may be made through the patch. If the tear is to be made though the bag and through the patch, the patch should cover a heat seal, and the tear initiator should be through both the bag film and the patch film. The bag can have a curved seal and the patch can extend into and through the region of the curved seal and over and past the curved seal. If the bottom edge of the bag is curved, a bottom edge of the patch can also be curved. The patch bag can have any desired configuration of patch on bag as disclosed in any one or more of U.S. Pat. Nos. 4,755,403, 5,540,646, 5,545,419, 6,296,886, 6,383,537, 6,663,905, and 6,790,468, each of which is hereby incorporated, in its entirety, by reference thereto.

End-seal bags with curved heat seals, and end-seal patch bags with curved heat seals, can be designed for have manual tear initiation and manual directional tear propagation. While the end-seal may be curved, the bottom edge of the bag may be straight across the tubing, or may also be curved. A curved bottom heat seal and a straight across bag bottom edge leaves more space in the bottom corners of the bag skirt for providing tear initiators, as well as for grip assisters. Patch bags with curved end seals are disclosed in U.S. Pat. No. 6,270,819, to Wiese, which is hereby incorporated, in its entirety, by reference thereto.

The term "polymer", as used herein, is inclusive of homopolymer, copolymer, terpolymer, etc. "Copolymer" includes copolymer, terpolymer, etc.

Blends of incompatible polymers in one or more film layers can enhance the tear initiation, tear propagation, and linear tear properties of the film, including the ability to manually tear down the full length or across the full width of a package made from a packaging article comprising a multilayer packaging film, i.e., tearing through a seal and through and to an opposite edge of the package. For a package made from an end-seal bag, a machine-direction tear can be manually initiated in the bag skirt, and the machine-direction tear can be manually propagated through the seal and down the length of the bag, for a distance up to the full length of the package, i.e., to that portion of the package that corresponds with the opposite edge of the package after the packaging article is used to make the package. For a package made from a side-seal bag, the machine direction tear can be manually initiated in a bag skirt, and the machine direction tear can be manually propagated through the skirt and through the associated heat seal, with the tear thereafter being propagated in the machine direction, across the full width of the package, i.e., to that portion of the package that corresponds with the opposite edge of the side-seal bag after the bag is used to make the package.

As used herein, the phrase "incompatible polymers" refers to two polymers (i.e., a blend of at least two polymers) that are incapable of forming a solution or even a stable two-phase blend, and that tend to separate after being mixed. When blended, incompatible polymers are not miscible with one another, and phase separate into a continuous domain and a discontinuous domain that may be finely dispersed. The presence of one or more film layers comprising a blend of incompatible polymers may assist, enhance, or even cause the linear tear property of the multilayer heat-shrinkable film used to make the heat-shrinkable bag.

The blend of incompatible polymers comprises at least one blend selected from the group of (A) through (I) set forth above under the first aspect of the invention. In the (A) blend above, the ethylene homopolymer and/or ethylene/alpha-olefin copolymer can be present in an amount of from 90-30, or 80-40, or 70-50 weight percent, based on total blend weight. The ethylene/unsaturated ester can be present in an amount of from 10-70, or 20-60, or 30-50 weight percent, based on total blend weight. The ethylene/unsaturated ester copolymer can have an unsaturated ester content of at least 10 weight percent, or from 10 to 85 weight percent, or 10 to 50 weight percent, or 10 to 30 weight percent, or 12 to 30 weight percent, based on weight of ethylene/unsaturated ester copolymer.

In the (D) blend above, the ethylene/unsaturated ester copolymer can be present in an amount of from 10 to 75 weight percent, 20 to 50 weight percent, or 25 to 40 weight percent, or 25 to 35 weight percent, based on total blend weight. The polypropylene and/or propylene/ethylene copolymer and/or polybutylene and/or modified ethylene/alpha-olefin copolymer, and/or styrene homopolymer, and/or styrene/butadiene copolymer can be present in the blend in an amount of from 90 to 15 weight percent, or from 80 to 50 weight percent, or from 75 to 60 weight percent, or from 75 to 65 weight percent, based on total blend weight.

In the (F) blend above, the ethylene/alpha-olefin copolymer can be present in the blend in an amount of from 90 to 15 weight percent, based on total blend weight, or from 80 to 50 weight percent, or from 75 to 60 weight percent, or from 25 to 65 weight percent, based on total blend weight, with polypropylene (particularly propylene/ethylene copolymer) and/or polybutylene and/or ethylene/norbornene in an amount of from 10 to 85 weight percent, or from 20 to 50 weight percent, or from 25 to 40 weight percent, or from 25 to 35 weight percent, based on total blend weight.

In the (G) blend above, the homogeneous propylene homopolymer and/or homogeneous propylene copolymer can be present in the blend in an amount of from 90 to 25 weight percent, or 85 to 50 weight percent, or 80 to 60 weight percent, or 75 to 65 weight percent, based on total blend weight, with homogeneous ethylene/alpha-olefin copolymer and/or ethylene/unsaturated ester copolymer in an amount of from 10 to 75 weight percent, or 15 to 50 weight percent, or 20 to 40 weight percent, or 25 to 35 weight percent, based on total blend weight.

In one embodiment, the film comprises an incompatible blend of ethylene/alpha-olefin copolymer and ethylene/vinyl acetate copolymer having a vinyl acetate content of from 10 to 50 weight percent based on copolymer weight, the blend containing the ethylene/alpha-olefin copolymer in an amount of from 80 to 35 weight percent based on blend weight and ethylene/vinyl acetate copolymer in an amount of from 20 to 65 weight percent based on blend weight, with the multilayer film containing the blend in an amount of from 20 to 95 weight percent, based on the weight of the multilayer film, wherein the multilayer film has been biaxially oriented in the solid state and has a total free shrink, as measured by ASTM D 2732, of from 15 percent to 120 percent at 185° F.

In another embodiment the film can comprises an incompatible blend of ethylene/alpha-olefin copolymer and ethylene/vinyl acetate copolymer having a vinyl acetate content of from 10 to 30 weight percent based on copolymer weight, the blend containing the ethylene/alpha-olefin copolymer in an amount of from 75 to 45 weight percent based on blend weight and ethylene/vinyl acetate copolymer in an amount of from 25 to 55 weight percent based on blend weight, with the multilayer film containing the blend in an amount of from 30 to 70 weight percent, based on the weight of the multilayer film, wherein the multilayer film has been biaxially oriented in the solid state and has a total free shrink, as measured by ASTM D 2732, of from 20 percent to 105 percent at 185° F.

In another embodiment, the film can comprise an incompatible blend of ethylene/alpha-olefin copolymer and ethylene/vinyl acetate copolymer having a vinyl acetate content of from 12 to 30 weight percent, the blend containing the ethylene/alpha-olefin copolymer in an amount of from 70 to 50 percent based on blend weight and ethylene/vinyl acetate copolymer in an amount of from 30 to 50 weight percent based on blend weight, the multilayer film containing the blend in an amount of from 30 to 70 weight percent, based on the weight of the multilayer film, and wherein the multilayer film has been biaxially oriented in the solid state and has a total free shrink, as measured by ASTM D 2732, of from 40 percent to 100 percent at 185° F. The shrinking is typically carried out by immersion in hot water, such as water at 185° F., for a period of from 2 to 60 seconds.

If any one or more of the incompatible blends comprises an ethylene/alpha-olefin copolymer, the ethylene/alpha-olefin copolymer can comprise at least one member selected from the group consisting of: (i) ethylene/hexene copolymer having a density of from about 0.90 g/cc to about 0.925 g/cc, and (ii) ethylene/octene copolymer having a density of from about 0.90 g/cc to about 0.925 g/cc.

Other blends of incompatible polymers that may be used include the following: (i) a blend of 50 weight percent cyclic olefin copolymer with 50 weight percent propylene homopolymer; (ii) a blend of 70 wt. percent polystyrene with 30 wt. percent ethylene/vinyl acetate copolymer having a vinyl acetate content of 9 percent or 15 percent; (iii) a blend of 70 wt. percent very low density polyethylene and 30 wt. percent cyclic olefin copolymer; (iv) a blend of 70 weight percent ethylene/propylene copolymer and 30 weight percent homogeneous ethylene/alpha-olefin copolymer; (v) a blend of 70 weight percent ethylene/propylene copolymer and 30 wt. percent ethylene/vinyl acetate copolymer having a vinyl acetate content of 9 percent or 15 percent; (vi) a blend of 70 weight percent ethylene/propylene copolymer and 30 weight percent ethylene/methyl acrylate copolymer; (vii) a blend of 70 weight percent polystyrene with 30 weight percent amorphous nylon; (viii) a blend of 70 weight percent ionomer resin with 30 weight percent ethylene/vinyl acetate copolymer having a vinyl acetate content of 4 percent; (ix) a blend of 70 weight percent polyamide with 30 weight percent low density polyethylene; (x) a blend of 65 weight percent amorphous polyamide with 35% styrene/butadiene/styrene block copolymer.

The tear initiation, tear propagation, and linear tear property of a multilayer heat-shrinkable film may also be enhanced by providing one or more layers of the film with a filler material, such as an inorganic filler. Polymeric systems that incorporate high filler concentrations may also enhance linear tear behavior. Depending on the particle size and dispersion, a filler concentration as low as 5 weight percent filler (i.e., based on total layer weight) in ethylene/alpha-olefin copolymer, polypropylene, propylene/ethylene copolymer, polybutylene, polystyrene/butadiene copolymer, ionomer resin, ethylene/vinyl acetate copolymer, ethylene/butyl acrylate copolymer, ethylene/methyl acrylate copolymer, ethylene/acrylic acid copolymer, polyester, polyamide, etc., may contribute to the linear tear behavior. More particularly, the presence of filler in an amount of from 5 to 95 weight percent, or in an amount of from 5 to 50 weight percent, or in an amount of from 10 to 40 weight percent, or from 20 to 35 weight percent, may be used.

Suitable fillers include silicates (particularly sodium silicate, potassium silicate, and aluminum silicate, alkali alumino silicate), silica (particularly amorphous silica), siloxane, silicone resin, zinc sulfide, wollastonite, microspheres, glass fiber, metal oxide (particularly oxides of titanium, zinc, antimony, magnesium, iron, and aluminum), calcium carbonate, sulfate (particularly barium sulfate and calcium sulfate), aluminum trihydrate, feldspar, perlite, gypsum, iron, fluoropolymer, crosslinked polymethylmethacrylate, talc, diatomaceous earth, zeolites, mica, kaolin, carbon black, and graphite.

The filler concentration required to achieve low tear initiation force is dependent on particle geometry, particle size, particle aspect ratio, and compatibility of the filler and the polymer matrix. Some fillers are chemically treated to improve the compatibility of the particle and the polymer into which it is dispersed.

The tear initiation, tear propagation, and linear tear property of a multilayer heat-shrinkable film may also be enhanced by providing one or more layers of the film with a polymer that provides the film with a relatively high Young's modulus, e.g., a polymer having a Young's modulus of at least 80,000 psi. Such polymers can comprise at least one member selected from the group consisting of high density polyethylene, ultra high molecular weight polyethylene, polypropylene (particularly propylene homopolymer), styrene copolymer (particularly styrene/butadiene block copolymer), ethylene/norbornene copolymer, polycarbonate, and polyester. The multilayer heat-shrinkable film may have a Young's Modulus of at least 80,000 psi. Young's modulus may be measured in accordance with one or more of the following ASTM procedures: D638, D882; D5026-95a; D4065-89, each of which is incorporated herein in its entirety by reference. The film may have a Young's modulus of at least about, and/or at most about, any of the following: 100,000; 130,000; 150,000; 200,000; 250,000; 300,000; 350,000; and 400,000 pounds/square inch, measured at a temperature of 73° F. The film may have any of the forgoing ranges of Young's modulus in at least one direction (e.g., in the machine direction or in the transverse direction) or in both directions (i.e., the machine (i.e., longitudinal) and the transverse directions).

As used herein, terms such as "polyamide", "polyolefin", "polyester", etc are inclusive of homopolymers of the genus, copolymers of the genus, terpolymers of the genus, etc, as well as graft polymers of the genus and substituted polymers of the genus (e.g., polymers of the genus having substituent groups thereon).

As used herein, the phrase "propylene/ethylene copolymer" refers to a copolymer of propylene and ethylene wherein the propylene mer content is greater than the ethylene mer content. Propylene/ethylene copolymer is not a species of "ethylene/alpha-olefin copolymer".

The phrase "ethylene/alpha-olefin copolymer" is particularly directed to heterogeneous copolymers such as linear low density polyethylene (LLDPE), very low and ultra low density polyethylene (VLDPE and ULDPE), as well as homogeneous polymers such as metallocene catalyzed polymers such as EXACT® resins obtainable from the Exxon Chemical Company, and TAFMER® resins obtainable from the Mitsui Petrochemical Corporation. All these latter copolymers include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefins commonly known as LLDPE have a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY® resins, are also included as another type of homogeneous ethylene/alpha-olefin copolymer useful in the film and process described herein.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous copolymers typically contain a relatively wide variety of chain lengths and comonomer percentages. Heterogeneous copolymers have a molecular weight distribution (Mw/Mn) of greater than 3.0.

As used herein, the phrase "homogeneous polymer" refers to polymerization reaction products of relatively narrow molecular weight distribution and relatively narrow composition distribution. Homogeneous polymers are useful in various layers of the multilayer heat-shrinkable film. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts. Homogeneous ethylene/alpha-olefin copolymer can have a Mw/Mn of ≤3.0.

As used herein, the term "polyamide" refers to a polymer having amide linkages, more specifically synthetic polyamides, either aliphatic or aromatic, either in semi-crystalline or amorphous form. It is intended to refer to both polyamides and co-polyamides. The polyamides can be selected from nylon compounds approved for use in producing articles intended for use in processing, handling, and packaging food, including homopolymers, copolymers and mixtures of the nylon materials described in 21 C.F.R. 177.1500 et seq., which is incorporated herein by reference. Exemplary of such polyamides include nylon homopolymers and copolymers such as those selected from the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly(caprolactam-co-laurallactam)), nylon 6,6/6 (poly(hexamethylene adipamide-co-caprolactam)), nylon 6/66 (poly(caprolactam-co-hexamethylene adipamide)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polyauryllactam), nylon MXD6, nylon MXDI, nylon 6I/6T, and copolymers or mixtures thereof. Unless otherwise indicated, the phrase "semi-crystalline polyamide" includes all polyamides that are not considered to be amorphous polyamides. All semi-crystalline polyamides have a determinable melting point.

The film is a heat-shrinkable film. The film can be produced by carrying out only monoaxial orientation, or by carrying out biaxial orientation. As used herein, the phrase "heat-shrinkable" is used with reference to films which exhibit a total free shrink (i.e., the sum of the free shrink in both the machine and transverse directions) of at least 10% at 185° F., as measured by ASTM D 2732, which is hereby incorporated, in its entirety, by reference thereto. All films exhibiting a total free shrink of less than 10% at 185° F. are herein designated as being non-heat-shrinkable. The heat-shrinkable film multilayer film can have a total free shrink at 185° F. of from 10 percent to 150 percent, or from 15 percent to 120 percent, or from 20 percent to 100 percent, or from 45 to 95 percent, or from 40 to 90 percent, or from 30 percent to 80 percent, or from 35 percent to 60 percent, as measured by ASTM D 2732.

Heat shrinkability can be achieved by carrying out orientation in the solid state (i.e., at a temperature below the glass transition temperature of the polymer). The total orientation factor employed (i.e., stretching in the transverse direction multiplied by drawing in the machine direction) can be any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

In one embodiment, the film does not comprise a crosslinked polymer network. In another embodiment, the film comprises a crosslinked polymer network. Optionally, the film can be irradiated to induce crosslinking of polymer, particularly polyolefin in the film. The film can be subjected to irradiation using an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking polymer present in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. A suitable radiation dosage of high energy electrons is in the range of up to about 16 to 166 kGy, more preferably about 30 to 90 kGy, and still more preferably, 30 to 50 kGy. Preferably, irradiation is carried out by an electron accelerator and the dosage level is determined by standard dosimetry processes. Other accelerators such as a van der Graaf or resonating transformer may be used. The radiation is not limited to electrons from an accelerator since any ionizing radiation may be used.

The heat-shrinkable, multilayer film in the packaging article can be fully coextruded, or prepared using an extrusion-coating process. Optionally, an annular extrudate (herein also referred to as a "tape") can be irradiated before the additional layers are extrusion coated onto the substrate tape. Irradiation produces a stronger polymer network by crosslinking the polymer chains. Extrusion-coating allows a portion of the final multilayer structure to be crosslinked by irradiation (and thereby strengthened), in combination with avoiding irradiation of, for example, a layer of polyvinylidene chloride applied to the substrate via extrusion coating. Irradiation of polyvinylidene chloride is undesirable because irradiation can cause degradation of polyvinylidene chloride. Extrusion coating and irradiation are disclosed in U.S. Pat. No. 4,278,738, to Brax et al, which is hereby incorporated, in its entirety, by reference thereto.

In the multilayer, heat-shrinkable film, all of the film layers can be arranged symmetrically with respect to the polymeric composition of each film layer. In addition, all of the film layers can be arranged symmetrically with respect to both composition and thickness. In one embodiment, the seal layer is thicker than the second outer layer. The seal layer can have a thickness of from 110% to 300% of the thickness of the second outer layer, or from 150% to 250% of the thickness of the second outer layer.

One heat-shrinkable multilayer film from which the packaging article can be made comprises seven layers in the order: 1/2/3/4/5/6/7. The first layer is an outer food-contact layer and seal layer, and comprises homogeneous ethylene/alpha-olefin copolymer. The second layer comprising ethylene/methyl acrylate copolymer. The third layer comprises a blend of polyamide 6 with polyamide 6I,6T. The fourth layer comprises EVOH. The fifth layer comprises a blend of polyamide 6 with polyamide 6I,6T. The sixth layer comprises ethylene/methyl acrylate copolymer. The seventh layer comprises a blend of low density polyethylene and linear low density polyethylene. See Example 16, below.

Another heat-shrinkable film from which the packaging article can be made has the structure: seal/tie/barrier/blend of polyamide 6 and/or polyamide 6/66 with polyamide 616T/tie/outer abuse layer. The seal layer can contain ethylene/alpha-olefin copolymer or other polymer suitable for use in a seal layer. The tie layers can contain an anhydride-modified ethylene/alpha-olefin copolymer or other suitable polymer for use in a tie layer. The barrier layer can contain EVOH or any other suitable polymer for use in a barrier layer. The outer abuse layer can contain polyester or any other suitable polymer for use in an outer abuse layer, e.g., polyolefin or polyamide, particularly high density polyethylene or linear low density polyethylene.

Another heat-shrinkable multilayer film from which the packaging article can be made comprises three layers in the order: 1/2/3. The first layer is an outer food-contact layer that also serves as a seal layer. The first layer comprises a blend of ethylene/vinyl acetate copolymer, linear low density polyethylene, and homogeneous ethylene/alpha-olefin copolymer. The second layer comprising polyvinylidene chloride. The third layer comprises a blend of ethylene/vinyl acetate copolymer, linear low density polyethylene, and homogeneous ethylene/alpha-olefin copolymer. See Example 12, below.

Another heat-shrinkable multilayer film from which the packaging article can be made comprises seven layers in the order: 1/2/3/4/5/6/7. The first layer that is an outer food-contact layer and that also serves as a seal layer. The first layer comprises a blend of homogeneous ethylene/alpha-olefin copolymer and linear low density polyethylene. The second layer comprises a blend of heterogeneous ethylene/alpha-olefin copolymer and ethylene/vinyl acetate copolymer. The third layer comprises ethylene/vinyl acetate copolymer. The fourth layer comprises polyvinylidene chloride. The fifth layer comprises ethylene/vinyl acetate copolymer. The sixth layer comprises a blend of heterogeneous ethylene/alpha-olefin copolymer and ethylene/vinyl acetate copolymer. The seventh layer comprises a blend of homogeneous ethylene/alpha-olefin copolymer and linear low density polyethylene. See Examples 1 and 2, below.

Figure 2:
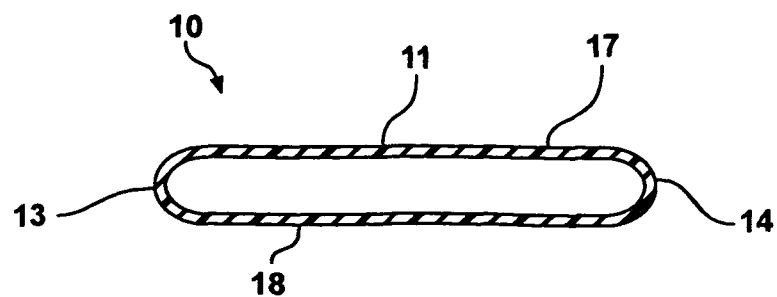
FIG. 2 is a transverse cross-sectional view of the heat-shrinkable, end-seal bag of FIG. 1.

FIGS. 1A and 2 together illustrate a schematic of end-seal bag 10, in a lay-flat position. End-seal bag 10 can be made from a seamless film tubing. FIG. 2 is a transverse cross-sectional view of end-seal bag 10 of FIG. 1A, taken through section 2-2 of FIG. 1A. Viewing FIGS. 1A and 2 together, end-seal bag 10 comprises heat-shrinkable bag film 11, bag top edge 12 defining an open top, folded first side edge 13, folded second side edge 14, bottom edge 15, and end seal 16. End seal 16 is commonly referred to as a "factory seal" because it is a seal made at the bagmaking factory, rather than at the site where the bag is used to package a product. End-seal bag 10 further has first lay-flat side 17, second lay-flat side 18, and bag skirt 19. Bag skirt 19 is outward of end seal 16 (i.e., "outward" in that bag skirt 19 is further from the center of end-seal bag 10, and exterior of the product-containing cavity within end-seal bag 10). Bag skirt 19 includes a portion of first lay-flat side 17 and a portion of second lay-flat side 18. Bag skirt 19 further comprises first tear initiator 20 in first lay-flat side 17, and second tear initiator 21 (illustrated by a dashed line because it is underneath first lay-flat side 17) in second lay-flat side 18.

Figure 1B:
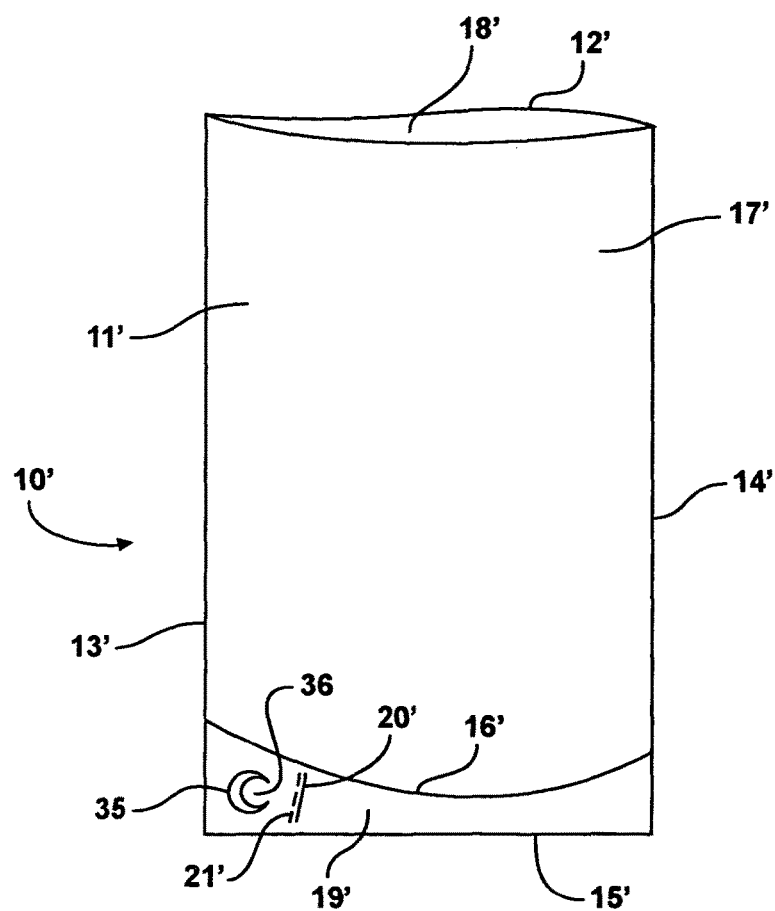
FIG. 1B is a schematic of a second heat-shrinkable, end-seal bag in lay-flat configuration.

FIG. 1B illustrates a schematic of an alternative end-seal bag 10', in a lay-flat position. End-seal bag 10' can be made from a seamless film tubing. End-seal bag 10' comprises heat-shrinkable bag film 11', bag top edge 12' defining an open top, folded first side edge 13', folded second side edge 14', bottom edge 15', and curved end seal 16'. End-seal bag 10' further has first lay-flat side 17', second lay-flat side 18', and bag skirt 19'. Bag skirt 19' is outward of curved end seal 16'. Bag skirt 19' comprises first tear initiator 20' in first lay-flat side 17', and second tear initiator 21' (illustrated by a dashed line because it is underneath first lay-flat side 17') in second lay-flat side 18'. Both first tear-initiator 20' and second tear initiator 21' are slits though the bag that do not extend to either curved end seal 16' or bag bottom edge 15'. End seal bag 10' also has grip assist hole 35 in first lay-flat side 17' and second grip assist hole (not illustrated) in second lay-flat side 18'. These grip-assist holes facilitate gripping the bag for the manual tear initiation and manual tear propagation.

Grip assist holes can be sized to allow a user's finger(s) to be inserted therethrough to assist in gripping the film. Grip assist holes work in conjunction with the tear initiators, by providing a secure manual grip of the bag in a location designed to assist in generating tear initiation force along a tear line emanating from the tear initiators.

The grip assist hole in a first lay-flat side of the packaging article can overlap or coincide with the grip assist hole in a second lay-flat side of the packaging article. While grip assist holes can have any desired shape (e.g., round, rectangular, square, triangular, pentagonal, hexagonal, etc.), preferably the holes are round, or any "corners" on the holes are rounded, to reduce the presence of stress concentration points that could cause a tear to initiate from the grip assist hole, as an objective is to have the tear initiated from the tear initiator, with the tear running to an opposite side edge of the bag.

In one embodiment, the grip-assist holes can be made by cutting through both lay-flat sides of the packaging article to remove a piece of film to form the holes. However, this process is more difficult to carry out, and it produces small, loose pieces of film corresponding with the size of the cut hole. These pieces of film may lodge inside the packaging article and thereafter adhere to a food product placed in the packaging article, which of course is an undesirable result. In order to prevent the production of a small, loose pieces of film, a cut can be made in the film in a shape that corresponds with a "partial hole cut", i.e., a cut through the film to make a portion of the hole, the cut not being complete so that a hole is formed. Such a cut leaves a "hanging chad" so that no separated small pieces of film are produced by the cut.

Figure 1C:
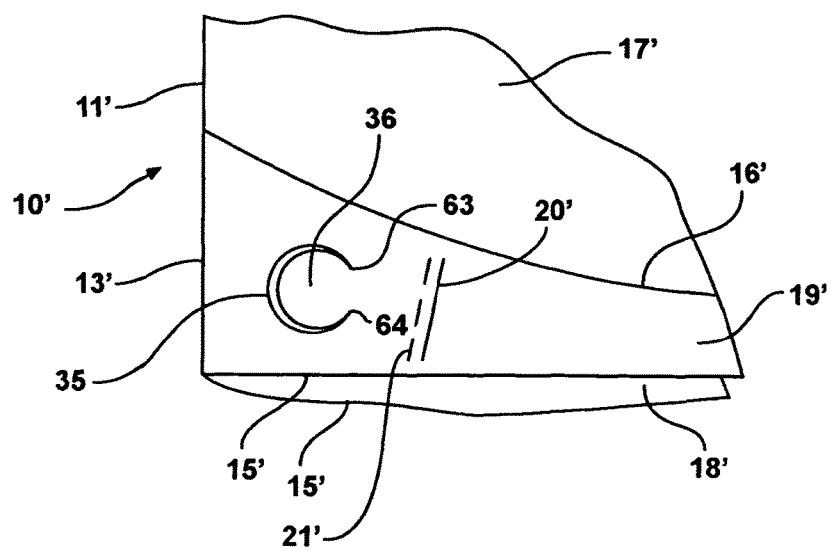
FIG. 1C is an enlarged, detailed view of a portion of the bag of FIG. 1B.
Figure 1D:
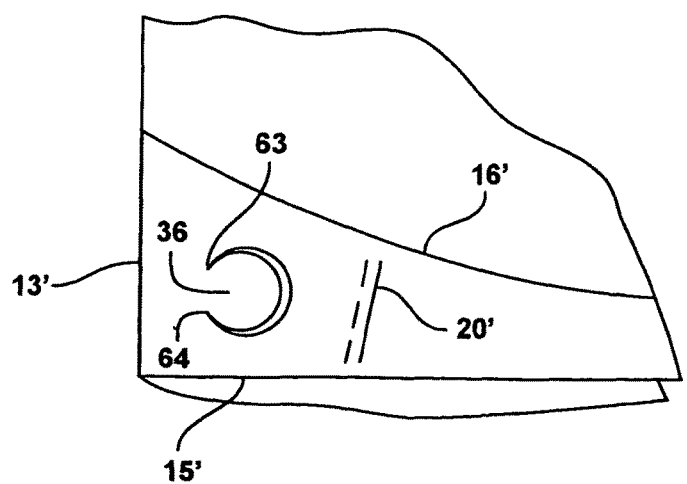
FIG. 1D is an enlarged, detailed view of a first less desirable embodiment of a bag otherwise corresponding with the bag of FIG. 1B.
Figure 1E:
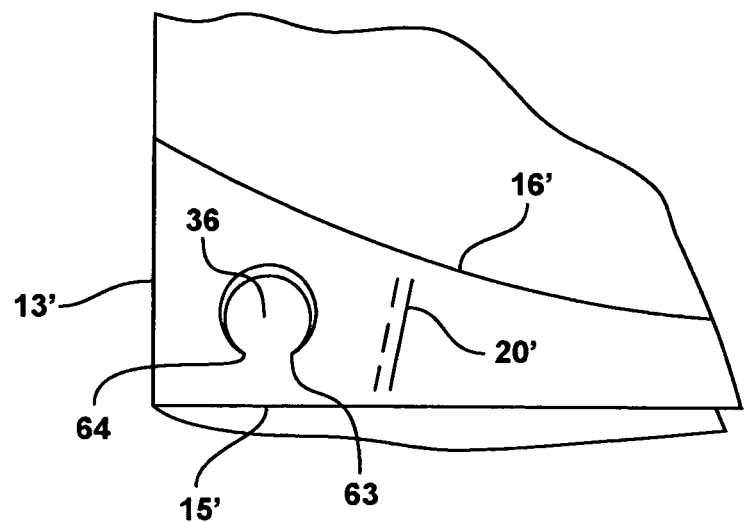
FIG. 1E is an enlarged, detailed view of a third less desirable embodiment of a bag otherwise corresponding with the bag of FIG. 1B.
Figure 1F:
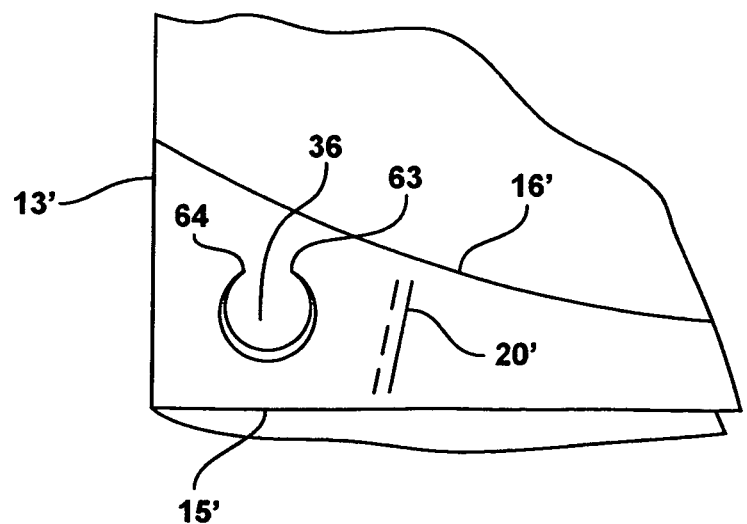
FIG. 1F is an enlarged, detailed view of a fourth less desirable embodiment of a bag otherwise corresponding with the bag of FIG. 1B.

FIG. 1B and FIG. 1C each illustrate hanging chad 36 formed by the partial hole cut made in bag 10'. As illustrated in FIG. 1C, hanging chad 36 is formed by a cut having endpoints 63 and 64. It has been found that leaving hanging chad 36 connected to film 11' by a the film connecting cut endpoints 63 and 64 results in a tear emanating from tear initiation cuts 20' and 21', with the tear running through seal 16' and through the length of bag 11'. On the other hand, if a hanging chad is formed by a cut as illustrated in FIG. 1D, or FIG. 1E, or FIG. 1F, use of the partial hole cut as a grip assistors results in a tear that likely will not emanate from tear initiation cuts 20' and 21', but rather is likely to initiate a tear from the partial hole cut towards side edge 13' or towards bottom edge 15', as illustrated by the dashed lines in each of FIGS. 1D, 1E, and 1F.

Hanging chad 36 can be made so that it is connected to film 11' at a region oriented towards tear initiation cuts 20' and 21', as illustrated in FIG. 1B and FIG. 1C. The cut that forms hanging chad 36 can have endpoints that, if connected by a line, provide a line that is parallel to side edge 13' and/or parallel to tear initiation cuts 20' and 21', or by a line within plus or minus 30 degrees of being parallel to side edge 13' and/or tear initiation cuts 20' and 21', or by a line within plus or minus 25 degrees of being parallel to side edge 13' and/or tear initiation cuts 20' and 21', or by a line within plus or minus 20 degrees of being parallel to side edge 13' and/or tear initiation cuts 20' and 21', or by a line within plus or minus 15 degrees of being parallel to side edge 13' and/or tear initiation cuts 20' and 21', or by a line within plus or minus 10 degrees of being parallel to side edge 13' and/or tear initiation cuts 20' and 21', or by a line within plus or minus 5 degrees of being parallel to side edge 13' and/or tear initiation cuts 20' and 21', or by a line within plus or minus 3 degrees of being parallel to side edge 13' and/or tear initiation cuts 20' and 21', or by a line within plus or minus 2 degrees of side edge 13' and/or tear initiation cuts 20' and 21'.

Figure 3:
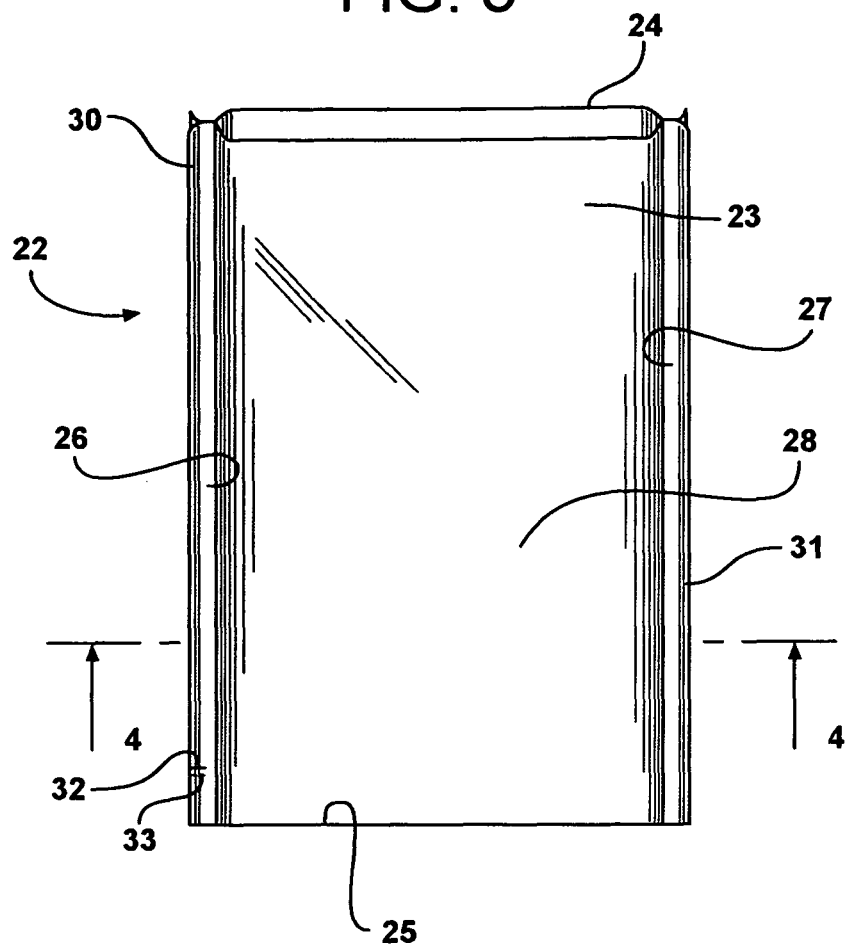
FIG. 3 is a schematic of a first heat-shrinkable, side-seal bag in lay-flat configuration.
Figure 4:
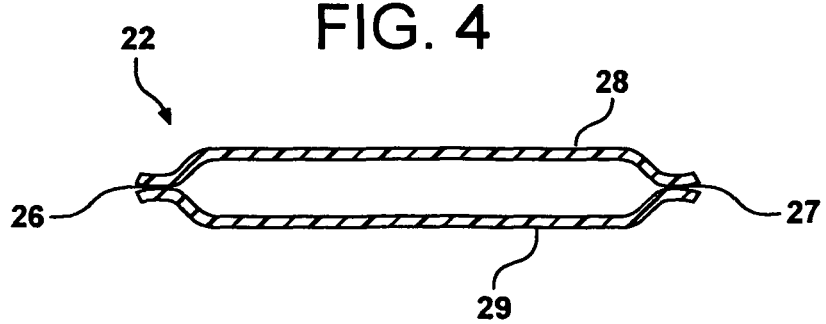
FIG. 4 is a transverse cross-sectional view of the heat-shrinkable, side-seal bag of FIG. 3

FIGS. 3 and 4 together illustrate a schematic of side-seal bag 22, in a lay-flat position. Side-seal bag 22 can be made from a seamless film tubing. FIG. 4 is a transverse cross-sectional view of side-seal bag 22 of FIG. 3, taken through section 4-4 of FIG. 3. Side-seal bag 22 comprises heat-shrinkable bag film 23, top edge 24 defining an open top, folded bottom edge 25, first side seal 26, and second side seal 27. Side-seal bag 22 has first lay-flat side 28, second lay-flat side 29, first bag skirt 30, and second bag skirt 31. First bag skirt 30 is outward of first side seal 26 and second bag skirt 31 is outward of second side seal 27. First bag skirt 30 includes a portion of first lay-flat side 28 and a portion of second lay-flat side 29. First bag skirt 30 further comprises first tear initiator 31 in first lay-flat side 28, and second tear-initiator 33 (illustrated by a dashed line because it is underneath first lay-flat side 28) in second lay-flat side 29.

FIG. 5 illustrates a schematic of alternate side-seal bag 70, also in lay-flat position. Alternate side-seal bag 70 can be made from a seamless film tubing. Alternate side-seal bag 70 comprises heat-shrinkable bag film 71, top edge 72 defining an open top, folded bottom edge 73, first side seal 74, second side seal 75, and bottom seal 76. Alternate side-seal bag 70 has first lay-flat side 77, second lay-flat side 78, first bag skirt 79, second bag skirt 80, and third bag skirt 81. First bag skirt 79 is outward of first side seal 74. Second bag skirt 80 is outward of second side seal 75. Third bag skirt 81 is outward of bottom seal 76. Third bag skirt 81 includes a portion of first lay-flat side 77 and a portion of second lay-flat side 78. Third bag skirt 81 further comprises first tear initiator 82 in first lay-flat side 77, and second tear initiator 83 (illustrated by a dashed line because it is underneath first lay-flat side 77) in second lay-flat side 78.

FIGS. 6A through 6L illustrate enlarged cutaway portions of various embodiments of for a heat-shrinkable end-seal bag such as the bag illustrated in FIG. 1 and FIG. 2.

In FIG. 6A, bag 10A has end seal 16A and bag skirt 19A in first and second lay-flat sides of bag 10A. First lay-flat side 17A of bag 10A has slit 20A, and second lay-flat side 18A of bag 10A has coinciding slit 21A.

Figure 6B:
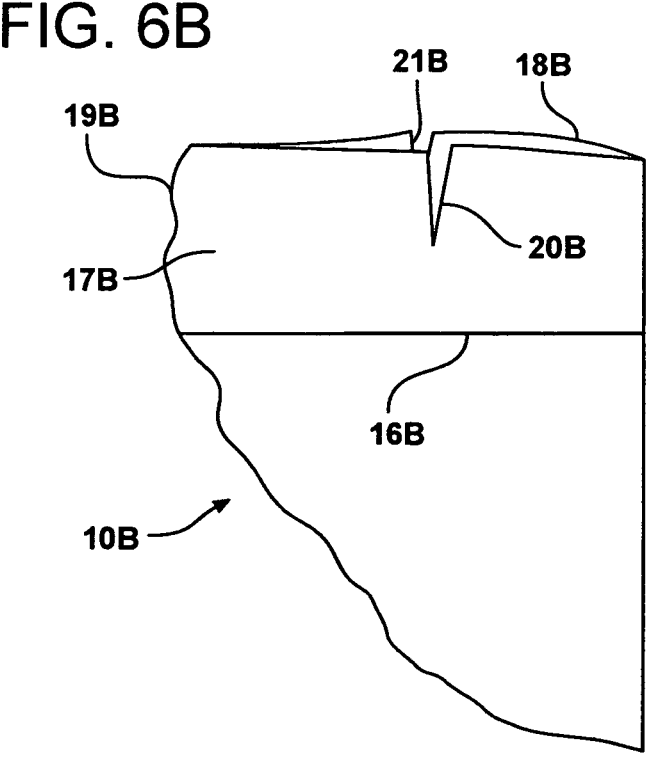
FIG. 6B is an enlarged detailed view of an alternative tear initiation feature to be used on an alternative heat-shrinkable, end-seal bag.

In FIG. 6B, bag 10B has end seal 16B and bag skirt 19B in first and second lay-flat sides of bag 10B. First lay-flat side 17B of bag 10B has V-notch 20B, and second lay-flat side 18B of bag 10B has coinciding V-notch 21B.

Figure 6C:
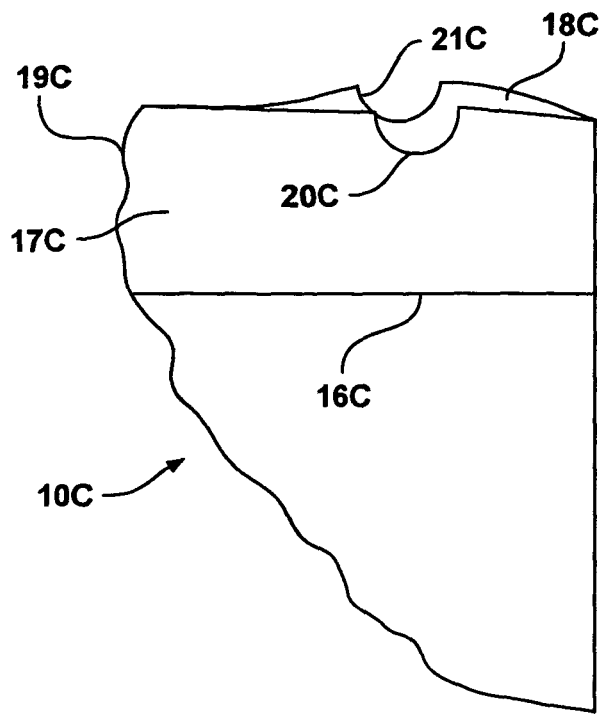
FIG. 6C is an enlarged detailed view of an alternative tear initiation feature to be used on another alternative heat-shrinkable, end-seal bag.

In FIG. 6C, bag 10C has end seal 16C and bag skirt 19C in first and second lay-flat sides of bag 10C. First lay-flat side 17C of bag 10C has round notch 20C, and second lay-flat side 18C of bag 10C has coinciding round notch 21C.

Figure 6D:
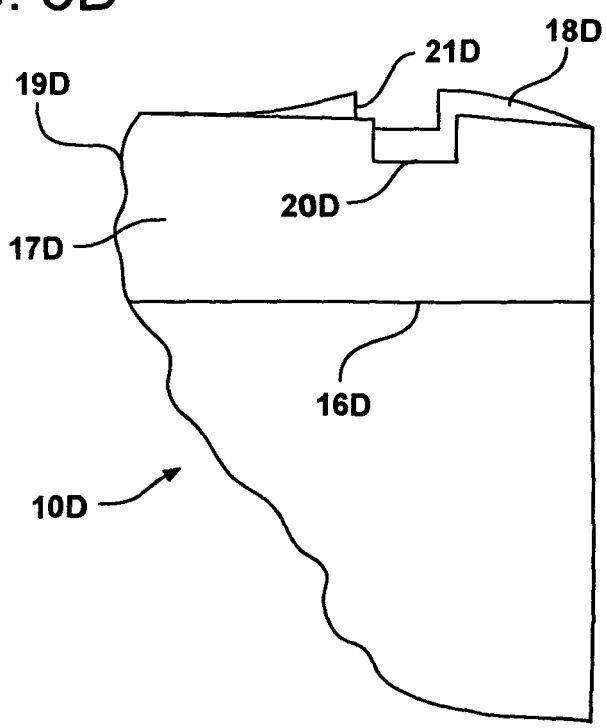
FIG. 6D is an enlarged detailed view of an alternative tear initiation feature to be used on another alternative heat-shrinkable, end-seal bag.

In FIG. 6D, bag 10D has end seal 16D and bag skirt 19D in first and second lay-flat sides of bag 10D. First lay-flat side 17D of bag 10D has rectangular notch 20D, and second lay-flat side 18D of bag 10D has coinciding rectangular notch 21D.

Figure 6E:
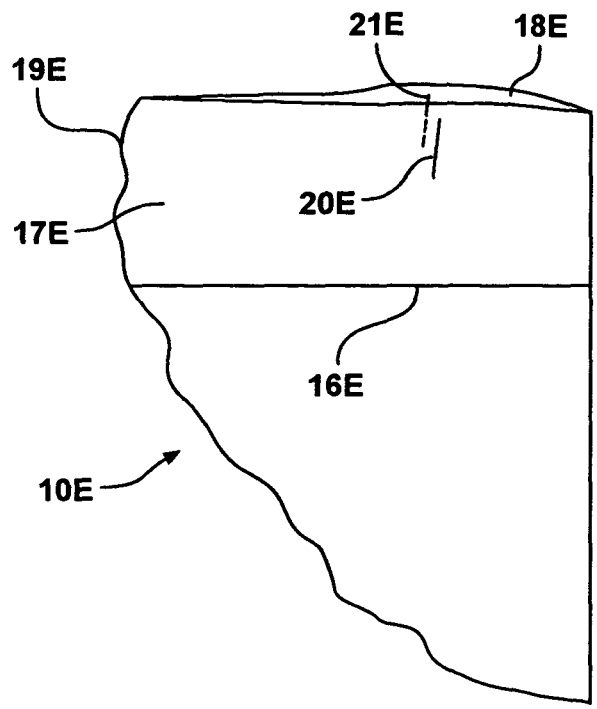
FIG. 6E is an enlarged detailed view of an alternative tear initiation feature to be used on another alternative heat-shrinkable, end-seal bag.

In FIG. 6E, bag 10E has end seal 16E and bag skirt 19E in first and second lay-flat sides of bag 10E. First lay-flat side 17E of bag 10E has slit hole 20E, and second lay-flat side 18E of bag 10E has coinciding slit hole 21E.

Figure 6F:
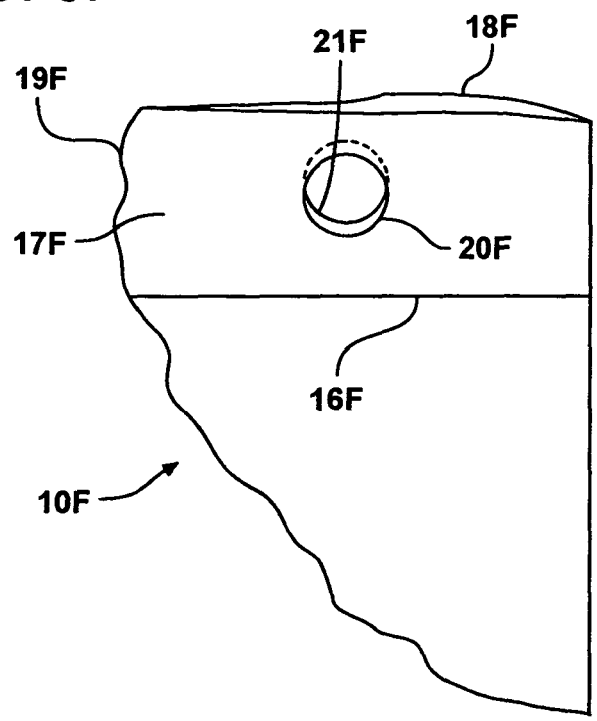
FIG. 6F is an enlarged detailed view of an alternative tear initiation feature to be used on another alternative heat-shrinkable, end-seal bag.

In FIG. 6F, bag 10F has end seal 16F and bag skirt 19F in first and second lay-flat sides of bag 10F. First lay-flat side 17F of bag 10F has round hole 20F, and second lay-flat side 18F of bag 10F has coinciding round hole 21F.

In FIG. 6G, bag 10G has end seal 16G and bag skirt 19G in first and second lay-flat sides of bag 10G. First lay-flat side 17G of bag 10G has pointed oval hole 20G, and second lay-flat side 18G of bag 10G has coinciding pointed oval hole 21G.

In FIG. 6H, bag 10H has end seal 16H and bag skirt 19H in first and second lay-flat sides of bag 10H. First lay-flat side 17H of bag 10H has rectangular hole 20H, and second lay-flat side 18H of bag 10H has coinciding rectangular hole 21H.

Figure 6I:
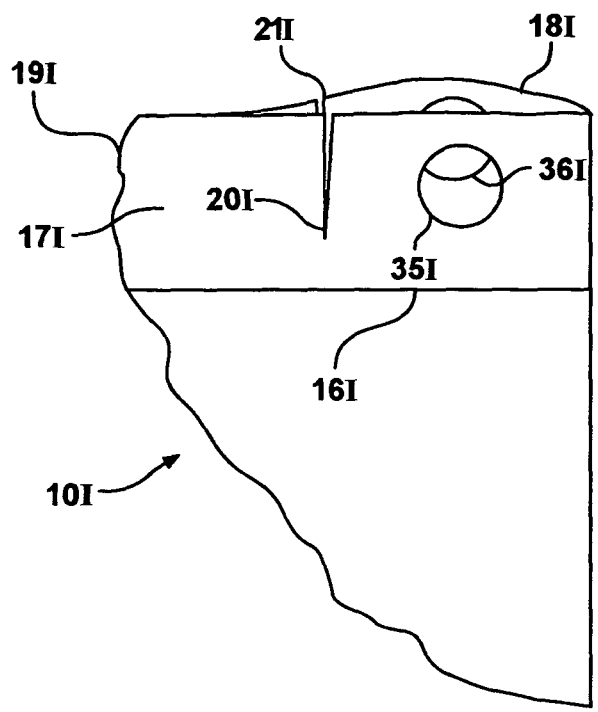
FIG. 6I is an enlarged detailed view of the tear initiation feature of the bag of FIG. 1, with the further addition of a manual grip-enhancer.

In FIG. 6I, bag 10I has end seal 16I and bag skirt 19I in first and second lay-flat sides of bag 10I. First lay-flat side 17I of bag 10I has slit 20I and grip-assist hole 35I, and second lay-flat side 18I of bag 10I has coinciding slit 21I and coinciding grip-assist hole 36I.

Figure 6J:
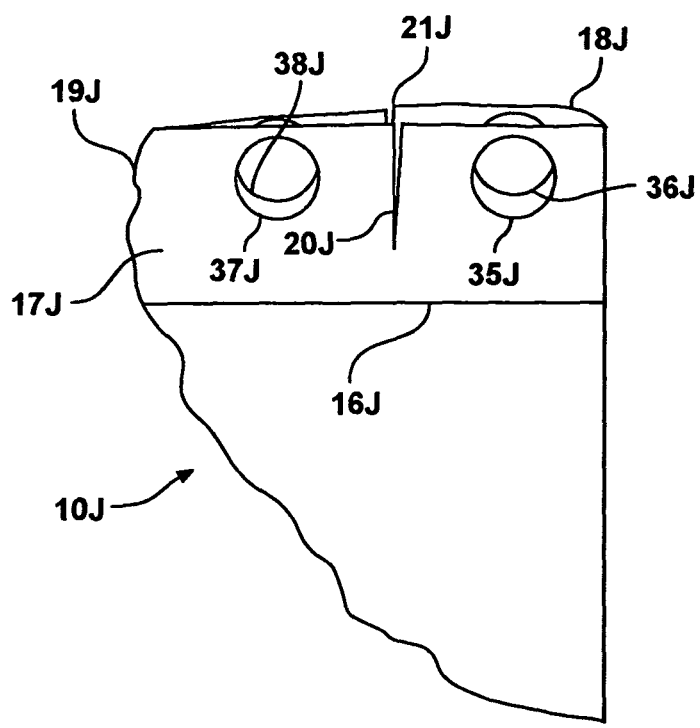
FIG. 6J is an enlarged detailed view of the tear initiation feature of the bag of FIG. 1, with the further addition of another manual grip enhancer.
Figure 6K:
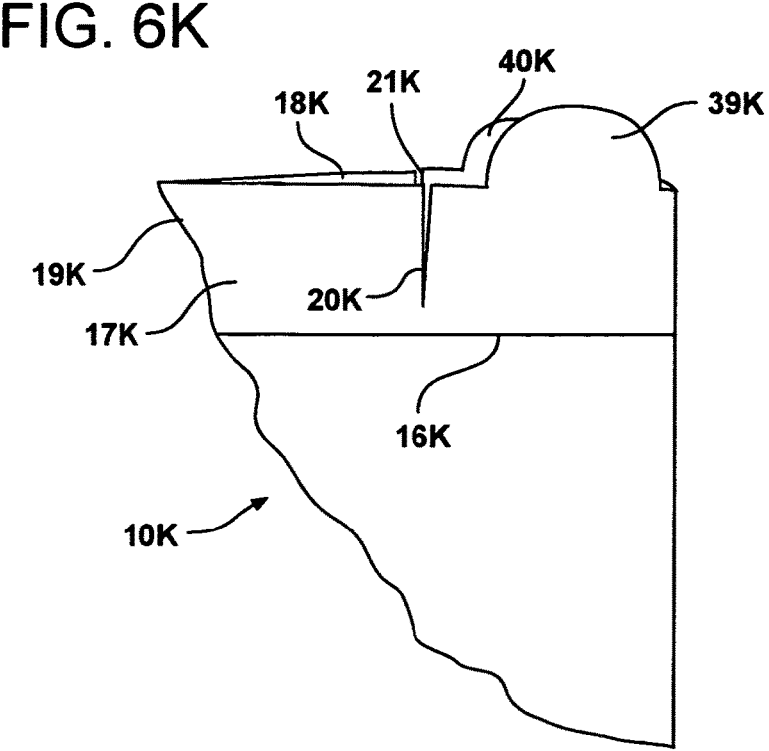
FIG. 6K is an enlarged detailed view of the tear initiation feature of the bag of FIG. 1, with the further addition of another manual grip enhancer.

In FIG. 6J, bag 10J has end seal 16J and bag skirt 19J in first and second lay-flat sides of bag 10J. First lay-flat side 17J of bag 10J has slit 20J and grip-assist holes 35J and 37J, and second lay-flat side 18J of bag 10J has coinciding slit 21J and coinciding grip-assist holes 36J and 38J.

In FIG. 6K, bag 10K has end seal 16K and bag skirt 19K in first and second lay-flat sides of bag 10K. First lay-flat side 17K of bag 10K has slit 20K and grip-assist tab 39K, and second lay-flat side 18K of bag 10K has coinciding slit 21K and coinciding grip-assist tab 40K.

Figure 6L:
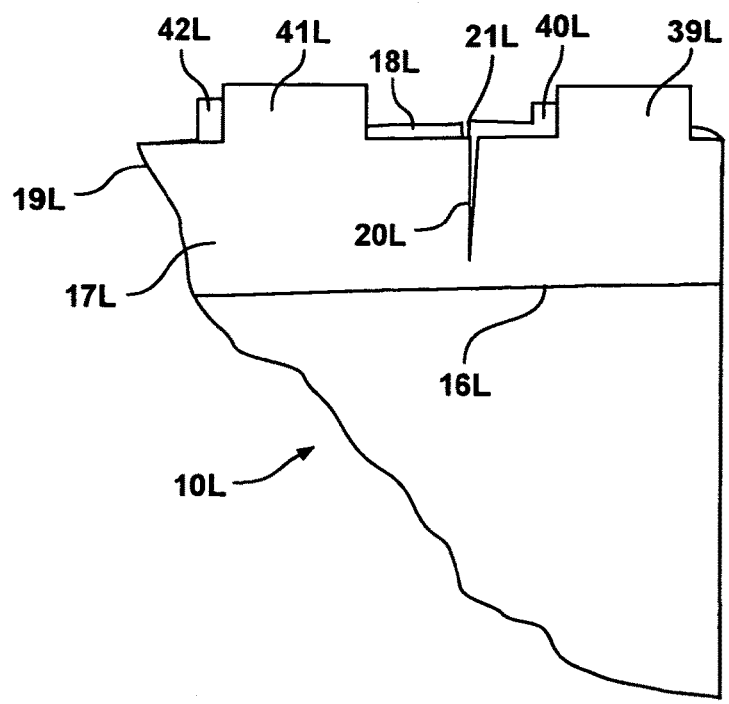
FIG. 6L is an enlarged detailed view of the tear initiation feature of the bag of FIG. 1, with the further addition of another manual grip enhancer.

In FIG. 6L, bag 10L has end seal 16L and bag skirt 19L in first and second lay-flat sides of bag 10L. First lay-flat side 17L of bag 10L has slit 20L and grip-assist tabs 39L and 41L, and second lay-flat side 18L of bag 10L has coinciding slit 21L and coinciding grip-assist tabs 40L and 42L.

FIGS. 6M, 6N, 6O, 6P, 6Q, 6R, 6S, 6T, 6U, 6V, 6W, 6X, 6Y, 6Z, 6AA, 6BB, 6CC, 6DD, 6EE, and 6FF are enlarged detailed views of various alternative embodiments including tear initiator, with most of these embodiments further including a grip assister. The grip assister is illustrated as a chadless-hole in FIGS. 6M, 6Q, 6U, 6BB, 6CC, and 6DD. The grip assister is illustrated as a hole with hanging chad in FIGS. 6N, 6O, 6P, 6R, 6S, 6T, 6V, 6W, 6X, 6Y, and 6FF.

Figure 6M:
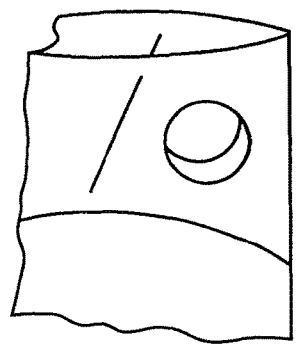
Figure 6N:
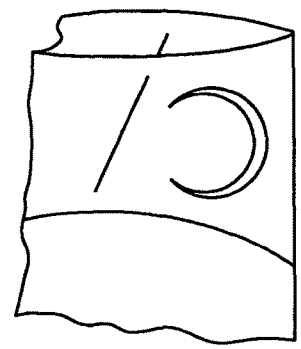
Figure 6O:
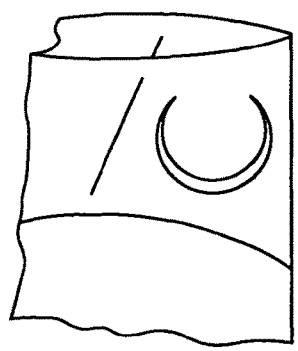
Figure 6P:
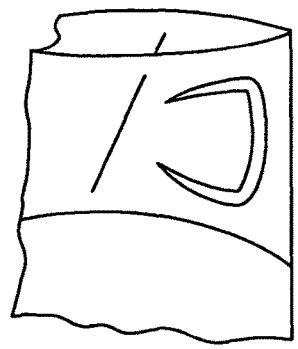
Figure 6Q:
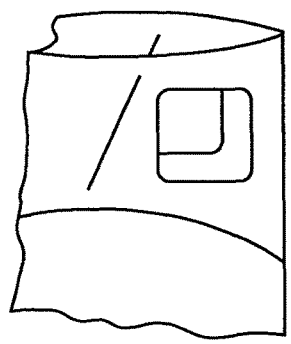
Figure 6R:
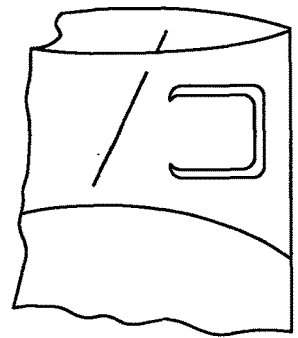
Figure 6S:
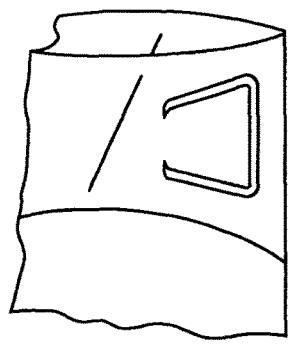
Figure 6T:
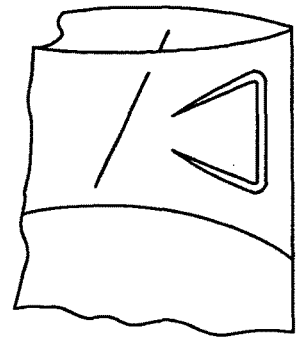
Figure 6U:
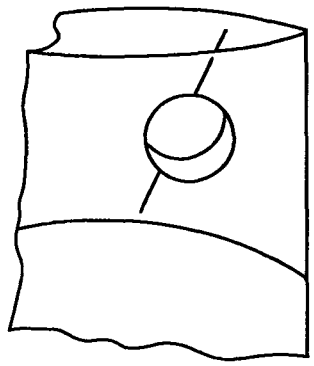
Figure 6V:
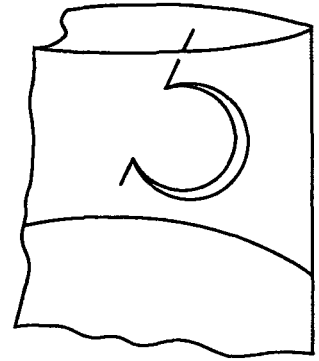
Figure 6W:
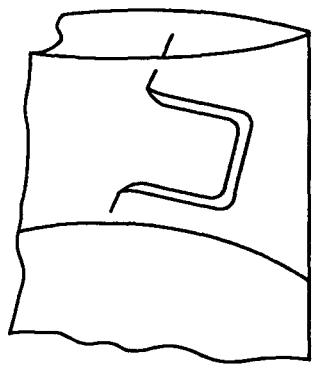
Figure 6X:
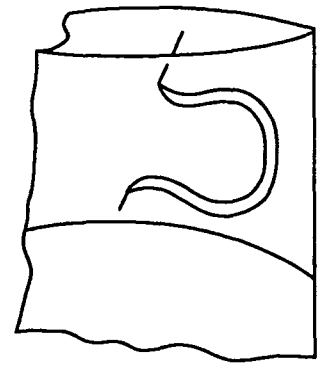
Figure 6Y:
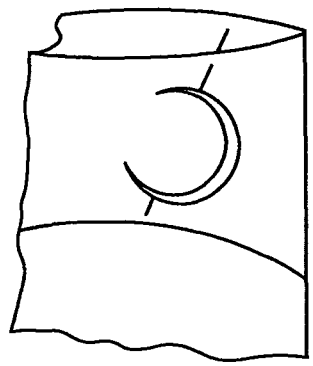
Figure 6Z:
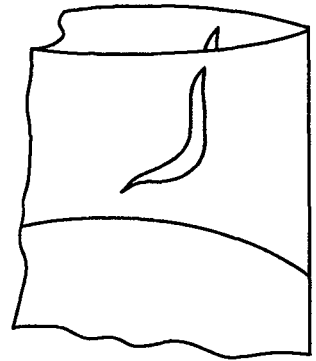
Figure 6A:
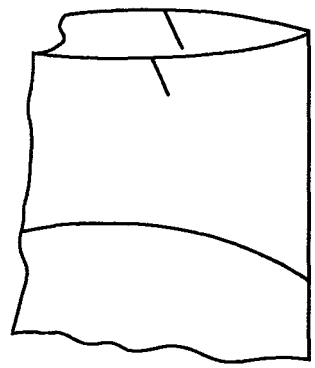
Figure 6B:
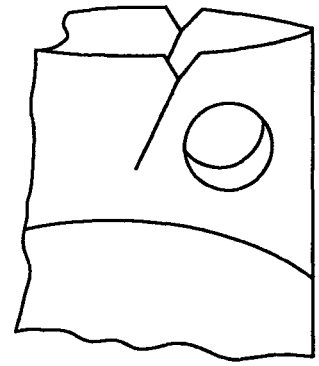
Figure 6C:
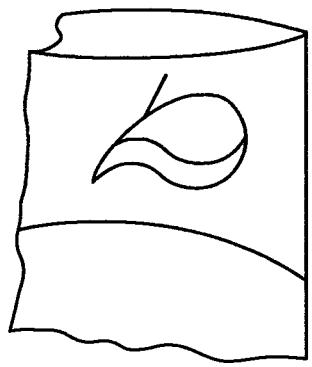
Figure 6D:
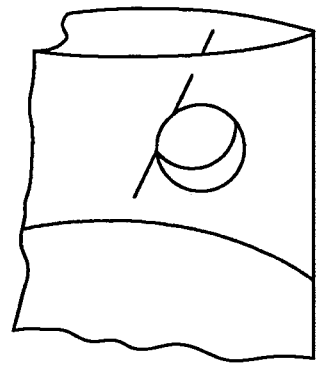
Figure 6E:
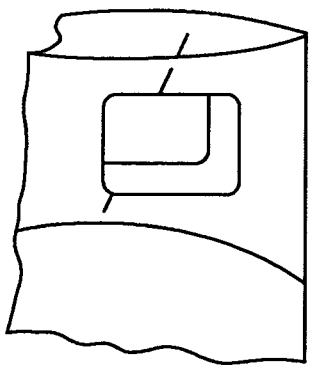
Figure 6F:
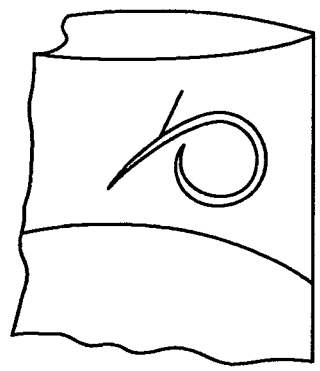

It has been found that tear initiation can be generated with less force if the tear initiator is a slit angled relative to the side edge of the packaging article, i.e., into the packaging article, as illustrated in, for example, FIG. 6M. The slit can be angled from 1 to 45 degrees off of the machine direction, or angled from 3 to 30 degrees, or angled from 5 to 25 degrees, or angled from 10 to 20 degrees, or angled about 15 degrees.

A plurality of the heat-shrinkable end-seal bags of can be supplied individually in a container, or as a set of individual bags in shingled relationship on one or more tapes in accordance with U.S. Pat. No. 4,113,139, hereby incorporated, in its entirety, by reference thereto.

Figure 7A:
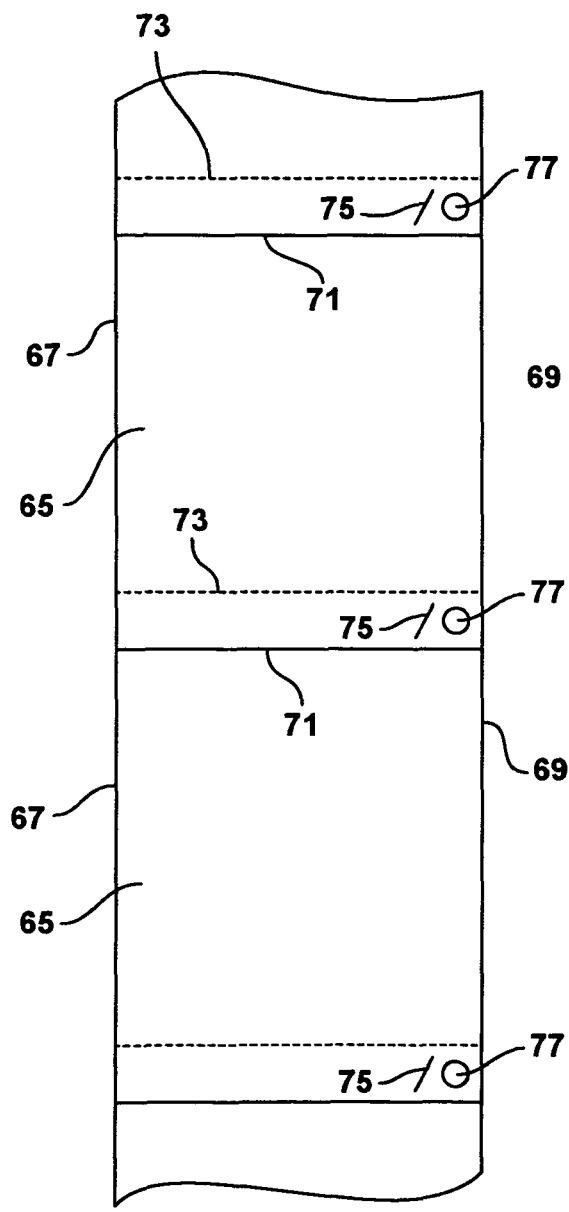
FIG. 7A is a schematic view of a first embodiment of a continuous strand of bags connected by a serration line.
Figure 7B:
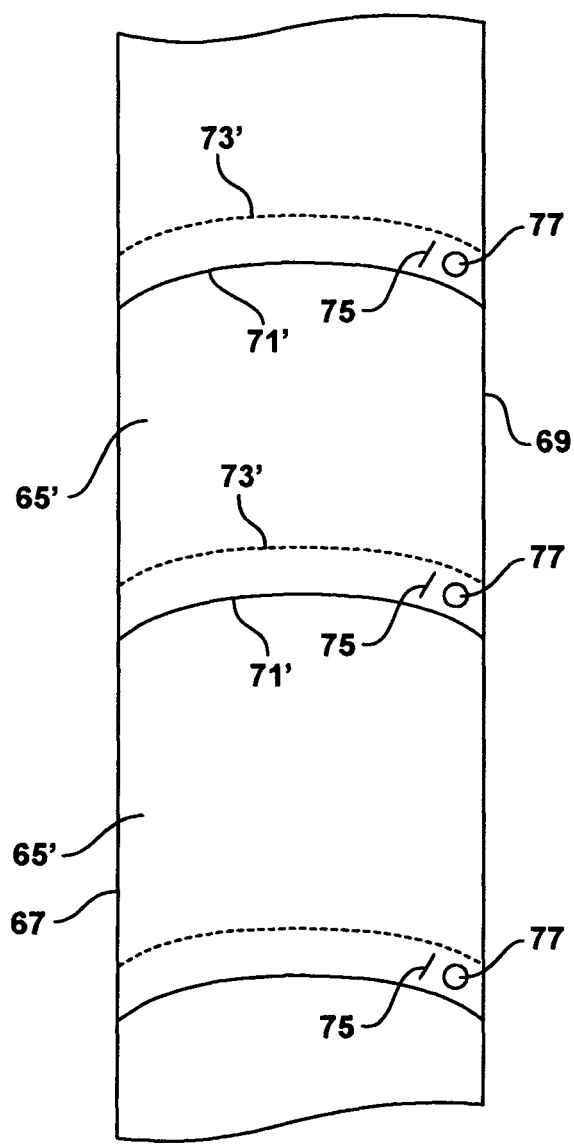
FIG. 7B is a schematic view of a second embodiment of a continuous strand of bags connected by a serration line.
Figure 7C:
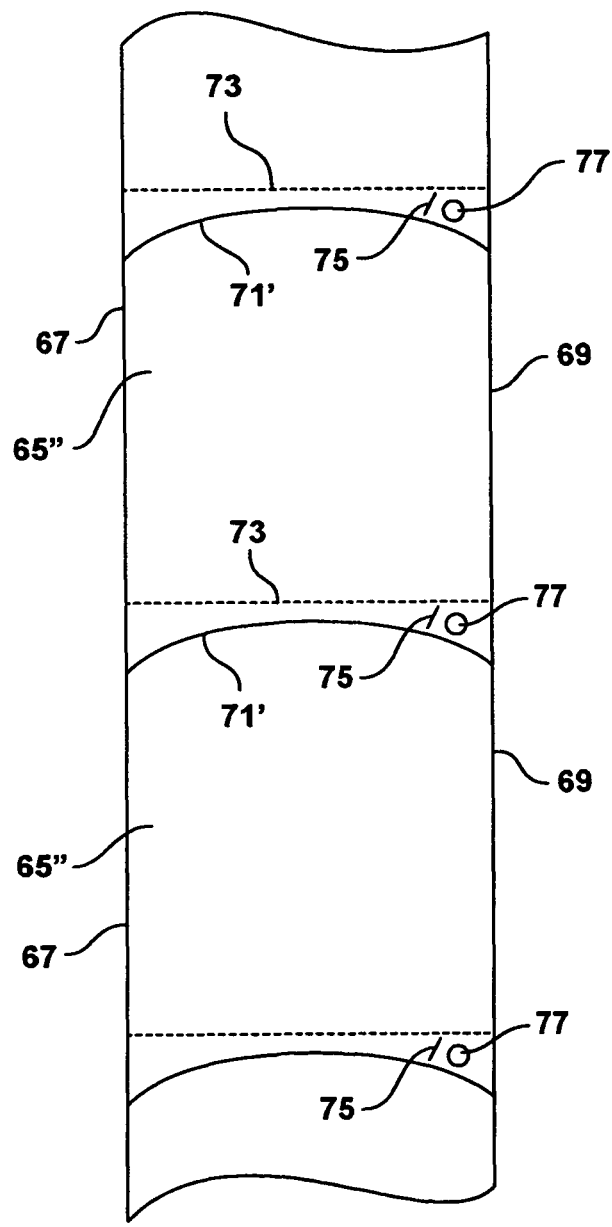
FIG. 7C is a schematic view of a third embodiment of a continuous strand of bags connected by a serration line.

Alternatively, a plurality of bags can be provided as a continuous strand of serrated bags, as illustrated in FIGS. 7A, 7B, and 7C. The continuous strands of bags in these figures are end-seal bags connected to one another in end-to-end, with a tear line of perforations being present so that bags can be torn off of the strand. FIG. 7A illustrates a portion of an elongate strip composed of a large number of end seal bags 65 made from a continuous seamless film tubing. Each end-seal bag has first side edge 67, second side edge 69, bottom seal 71, a bottom edge connected to top edge of adjoining bag along frangible tear line 73 formed by perforations through both lay-flat sides of the seamless film tubing. Each end-seal bag 65 is also provided with tear initiator 75 and grip assister 77, in the form of a hole through each lay-flat side of the bag. One or both of the holes can be made with a hanging chad therein, as described above.

FIG. 7B illustrates an alternative set of bags 65' also made from a continuous seamless film tubing. Each end-seal bag 65' has first side edge 67, second side edge 69, curved bottom seal 71', a curved bottom edge connected to a curved top edge of the adjoining bag along curved tear line 73' formed by perforations through both lay-flat sides of the seamless film tubing. Each end-seal bag 65' is also provided with tear initiator 75, and grip assister 77 in the form of a hole through each lay-flat side of the bag.

FIG. 7C illustrates an alternative set of bags 65" also made from a continuous seamless film tubing. Each end-seal bag 65" has first side edge 67, second side edge 69, curved bottom seal 71', and straight bottom edge connected to a straight top edge of the adjoining bag along straight tear line 73 formed by perforations through both lay-flat sides of the seamless film tubing. Each end-seal bag 65" is also provided with tear initiator 75, and grip assister 77 in the form of holes through each lay-flat side of the bag.

The combination of the straight tear line 73 and the curved bottom seal 71' in the strand of serrated bags illustrated in FIG. 7C, provide extra space for the tear initiators and manual grip assisters while at the same time providing a curved seal to better fit a variety of meat products to be packaged in the shrinkable bags. Otherwise, the tear initiators and the manual grip assisters require greater bag skirt length (e.g., the bags in FIGS. 7A and 7B) to provide the same amount of space for the tear initiators and grip assisters. Moreover, straight tear line 73 provides bags that avoid the curvature at the open top end of the bag. Curved top edge of the packaging articles of a curved edge bag top as in the bags of FIG. 7B can cause problems on various commercial automated bag loaders that utilize pressurized air inflation to open the bag, as the pointed edge regions of the bags tend to fold inward. Moreover, the pointed edge of a curved edge bag top may get out of the required alignment for use with suction cup style bag commercial bag opening devices.

Figure 8:
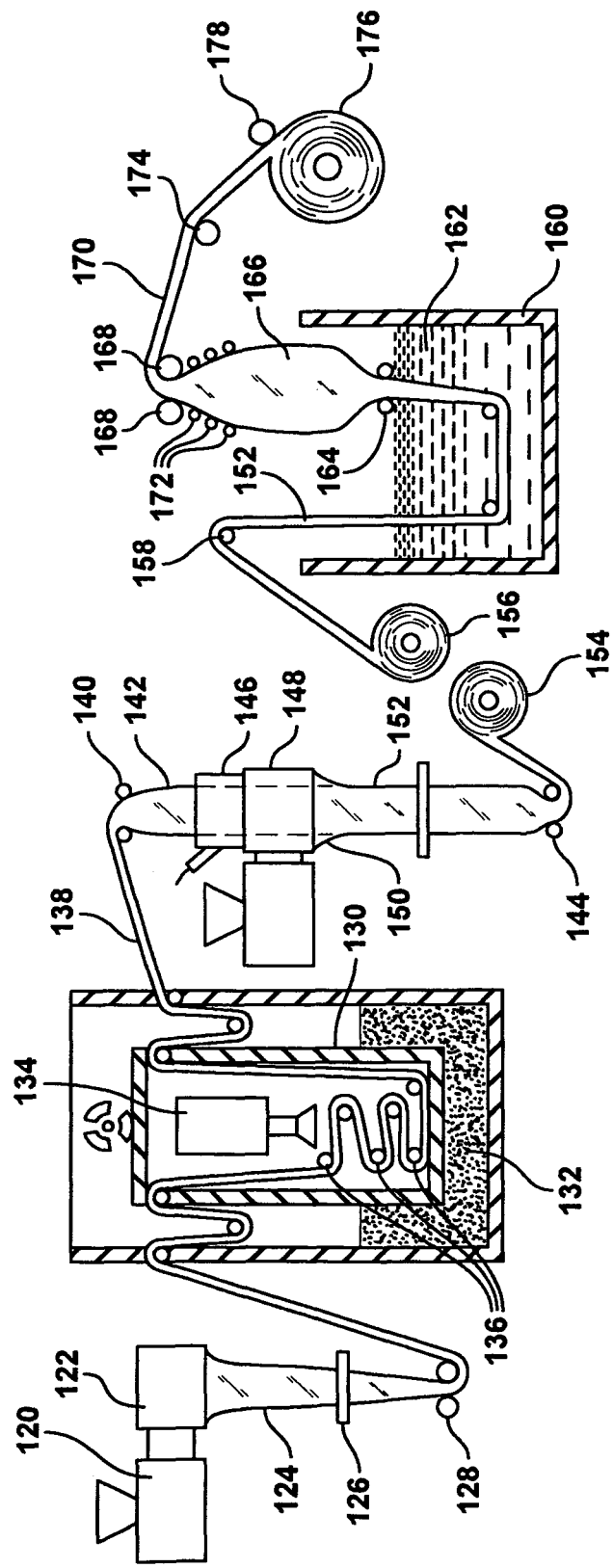
FIG. 8 is a schematic view of the process used to make various heat-shrinkable, seamless film tubings set forth in several of the examples below, this tubing thereafter being converted into end-seal and side-seal bags by heat sealing and cutting operations (not illustrated).

FIG. 8 illustrates a schematic of a preferred process for producing the multilayer heat-shrinkable film from which the packaging article can be made. In the process illustrated in FIG. 8, solid polymer beads (not illustrated) are fed to a plurality of extruders 120 (for simplicity, only one extruder is illustrated). Inside extruders 120, the polymer beads are forwarded, melted, and degassed, following which the resulting bubble-free melt is forwarded into die head 122, and extruded through an annular die, resulting in tubing 124 which is 10 to 30 mils thick, more preferably 15 to 25 mils thick.

After cooling or quenching by water spray from cooling ring 126, tubing 124 is collapsed by pinch rolls 128, and is thereafter fed through irradiation vault 130 surrounded by shielding 132, where tubing 124 is irradiated with high energy electrons (i.e., ionizing radiation) from iron core transformer accelerator 134. Tubing 124 is guided through irradiation vault 130 on rolls 136. Preferably, tubing 124 is irradiated to a level of about 4.5 MR.

After irradiation, irradiated tubing 138 is directed through nip rolls 140, following which tubing 138 is slightly inflated, resulting in trapped bubble 142. However, at trapped bubble 142, the tubing is not significantly drawn longitudinally, as the surface speed of nip rolls 144 are about the same speed as nip rolls 140. Furthermore, irradiated tubing 138 is inflated only enough to provide a substantially circular tubing without significant transverse orientation, i.e., without stretching.

Slightly inflated, irradiated tubing 138 is passed through vacuum chamber 146, and thereafter forwarded through coating die 148. Second tubular film 150 is melt extruded from coating die 148 and coated onto slightly inflated, irradiated tube 138, to form two-ply tubular film 152. Second tubular film 150 preferably comprises an $O_2$-barrier layer, which does not pass through the ionizing radiation. Further details of the above-described coating step are generally as set forth in U.S. Pat. No. 4,278,738, to BRAX et. al., which is hereby incorporated, in its entirety, by reference thereto.

After irradiation and coating, two-ply tubing film 152 is wound up onto windup roll 154. Thereafter, windup roll 154 is removed and installed as unwind roll 156, on a second stage in the process of making the tubing film as ultimately desired. Two-ply tubular film 152, from unwind roll 156, is unwound and passed over guide roll 158, after which two-ply tubular film 152 passes into hot water bath tank 160 containing hot water 162. The now collapsed, irradiated, coated tubular film 152 is submersed in hot water 162 (having a temperature of about 210° F.) for a retention time of at least about 5 seconds, i.e., for a time period in order to bring the film up to the desired temperature for biaxial orientation. Thereafter, irradiated tubular film 152 is directed through nip rolls 164, and bubble 166 is blown, thereby transversely stretching tubular film 152. Furthermore, while being blown, i.e., transversely stretched, nip rolls 168 draw tubular film 152 in the longitudinal direction, as nip rolls 168 have a surface speed higher than the surface speed of nip rolls 164. As a result of the transverse stretching and longitudinal drawing, irradiated, coated biaxially-oriented blown tubing film 170 is produced, this blown tubing preferably having been both stretched in a ratio of from about 1:1.5-1:6, and drawn in a ratio of from about 1:1.5-1:6. More preferably, the stretching and drawing are each performed a ratio of from about 1:2-1:4. The result is a biaxial orientation of from about 1:2.25-1:36, more preferably, 1:4-1:16. While bubble 166 is maintained between pinch rolls 164 and 168, blown tubing film 170 is collapsed by rolls 172, and thereafter conveyed through nip rolls 168 and across guide roll 174, and then rolled onto wind-up roll 176. Idler roll 178 assures a good wind-up.

FIG. 9 illustrates a perspective view of package 50 made by placing a meat product into an end-seal bag having end seal 51, evacuating the atmosphere from within the bag, and sealing the bag closed with packing seal 55, and thereafter trimming off and discarding the excess bag length. Bag skirt 52 has slit 53 therein as the tear initiators for initiating manual opening of package 50. Slit 53 extends in the machine direction, toward end seal 51 from bag bottom edge 54.

Figure 10:
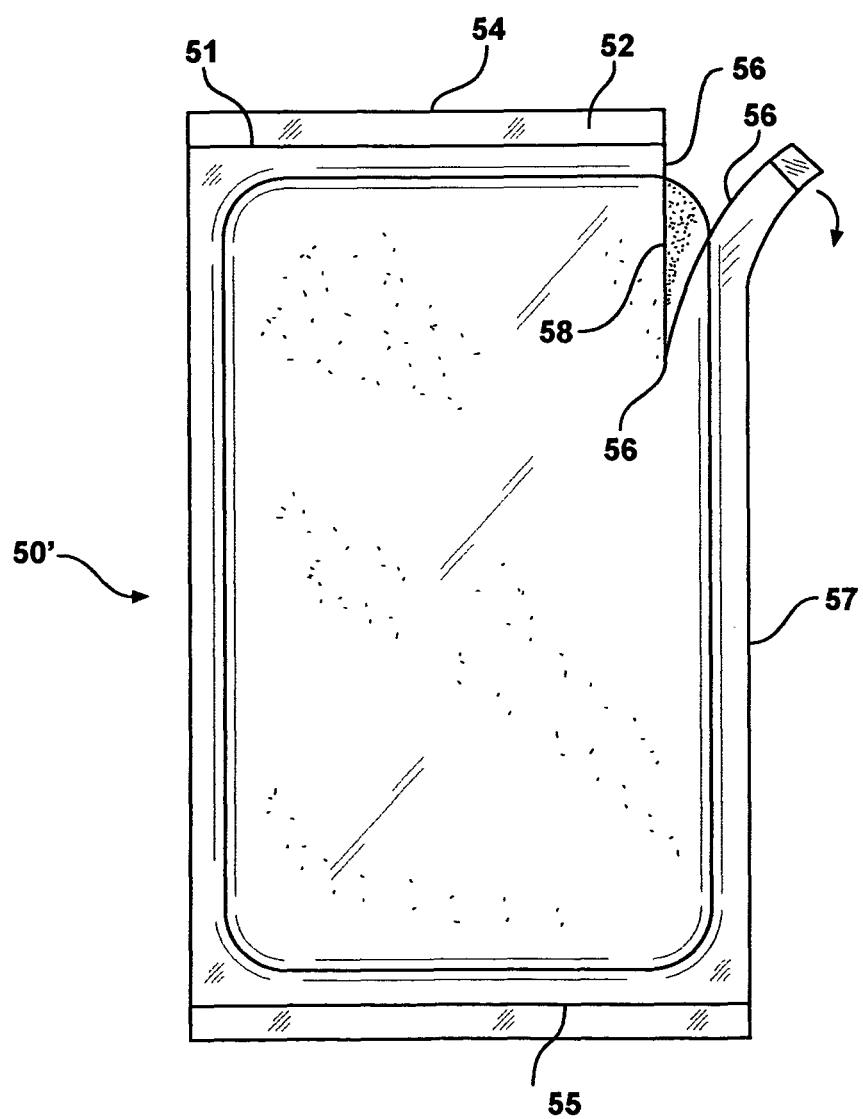
FIG. 10 is a schematic of the packaged product of FIG. 9 after the tearing has been initiated, but as the tearing remains in an intermediate state, the tearing proceeding down the bag film in the machine direction.

FIG. 10 illustrates package 50' at an intermediate stage of the manual opening process, i.e., after having initiated tearing of the bag for a distance of about 25% of the length of the bag, revealing meat product 58. Linear, machine-direction tear 56 has been manually propagated through end seal 51 and down the length of the end-seal bag. Note that machine direction tear 56 is not terminated by being propagated to side edge 57 of package 50.

Figure 11:
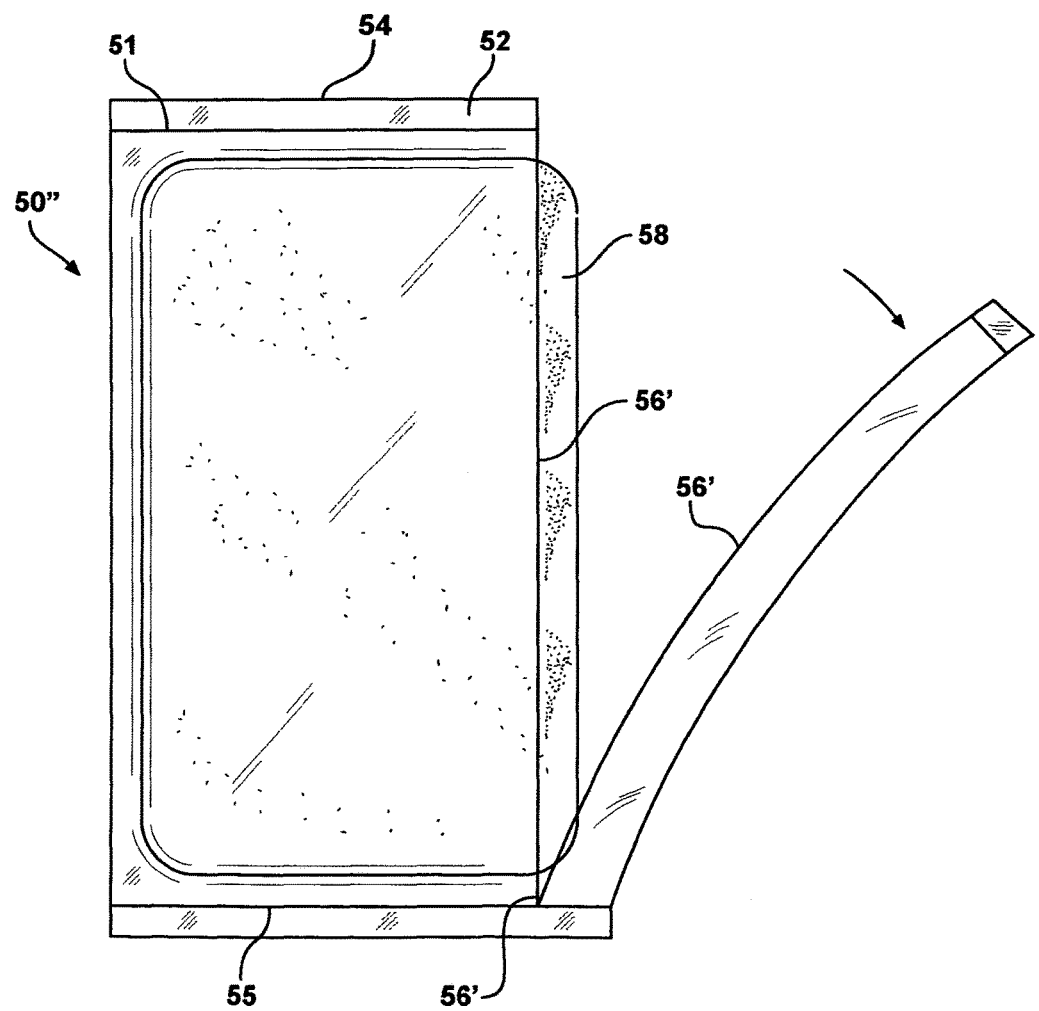
FIG. 11 is a schematic of the packaged product of FIGS. 8 and 9, after the tearing is completed.

FIG. 11 illustrates package 50" at a final stage in the manual opening process, i.e., after having torn the end-seal bag for a distance corresponding with over 90% of its length, toward the opposite edge of the packaging article of the package, exposing enough of the length of meat product 58 that the product can be readily removed from package 50". Linear, machine-direction tear 56' has been manually propagated through end seal 51 and down the length of the end-seal bag.

Figure 12:
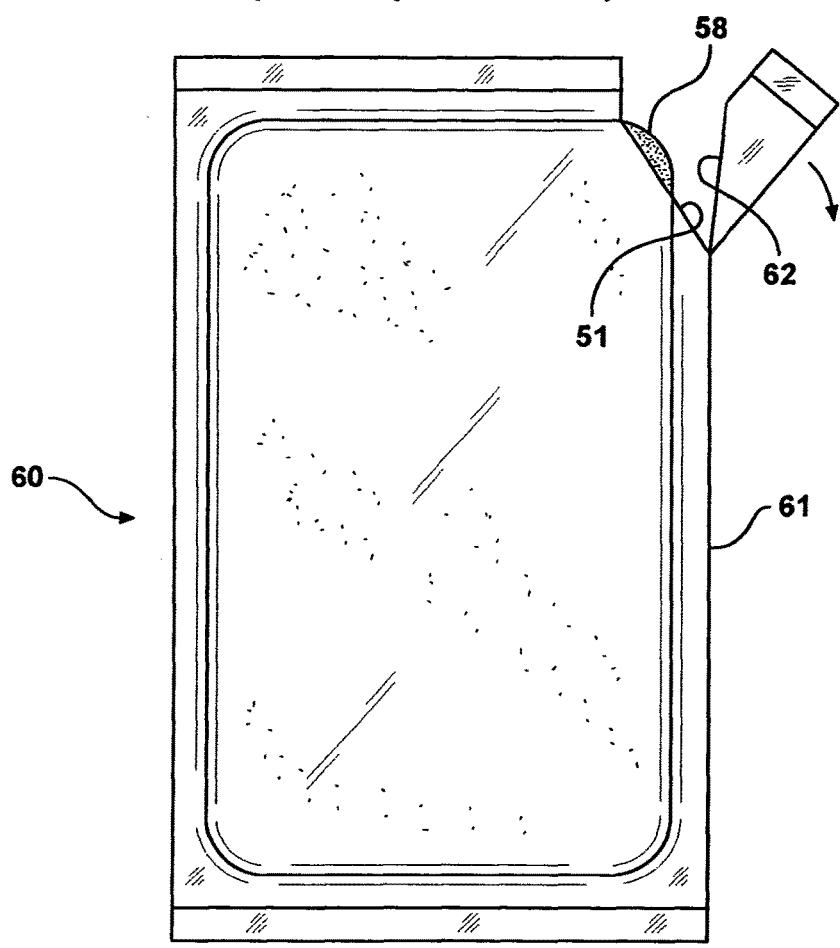
FIG. 12 is a schematic of a comparative packaged product exhibiting a tear character that does not allow tearing for the full length of the bag.

FIG. 12 illustrates a perspective view of comparative package 60 after tearing has been initiated and propagated almost to completion, i.e., almost to termination at side edge 61, about 15 to 20 percent down the length of the package. Package 60 is representative of most heat-shrinkable bags in the marketplace today, which, if provided with a tear initiator in the bag skirt, undergo this type of "dog-leg" manual tear 62 initiation and propagation to side edge 61, whereby meat product 58 cannot be readily removed from torn package 60.

Figure 13:
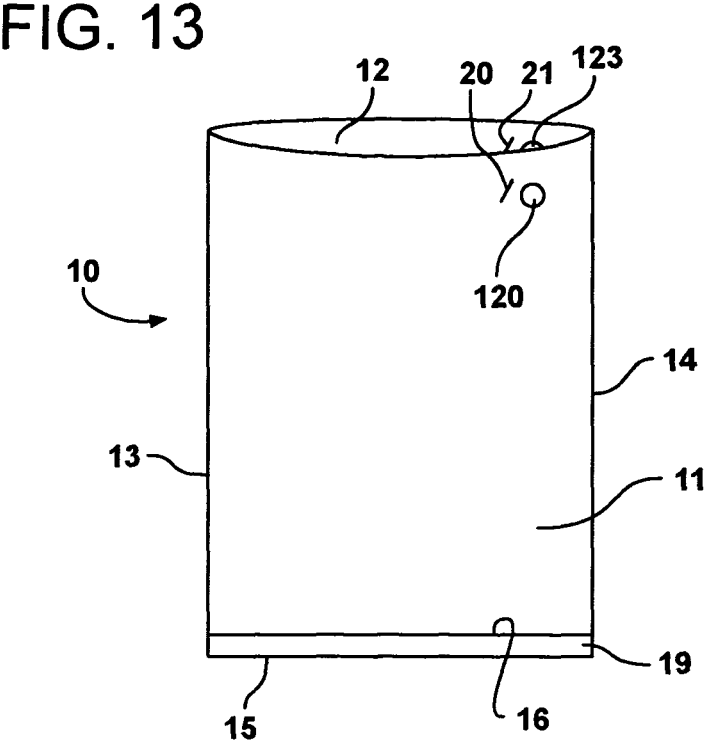
FIG. 13 is a schematic of an alternative heat-shrinkable end-seal bag in lay-flat configuration.

FIG. 13 illustrates a schematic of an alternative heat-shrinkable end-seal bag 10, in a lay-flat position. End-seal bag 10 comprises heat-shrinkable bag film 11, bag top edge 12 defining an open top, folded first side edge 13, folded second side edge 14, bottom edge 15, and end seal 16. End-seal bag 10 further has bag skirt 19 outward of end seal 16. The end-seal bag has slit 20 that is a tear initiator in the first lay-flat side of the bag, and slit 21 that is a tear initiator in the second lay-flat side of the bag. The end-seal bag also has hole 120 that is a grip assister in the first lay-flat side of the bag, and hole 123 that is a grip assister in the second lay-flat side of the bag. The tear initiator and the grip assister are located near bag top edge 12. When a product is placed in the bag and the bag sealed closed so that it surrounds the product, the tear initiator and the grip assister will then be located in the excess bag length known as the "bag tail" or as the bag "header". Frequently, the bag tail provides more area for inclusion of the tear initiator and the grip assister than bag skirt 19.

Figure 14:
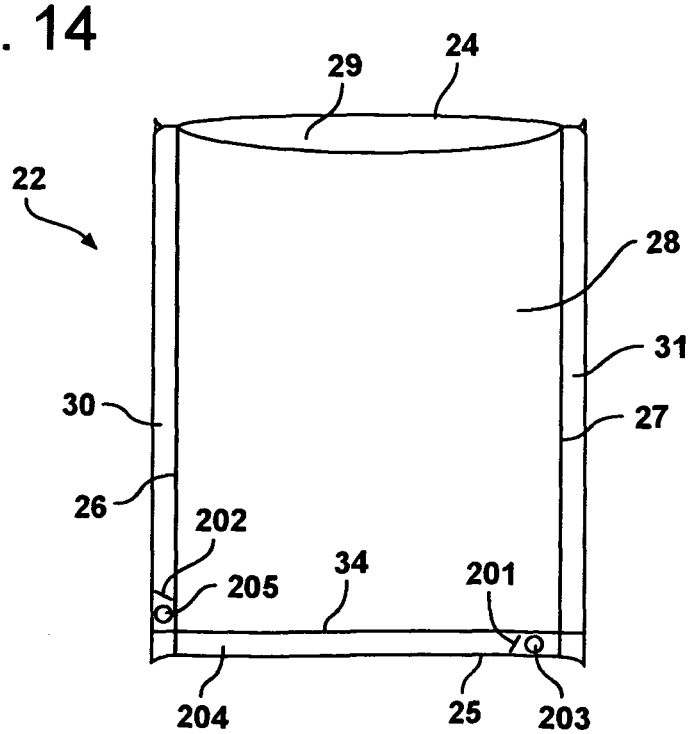
FIG. 14 is a schematic of an alternative heat-shrinkable side-seal bag in lay-flat configuration.

FIG. 14 illustrates a schematic view of alternative side-seal bag 22 in lay-flat configuration. Side-seal bag 22 comprises top edge 24 defining an open top, folded bottom edge 25, first side seal 26, and second side seal 27, transverse bottom seal 34, first lay-flat side 28, second lay-flat side 29, first bag skirt 30, and second bag skirt 31, and third bag skirt 204. First bag skirt 30 is outward of first side seal 26, second bag skirt 31 is outward of second side seal 27, and third bag skirt 204 is outside of bottom seal 34. Third bag skirt 204 comprises first tear initiator 201 and first grip assister 203, each of which is present in both lay-flat sides of bag 22. First bag skirt 30 comprises second tear initiator 202 and second grip assister 204, each of which are present in both lay-flat sides of bag 22. After a product is placed in the bag, and the bag sealed closed, side-seal bag 22 can be opened by making a first tear propagated from first tear initiator 201, the tear being propagated for the full length of bag 22, thereby opening the bag for removal of the product. Thereafter, side-seal bag 22 can undergo a second tear propagated from second tear initiator 202, the second tear being propagated across the full remaining width of bag 22, enhancing the ease of removal of the product from the opened package.

Figure 15:
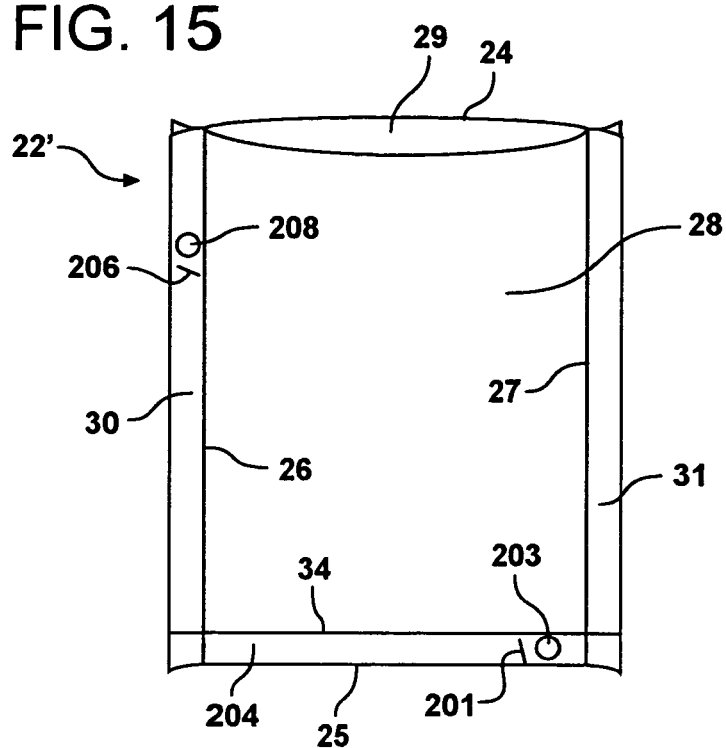
FIG. 15 is a schematic of another alternative side-seal bag in lay-flat configuration.

FIG. 15 illustrates a schematic view of alternative side-seal bag 22' in lay-flat configuration. Bag 22' has top edge 24 defining an open top, folded bottom edge 25, first side seal 26, and second side seal 27, transverse bottom seal 34, first lay-flat side 28, second lay-flat side 29, first bag skirt 30, second bag skirt 31, and third bag skirt 204. First bag skirt 30 is outward of first side seal 26, second bag skirt 31 is outward of second side seal 27, and third bag skirt 204 is outside of bottom seal 34. Third bag skirt 204 comprises first tear initiator 201 and first grip assister 203, each of which is present in both lay-flat sides of bag 22. First bag skirt 30 comprises second tear initiator 206 and second grip assister 208, each of which are present in both lay-flat sides of bag 22'. After a product is placed in the bag, and the bag sealed closed, the package made from bag 22' can be opened by making a first tear propagated from first tear initiator 201, the tear being propagated for the full lengths of bag 22', thereby opening the bag for removal of the product. Thereafter, bag 22' can undergo a second tear propagated from second tear initiator 206, the second tear being propagated across the full remaining width of bag 22', thereby enhancing the ease of removal of the product from the opened package. Unlike bag 22 of FIG. 14, the order of which tear is made first is not important in the opening of bag 22'.

Figure 16:
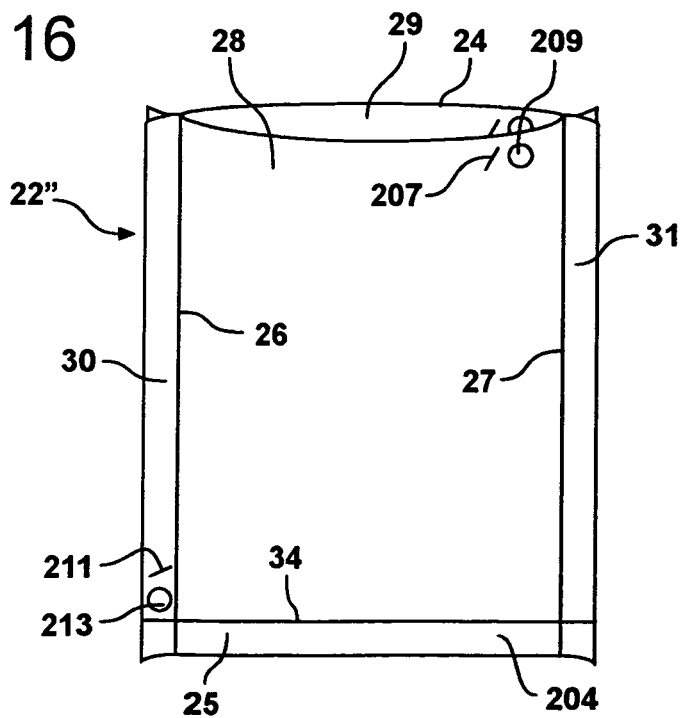
FIG. 16 is a schematic of yet another side-seal bag in lay-flat configuration.

FIG. 16 illustrates a schematic view of alternative side-seal bag 22" in lay-flat configuration. Bag 22" has top edge 24 defining an open top, folded bottom edge 25, first side seal 26, and second side seal 27, transverse bottom seal 34, first lay-flat side 28, second lay-flat side 29, first bag skirt 30, second bag skirt 31, and third bag skirt 204. First bag skirt 30 is outward of first side seal 26, second bag skirt 31 is outward of second side seal 27, and third bag skirt 204 is outward of bottom seal 34. Near the top edge 24 of bag 22", in a region intended to be a bag tail after a product is placed into bag 22" and a seal made across bag 22" so that the product is fully enclosed within the bag, is first tear initiator 207 and first grip assister 209, each of which are present in both lay-flat sides of bag 22". First bag skirt 30 comprises second tear initiator 211 and second grip assister 213, each of which are present in both lay-flat sides of bag 22" After a product is placed in bag 22", and the bag sealed closed, the package made from bag 22" can be opened by making a first tear propagated from first tear initiator 207, the tear being propagated for the full lengths of bag 22", thereby opening the bag for removal of the product. Thereafter, bag 22" can undergo a second tear propagated from second tear initiator 211, the second tear being propagated across the full remaining width of bag 22", thereby enhancing the ease of removal of the product from the opened package.

Figure 17:
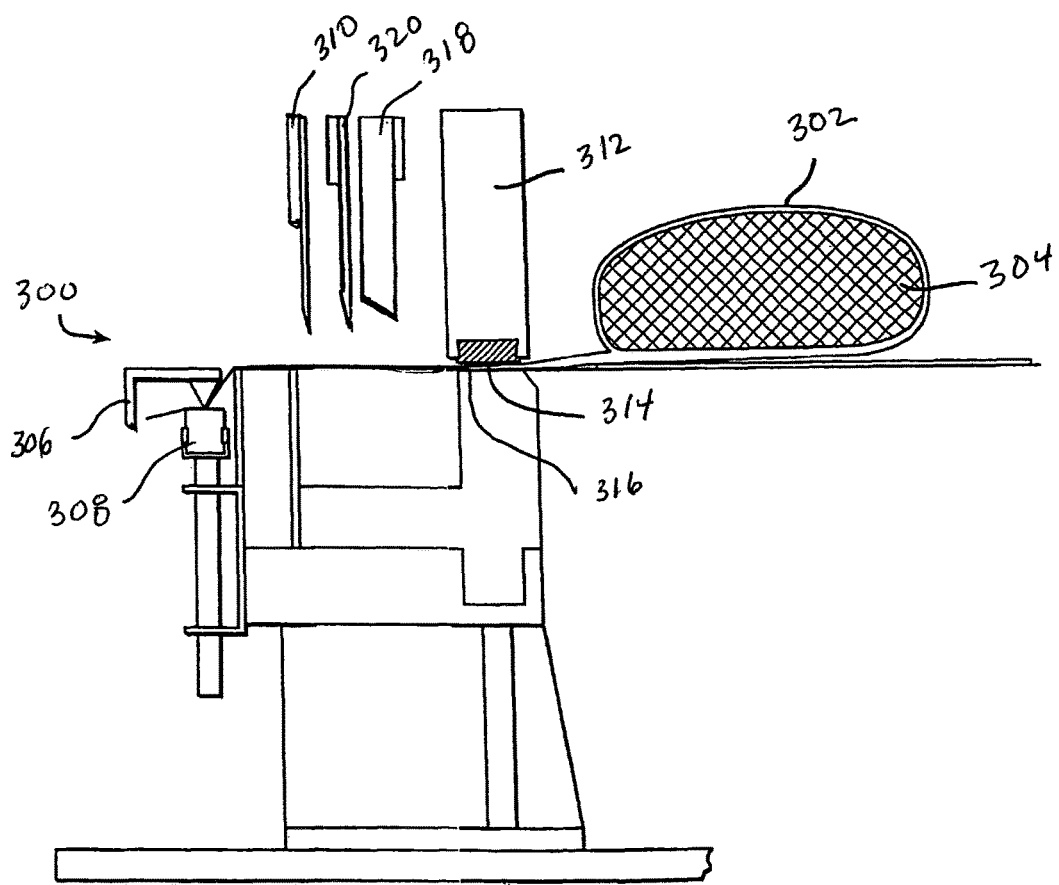
FIG. 17 is a schematic of an apparatus for carrying out the process of placing tear initiators in the header region of a packaging article.

FIG. 17 is a schematic of an apparatus for carrying out the process of placing tear initiators in the header region of a heat-shrinkable end-seal bag, with the tear initiators being made in the header during the packaging process. The tear initiators (and the optional grip assisters) can be made in the bag either before or after the product is placed into the packaging article, either before or after the bag is evacuated, and either before or after the heat seal is made to close the bag. Placing the tear initiators in the bag after the product is placed in the bag eliminates the potential for the tear initiator to cause the bag to tear during loading. Although the packaging article in FIG. 17 is an end-seal bag, the packaging article could be any packaging article in accordance with any one or more of the various aspects of the invention described above.

FIG. 17 illustrates a portion of vacuum chamber packaging machine 300, such as a series 8600 automated rotary chamber vacuum packaging machine from Cryovac, Inc. After end-seal bag 302 having product 304 therein is placed into the opened vacuum chamber, vacuum chamber lid 306 comes down to close the vacuum chamber and clamp across the top (header) portion of bag 302, so that bag 302 is clamped between chamber lid 306 and vacuum chamber base 308. For simplicity, only small portions of chamber lid 306 and chamber base 308 are illustrated in FIG. 17. For more detailed information on this machine, see U.S. Pat. No. 4,550,548, which is hereby incorporated by reference, in its entirety.

Once bag 302 is clamped into position and chamber lid 306 closed, one or more holes are punched through both sides of the header portion of bag 302 by the downward movement of piercing knife 310, which thereafter is retracted to the position illustrated. These holes allow atmosphere to readily evacuate bag 302 as the atmosphere is evacuated from the closed vacuum chamber. After atmospheric evacuation has been completed, seal seat 312 moves downward (i.e., into the position illustrated in FIG. 17) so that bag 302 is clamped between heat seal wires 314 and heat seal platen 316. Heat seal wires 314 are heated to produce a heat seal across bag 302, resulting in the closure of bag 302 and the formation of a packaged product. Shortly thereafter, tear-initiator knife 318 is activated downward and then retracted, with tear-initiator knife 318 piercing both sides of bag 302 to produce machine-direction tear initiators in each side of the header of bag 302. Optionally, a separate grip-assister knife (not illustrated, but preferably located alongside and spaced a short distance from knife 318) is activated downwardly and then retracted, so that it cuts through both sides of the header of bag 302, to form a grip assister in each side of bag 302. Cut-off knife 320 is then downwardly activated to cut off the excess length from the header of bag 302. Then the chamber is opened and the now easy-open packaged product is removed from the chamber.

While the process described above with respect to FIG. 17 could be used to make an easy open packaged product, alternatively the process could be carried out on vertical form fill and seal machines or on horizontal form fill and seal machines, to produce easy open packaged products. Typically, vertical and horizontal form fill and seal processes are not carried out under vacuum. Such equipment, packages, and processes are set forth in U.S. Pat. No. 4,905,452, U.S. Pat. No. 4,861,414, and U.S. Pat. No. 4,768,411, each of which is hereby incorporated, in its entirety, by reference thereto.

The tear initiators (and the optional grip assisters) can also be designed to facilitate automated opening, in addition to being designed to facilitate manual tearing to open the package. Automated tearing devices include hooks actuated by pneumatic actuators (air or hydraulic or electric), divergent hooks on chain conveyors, motorized hooks, and clamps in place of hooks.

FIG. 18 illustrates a schematic of packaged product 330 in which product 332 is packaged inside packaging article 334 having factory seal 336 and customer seal 338. Packaging article 334 includes header 340 with tear initiator 342 through each side of the package and with pairs of grip assisters 344 and 346, each pair being through both sides of the package, with one pair being on a first side of tear initiator 342, and the other pair being on the other side of tear initiator 342. In this manner, pairs of hooks or clamps can grip the package utilizing grip assisters 344 and 346 to thereafter automatically open packaging article 334. A robot, or another device that grips and tears the package open, or hanging the packaged product on hooks on diverging tracks, could be used to automatically open package 334.

Resins Utilized in the Examples

Unless otherwise indicated, the following listing of resins identifies the various resins utilized in Examples 1-35 below.

| Resin code | Tradename | Generic Resin Name {additional information} | Density (g/cc) | Melt Index (dg/min) | Supplier |
|---|---|---|---|---|---|
| ION 1 | Surlyn ® 1702-1 | Zinc neutralized ethylene methacrylic acid copolymer | 0.940 | 14 | DuPont |
| ION 2 | Surlyn ® 1650 SB | Zinc neutralized ethylene methacrylic acid copolymer + slip additive | 0.950 | 1.55 | DuPont |
| SSPE 1 | Affinity ® 1280G | Homogeneous ethylene/alpha-olefin copolymer | 0.900 | 6.0 | Dow |

| Resin code | Tradename | Generic Resin Name {additional information} | Density (g/cc) | Melt Index (dg/min) | Supplier |
|---|---|---|---|---|---|
| SSPE 2 | Affinity ® PL 1281G1 | Homogeneous ethylene/octene copolymer | 0.900 g/cc | 6.0 | Dow |
| SSPE3 | Affinity ® PL 1850G | Homogeneous ethylene/octene copolymer | 0.902 | 3.0 | Dow |
| SSPE4 | Affinity ® PF 1140G | Homogeneous ethylene/octene copolymer | 0.8965 g/cc | 1.6 | Dow |
| SSPE5 | DPF 1150.03 | Homogeneous Ethylene/octene copolymer | 0.901 | 0.9 | Dow |
| SSPE6 | Exceed ® 4518 PA | Homogeneous Ethylene/hexene copolymer | 0.918 | 4.5 | Exxon Mobil |
| VLDPE 1 | XUS 61520.15L | Very low density polyethylene | 0.903 | 0.5 | Dow |
| VLDPE 2 | Attane ® 4203 | Very low density polyethylene | 0.905 | 0.80 | Dow |
| VLDPE 3 | Rexell ® V3401 | Very low density polyethylene | 0.915 | 6.6 | Huntsman |
| VLDPE 4 | ECD 364 | VLDPE (ethylene/hexene copolymer) | 0.912 | 1.0 | ExxonMobil |
| LLDPE 1 | Dowlex ® 2045.03 | Linear Low Density Polyethylene | 0.920 | 1.0 | Dow |
| LLDPE 2 | LL 3003.32 | Heterogeneous Ethylene/hexene copolymer | 0.9175 | 3.2 | Exxon Mobil |
| Ion&Eva&Pb | Appel 72D799 | Blend of ionomer, EVA, and polybutylene | 0.932 | 3.7 | DuPont |
| EVA&PP | Versify XUR-YM 2006268985 | Blend of EVA and Polypropylene | 0.89 | 3.0 | Dow |
| RECLAIM | TO35B | Recycled multilayer film containing wide variety of polymers, including ionomer resin, ethylene homo- and co-polymers, propylene homo- and co-polymers, EVOH, polyamide, anhydride modified polymers, ionomer, antiblock, etc. | — | — | Sealed Air Corp |
| PP1 | Inspire 112 | Propylene homopolymer | 0.9 | 0.4 | Dow |
| PP2 | Basell Pro-Fax PH835 | Propylene homopolymer | 0.902 | 34 | Basell Polyolefins |
| PP3 | PP3155 | Propylene homopolymer | 0.900 | 36 | Exxon Mobil |
| PP4 | Escorene ® PP3445 | Propylene homopolymer | 0.900 | 36.0 | Exxon Mobil |
| PB | PB8640M | Butene homopolymer | 0.908 | 1 | Basell Polyolefins |
| ssPP | Eltex ® P KS 409 | Propylene/ethylene copolymer | 0.900 | 5.5 | Ineos |
| znPP | Escorene ® PP9012E1 | Propylene/ethylene copolymer | 0.902 | 6.00 | Ineos |
| Et-Pr TER | Vistalon 7800 | Ethylene-propylene diene terpolymer | 0.870 | 1.5 | Exxon Mobil |
| MA-LLD 1 | Tymor ® 1228B | Maleic anhydride modified polyethylene {blended with linear low density polyethylene} | 0.921 | 2.0 | Rohm & Haas |
| MA-LLD 2 | PX 3227 | Maleic anhydride modified polyethylene {blended with linear low density polyethylene} | 0.913 | 1.7 | Equistar Division of Lyondell |
| MA-LLD 3 | PX3236 | Maleic anhydride modified polyethylene {blended with linear low density polyethylene} | 0.922 | 2.00 | Equistar Division of Lyondell |
| MA-EVA | Bynel ® 3101 | Acid/Acrylate Anhydride-Modified Ethylene/Vinyl Acetate Copolymer | 0.943 | 3.2 | DuPont |

-continued

| Resin code | Tradename | Generic Resin Name {additional information} | Density (g/cc) | Melt Index (dg/min) | Supplier |
|---|---|---|---|---|---|
| modPP | Admer® QB510A | Maleic anhydride modified polypropylene | 0.900 | 3.2 | Mitsui |
| modEVA | SPS-33C-3 | Compounded modified EVA polymer blend | 0.92 | 1.6 | MSI Technology |
| Et-Norb 1 | Topas® 9506X1 | Ethylene norbornene copolymer | 0.974 | 1.0 | Topas Advanced Polymers Inc. |
| ET-Norb2 | Topas® 8007 F-04 | Ethylene norbornene copolymer | 1.02 | 1.7 | Topas Advanced Polymers Inc. |
| Nylon 1 | Ultramid® B40 | Polyamide 6 | 1.13 | — | BASF |
| Nylon 2 | Ultramid® B40LN01 | Polyamide 6 | 1.14 | — | BASF |
| Nylon 3 | Ultramid® C33 01 | Polyamide 6/66 | 1.13 | — | BASF |
| EVA 1 | Escorene® LD 713.93 | Ethylene/vinyl acetate copolymer (14.4% VA) | 0.933 | 3.5 | Exxon Mobil |
| EVA 2 | Escorene LD 318.92 | Ethylene/vinyl acetate copolymer (8.7% VA) | 0.93 | 2.0 | Exxon Mobil |
| EVA 3 | Escorene® LD 761.36 | Ethylene/vinyl acetate copolymer (26.7% VA) | 0.950 | 5.75 | Exxon Mobil |
| EVA 4 | Escorene® LD 705.MJ | Ethylene/vinyl acetate copolymer (12.8% VA) | 0.935 | 0.4 | Exxon Mobil |
| EVA 5 | Escorene® LD 721.IK | Ethylene/vinyl acetate copolymer (18.5% VA) | 0.942 | 2.55 | Exxon Mobil |
| EVA 6 | Elvax® 3175 | Ethylene/vinyl acetate copolymer (28% VA) | 0.950 | 6 | DuPont |
| EBA | SP 1802 | Ethylene/butyl acrylate copolymer (22.5% BA) | 0.928 | 6 | Eastman Chemical |
| EVOH | Soarnol® ET3803 | Hydrolyzed ethylene vinyl acetate copolymer (EVOH with 38 mol % ethylene) | 1.17 | 3.2 | Nippon Gohsei |
| PVdC | Saran® 806 | Vinylidene chloride/methyl acrylate copolymer | 1.69 | — | Dow |
| Sty-But | Styrolux 656C | Styrene/butadiene copolymer | 1.02 | 99 | BASF |
| AOX | 10555 | Antioxidant in linear low density polyethylene | 0.932 | 2.5 | |
| SLIP 1 | FSU 93E | Slip and antiblock in low density polyethylene | 0.975 | 7.5 | Schulman |
| SLIP 2 | 1062 Ingenia | Slip masterbatch amide wax (erucamide) in linear low density polyethylene | 0.92 | 2 | Ingenia Polymers |
| WCC | 11853 | White color concentrate in linear low density polyethylene | 1.513 | 2.90 | Ampacet |
| CCC | 130374 | Cream color concentrate in low density polyethylene | — | — | Ampacet |
| ABConc | 18042 antiblock concentrate | Optical brightener in linear low density polyethylene | 0.92 | — | Teknor Color |
| procAID1 | 100458 | Processing aid: fluoropolymer in polyethylene | 0.93 | 2.3 | Ampacet |
| procAID2 | IP 1121 | Processing aid: fluoropolymer in linear low density polyethylene | 0.92 | 2 | Ampacet |

Example 1

Working

An end-seal bag approximately 7 to 8 inches wide (lay-flat) and approximately 16 inches long was made from a coextruded, multilayer, heat-shrinkable film produced utilizing the apparatus and process set forth in FIG. 5, described above. The multilayer film had a total of 7 layers, in the following order, with the thickness of each layer of the film shown in mils in the bottom row of each column representing a layer of the multilayer structure. The composition of each layer is provided in the second row, with each code corresponding with the composition in the resin table set forth above.

Example 1

| Layer 1 | Layer 2 | Layer 3 | Layer 4 | Layer 5 | Layer 6 | Layer 7 |
|---------|---------|---------|---------|---------|---------|---------|
| 80% SSPE1 20% LLDPE2 0.42 mil | 70% VLDPE2 30% EVA1 0.76 mil | 100% EVA1 0.08 mil | PVDC 0.18 mil | 100% EVA3 0.13 mil | 70% VLDPE1 30% EVA1 0.25 mil | 85% SSPE3 15% LLDPE1 0.13 mils |

Both lay-flat sides of the skirt below the end-seal were manually slit (using scissors) about one to two inches from a side edge of the bag, the slit being in the machine direction, the slit extending from the bottom edge of the bag and across about 30 to 50 percent of the 1½ inch wide bag skirt, to produce first and second coincident tear initiators. The bag was then used to package a simulated product, after which it was tested for linear tearing in the machine direction after shrinking by immersion in 185° F. water. The simulated product was a simulated meat product, i.e., simulated by a sealed bag of water, the bag of water containing about 1300 milliliters of water in a heat-shrinkable bag having a lay-flat width of about 5½ inches and a length of about 9 inches, this bag having been sealed closed with the water therein (and minimal air) and thereafter immersed in water at 195° F. and shrunk tightly around the water to result in a simulated product having a substantially round cross sectional area. The bag of water was placed into the heat-shrinkable end-seal bag being tested, with the bag and simulated product then being placed into a vacuum chamber, and the atmosphere evacuated. The bag was then sealed closed and the resulting packaged product removed from the vacuum chamber and immersed in 185° F. water for about 5 seconds, during which the bag shrunk tightly around the simulated product. After removal from the hot water, the bag was allowed to stand for a period of at least 5 minutes, and thereafter a manual tear was made by grasping the shrunken skirt portion of the article on either side of the tear initiators. The manual machine direction tear test results are set forth in the table below, following the examples.

Example 2

Working

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above. The end-seal bag was tear-tested as set forth in Example 1.

Example 2

| Layer 1 | Layer 2 | Layer 3 | Layer 4 | Layer 5 | Layer 6 | Layer 7 |
|---------|---------|---------|---------|---------|---------|---------|
| 80% SSPE2 20% LLDPE2 0.43 mil | 70% VLDPE1 30% EVA1 0.78 mil | 100% EVA1 0.09 mil | PVDC 0.18 mil | 100% EVA3 0.09 mil | 70% VLDPE1 30% EVA1 0.26 mil | 80% SSPE3 20% LLDPE1 0.17 mils |

Example 3

Comparative

An end-seal bag was made from a coextruded, multilayer, heat-shrinkable film produced utilizing the apparatus and process set forth in FIG. 5, described above. The multilayer film had a total of 4 layers, with the order, thickness, and composition being set forth in the table below in a manner corresponding with the description in Example 1, above. The end-seal bag was tear-tested as set forth in Example 1.

Example 3

Comparative

| Layer 1 | Layer 2 | Layer 3 | Layer 4 |
|---------|---------|---------|---------|
| 100% VLDPE3 0.26 mil | 100% EVA2 1.26 mils | 100% PVDC 0.18 mil | 100% EVA 2 0.6 mil |

Example 4

Comparative

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above. The end-seal bag was tear-tested as set forth in Example 1.

Example 4

Comparative

| Layer 1 | Layer 2 | Layer 3 | Layer 4 | Layer 5 | Layer 6 | Layer 7 |
|---------|---------|---------|---------|---------|---------|---------|
| 90% SSPE1 | 80% VLDPE2 | | | | 99% VLDPE2 | 85% SSPE3 |

-continued

| Layer 1 | Layer 2 | Layer 3 | Layer 4 | Layer 5 | Layer 6 | Layer 7 |
|---|---|---|---|---|---|---|
| 10% SLIP1 0.44 mil | 20% LLDPE1 0.71 mil | 100% EVA1 0.09 mil | PVDC 0.18 mil | 100% EVA3 0.09 mil | 1% AOX 0.27 mil | 15% LLDPE1 0.18 mils |

Example 5

Comparative

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above. The end-seal bag was tear-tested as set forth in Example 1.

Example 5

Comparative

| Layer 1 | Layer 2 | Layer 3 | Layer 4 | Layer 5 | Layer 6 | Layer 7 |
|---|---|---|---|---|---|---|
| 80% SSPE2 20% LLDPE2 0.46 mil | 80% VLDPE1 20% VLDPE4 1.11 mil | 100% EVA1 0.09 mil | PVDC 0.18 mil | 100% EVA3 0.09 mil | 80% VLDPE1 20% VLDPE4 0.28 mil | 80% SSPE3 20% LLDPE1 0.18 mils |

Example 6

Comparative

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above. The end-seal bag was tear-tested as set forth in Example 1.

Example 6

Comparative

| Layer 1 | Layer 2 | Layer 3 | Layer 4 | Layer 5 | Layer 6 | Layer 7 |
|---|---|---|---|---|---|---|
| 90% SSPE1 10% SLIP2 0.49 mil | 90% SSPE5 10% Et-PrTER 0.89 mil | 100% EVA1 0.1 mil | PVDC 0.19 mil | 100% EVA3 0.1 mil | 80% SSPE5 20% VLDPE1 0.26 mil | 100% SSPE3 0.18 mils |

Example 7

Comparative

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above. The end-seal bag was tear-tested as set forth in Example 1.

Example 7

Comparative

| Layer 1 | Layer 2 | Layer 3 | Layer 4 | Layer 5 | Layer 6 | Layer 7 |
|---|---|---|---|---|---|---|
| 100% ION 1 0.32 mil | 100% EVA1 0.87 mil | 100% EVA1 0.16 mil | PVDC 0.18 mil | 100% EVA3 0.08 mil | 100% SSPE4 0.21 mil | 85% SSPE3 15% LLDPE1 0.12 mils |

Example 8

An end-seal bag was made from a coextruded, multilayer, heat-shrinkable film produced utilizing the apparatus and process set forth in FIG. 5, described above. The multilayer film had a total of 4 layers, with the order, thickness, and composition being set forth in the table below in a manner corresponding with the description in Example 1, above.

Example 8

| Layer 1 | Layer 2 | Layer 3 | Layer 4 |
|---|---|---|---|
| 100% SSPE6 0.25 mil | 84% LLDPE1 16% CCC 1.09 mil | 85% EVA2 15% LLDPE1 0.76 mil | 85% EVA2 15% LLDPE1 0.25 mil |

Example 9

An end-seal bag was made from a coextruded, multilayer, heat-shrinkable film produced utilizing the apparatus and process set forth in FIG. 5, described above. The multilayer film had a total of 6 layers, with the order, thickness, and composition being set forth in the table below in a manner corresponding with the description in Example 1, above.

Example 9

| Layer 1 | Layer 2 | Layer 3 | Layer 4 | Layer 5 | Layer 6 |
|---|---|---|---|---|---|
| | | | | | 85% EVA2 |

-continued

| Layer 1 | Layer 2 | Layer 3 | Layer 4 | Layer 5 | Layer 6 |
| --- | --- | --- | --- | --- | --- |
| 100% SSPE6 0.31 mil | 100% VLDPE2 0.8 mil | 100% EVA2 0.09 mil | 100% EVA2 0.13 mil | 100% VLDPE2 0.4 mil | 15% LLDPE1 0.27 mils |

Example 10

An end-seal bag was made from a coextruded, multilayer, heat-shrinkable film produced utilizing the apparatus and process set forth in FIG. 5, described above. The multilayer film had a total of 3 layers, with the order, thickness, and composition being set forth in the table below in a manner corresponding with the description in Example 1, above.

Example 10

| Layer 1 | Layer 2 | Layer 3 |
| --- | --- | --- |
| 80% SSPE1 20% LLDPE2 0.08 mil | 100% EBA 1.84 mil | 85% SSPE3 15% LLDPE1 0.08 mil |

Example 11

Working

An end-seal bag was made from a coextruded, multilayer, heat-shrinkable film produced utilizing the apparatus and process set forth in FIG. 5, described above. The multilayer film had a total of 3 layers, with the order, thickness, and composition being set forth in the table below in a manner corresponding with the description in Example 1, above. The end-seal bag was tear-tested as set forth in Example 1.

Example 11

Working

| Layer 1 | Layer 2 | Layer 3 |
| --- | --- | --- |
| 100% EVA 6 0.68 mil | 75% VLDPE2 25% LLDPE1 3.08 mil | 75% VLDPE2 16.5% LLDPE1 8.5% ABConc 1.24 mil |

Example 12

Working

An end-seal bag marketed commercially by Curwood, Inc., under the name "Protite™ 34" was obtained from the marketplace. Analysis of the bag from which the multilayer film was made revealed the following layers, with the order, thickness, and composition being set forth in the table below. A small cut was made into the bag skirt, i.e., as illustrated in FIG. 4A. The end-seal bag was tear-tested as set forth in Example 1.

Example 12

Working

| Layer 1 | Layer 2 | Layer 3 |
| --- | --- | --- |
| Blend of EVA (3% vinyl acetate), LLDPE, and metallocene-catalyzed ethylene/alpha-olefin copolymer 1.53 mil | Polyvinylidene chloride 0.21 mil | Blend of EVA (3% vinyl acetate), LLDPE, and metallocene-catalyzed ethylene/alpha-olefin copolymer 0.74 mil |

Example 13

Comparative

An end-seal bag marketed commercially by Curwood, Inc., under the name "Cleartite™ 52" was obtained from the marketplace. Analysis of the bag from which the multilayer film was made revealed the following layers, with the order, thickness, and composition being set forth in the table below. A small cut was made into the bag skirt, i.e., as illustrated in FIG. 4A. The end-seal bag was tear-tested as set forth in Example 1.

Example 13

Comparative

| Layer 1 | Layer 2 | Layer 3 |
| --- | --- | --- |
| Blend of EVA (4% vinyl acetate), LLDPE, and metallocene-catalyzed ethylene/alpha-olefin copolymer 1.39 mil | Polyvinylidene chloride 0.23 mil | Blend of EVA (4% vinyl acetate), LLDPE, and metallocene-catalyzed ethylene/alpha-olefin copolymer 0.68 mil |

Example 14

Comparative

An end-seal bag marketed commercially by Curwood, Inc., under the name "Perflex™ 64" was obtained from the marketplace. Analysis of the bag from which the multilayer film was made revealed the following layers, with the order, thickness, and composition being set forth in the table below. A small cut was made into the bag skirt, i.e., as illustrated in FIG. 4A. The end-seal bag was tear-tested as set forth in Example 1.

Example 14

Comparative

| Layer 1 | Layer 2 | Layer 3 |
|---|---|---|
| Blend of EVA (4% vinyl acetate), LLDPE, and metallocene-catalyzed ethylene/alpha-olefin copolymer 1.54 mil | Polyvinylidene chloride 0.19 mil | Blend of EVA (4% vinyl acetate), LLDPE, and metallocene-catalyzed ethylene/alpha-olefin copolymer 0.63 mil |

Example 15

Comparative

An end-seal bag marketed commercially by Asahi Corporation, under the name "SN3" was obtained from the marketplace. Analysis of the bag from which the multilayer film was made revealed the following layers, with the order, thickness, and composition being set forth in the table below. A small cut was made into the bag skirt, i.e., as illustrated in FIG. 4A. The end-seal bag was tear-tested as set forth in Example 1.

Example 15

Comparative

| Layer 1 | Layer 2 | Layer 3 | Layer 4 | Layer 5 |
|---|---|---|---|---|
| Polyethylene blend 0.39 mil | Ethylene/vinyl acetate copolymer, containing (15 wt % vinyl acetate mer) 0.7 | Polyvinylidene chloride 0.35 mil | Ethylene/vinyl acetate copolymer, containing (15 wt % vinyl acetate mer) 0.66 | Low Density Polyethylene (possibly a blend) 0.63 mil |

Example 16

Working

An end-seal bag marketed commercially by Pechiney Plastic Packaging, Inc., under the name "Clearshield™" was obtained from the marketplace. Analysis of the bag from which the multilayer film was made revealed the following layers, with the order, thickness, and composition being set forth in the table below. A small cut was made into the bag skirt, i.e., as illustrated in FIG. 4A. The end-seal bag was tear-tested as set forth in Example 1.

Example 16

Working

| Layer 1 | Layer 2 | Layer 3 | Layer 4 | Layer 5 | Layer 6 | Layer 7 |
|---|---|---|---|---|---|---|
| Metallocene-catalyzed ethylene/alpha-olefin copolymer (possibly with LDPE or LLDPE) 1.58 mil | 100% Ethylene/ methyl acrylate copolymer 0.22 mil | Blend of polyamide 6 with polyamide 6I, 6T 0.9 mil | EVOH (27 mol % ethylene) 0.21 mil | Blend of polyamide 6 with polyamide 6I, 6T 0.85 mil | 100% Ethylene/ methyl acrylate copolymer 0.16 mil | Blend of low density polyethylene and linear low density polyethylene 0.57 mil |

Example 17

Working

An end-seal bag was made from a coextruded, multilayer, heat-shrinkable film produced utilizing the apparatus and process set forth in FIG. 5, described above. The multilayer film had a total of 7 layers, with the order, thickness, and composition being set forth in the table below in a manner corresponding with the description in Example 1, above. The end-seal bag was tear-tested as set forth in Example 1.

Example 17

Working

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 100% Ion&Eva&PB 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mils$^t$ | 80% SSPE3 20% LLDPE1 1.5$^t$ |

$^t$thickness in table represents thickness of extrudate before solid state orientation at trapped bubble stage of process An end-seal bag was made from the coextruded, multi-layer, heat-shrinkable films of each of Examples 18 through 35, below, using the apparatus and process set forth in FIG. 5, described above. Each of the multilayer films had a total of 7 layers, with the order, thickness, and composition being set forth in the tables below in a manner corresponding with the description in Example 1, above. The end-seal bags were tear-tested as set forth in Example 1.

Example 18

Working

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 100% EVA&PP 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mils$^t$ | 80% SSPE3 20% LLDPE1 1.5$^t$ |

$^t$thickness in table represents thickness of extrudate before solid state orientation at trapped bubble stage of process

Example 19

Working

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 75% EVA2 25% modEVA 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mils$^t$ | 80% SSPE3 20% LLDPE1 1.5$^t$ |

$^t$thickness in table represents thickness of extrudate before solid state orientation at trapped bubble stage of process

Example 20

Working

| Layer 1 | Layer 2 | Layer 3 | Layer 4 | Layer 5 | Layer 6 | Layer 7 |
|---|---|---|---|---|---|---|
| 90% SSPE1 10% SLIP2 3.0 mil$^t$ | 100% Et-Norb2 3.7 mil$^t$ | 50% EVA4 50% LLDPE1 11.4 mil$^t$ | 100% PVdC 2.2 mil$^t$ | 100% EVA3 1 mil$^t$ | 80% VLDPE1 20% VLDPE4 1.5 mil$^t$ | 80% SSPE3 20% LLDPE1 1.5$^t$ |

$^t$thickness in table represents thickness of extrudate before solid state orientation at trapped bubble stage of process

Example 21

Working

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% Et-Norb1 | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 22

Comparative

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% Sty-But | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 23

Working

| Layer 1 | Layer 2 | Layer 3 | Layer 4 | Layer 5 | Layer 6 | Layer 7 |
|---|---|---|---|---|---|---|
| 90% SSPE1 10% SLIP2 | 100% PP1 | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 24

Working

| Layer 1 | Layer 2 | Layer 3 | Layer 4 | Layer 5 | Layer 6 | Layer 7 |
|---|---|---|---|---|---|---|
| 90% SSPE1 10% SLIP2 | 70% Sty-But 30% EVA5 | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 25

Working

| Layer 1 | Layer 2 | Layer 3 | Layer 4 | Layer 5 | Layer 6 | Layer 7 |
|---|---|---|---|---|---|---|
| 90% SSPE1 10% SLIP2 | 70% Sty-But 30% EVA2 | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 26

Working

| Layer 1 | Layer 2 | Layer 3 | Layer 4 | Layer 5 | Layer 6 | Layer 7 |
|---|---|---|---|---|---|---|
| 90% SSPE1 10% SLIP2 | 70% VLDPE2 30% ET-Norb2 | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 27

Working

| Layer 1 | Layer 2 | Layer 3 | Layer 4 | Layer 5 | Layer 6 | Layer 7 |
|---|---|---|---|---|---|---|
| 90% SSPE1 | 70% ssPP | 50% EVA4 | 100% PVdC | 100% EVA3 | 80% VLDPE1 | 80% SSPE3 |
| 10% SLIP2 | 30% SSPE3 | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 28

Working

| Layer 1 | Layer 2 | Layer 3 | Layer 4 | Layer 5 | Layer 6 | Layer 7 |
|---|---|---|---|---|---|---|
| 90% SSPE1 | 70% ssPP | 50% EVA4 | 100% PVdC | 100% EVA3 | 80% VLDPE1 | 80% SSPE3 |
| 10% SLIP2 | 30% EVA2 | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 29

Working

| Layer 1 | Layer 2 | Layer 3 | Layer 4 | Layer 5 | Layer 6 | Layer 7 |
|---|---|---|---|---|---|---|
| 90% SSPE1 | 80% SSPE3 | 50% EVA4 | 100% PVdC | 100% EVA3 | 80% VLDPE1 | 80% SSPE3 |
| 10% SLIP2 | 20% WCC | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 30

Working

| Layer 1 | Layer 2 | Layer 3 | Layer 4 | Layer 5 | Layer 6 | Layer 7 |
|---|---|---|---|---|---|---|
| 90% SSPE1 | 100% ION 2 | 50% EVA4 | 100% PVdC | 100% EVA3 | 80% VLDPE1 | 80% SSPE3 |
| 10% SLIP2 | | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 31

Working

| Layer 1 | Layer 2 | Layer 3 | Layer 4 | Layer 5 | Layer 6 | Layer 7 |
|---|---|---|---|---|---|---|
| 90% SSPE1 | 100% EVA6 | 50% EVA4 | 100% PVdC | 100% EVA3 | 80% VLDPE1 | 80% SSPE3 |
| 10% SLIP2 | | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 32

Working

| Layer 1 | Layer 2 | Layer 3 | Layer 4 | Layer 5 | Layer 6 | Layer 7 |
|---|---|---|---|---|---|---|
| 90% SSPE1 | 100% PB | 50% EVA4 | 100% PVdC | 100% EVA3 | 80% VLDPE1 | 80% SSPE3 |
| 10% SLIP2 | | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 33

Working

| Layer 1 | Layer 2 | Layer 3 | Layer 4 | Layer 5 | Layer 6 | Layer 7 |
|---|---|---|---|---|---|---|
| 90% SSPE1 | 85% SSPE1 | 50% EVA4 | 100% PVdC | 100% EVA3 | 80% VLDPE1 | 80% SSPE3 |
| 10% SLIP2 | 15% RECLAIM | 50% LLDPE1 | | | 20% VLDPE4 | 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 34

Working

| Layer 1 | Layer 2 | Layer 3 | Layer 4 | Layer 5 | Layer 6 | Layer 7 |
|---|---|---|---|---|---|---|
| 90% SSPE1 10% SLIP2 | 70% SSPE1 30% RECLAIM | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process

Example 35

| Layer 1 | Layer 2 | Layer 3 | Layer 4 | Layer 5 | Layer 6 | Layer 7 |
|---|---|---|---|---|---|---|
| 90% SSPE1 10% SLIP2 | 55% SSPE1 45% RECLAIM | 50% EVA4 50% LLDPE1 | 100% PVdC | 100% EVA3 | 80% VLDPE1 20% VLDPE4 | 80% SSPE3 20% LLDPE1 |
| 3.0 mil$^t$ | 3.7 mil$^t$ | 11.4 mil$^t$ | 2.2 mil$^t$ | 1 mil$^t$ | 1.5 mils$^t$ | 1.5$^t$ |

$^t$thickness in table represents thickness of extrudate before solid state orientation at trapped bubble stage of process A seamless film tubing of each of the films of Examples 1-35 is cut and sealed to form an end-seal bag. A small cut was made in the bag skirt, about 1 to 2 inches from the folded bag side edge. The bag skirt had a width of about 1.5 inches. A product was placed in the bag, and the bag was sealed closed and shrunk around the product. The resulting end-seal bags exhibit the following characteristics.

| Bag of Example No. | Total Film Gauge (mils) | Free Shrink at 185° F. (% MD/ % TD) | Straight, Full Length Manual MD Tear after shrinking in water at 185° F. | LD Tear Propagation Max Load (gmf, i.e., grams force) | LD Tear Propagation Energy to Break (gmf-in) | LD Tear Resistance Max Load (gmf) | Peak Load Impact Strength per mil, via ASTM D 3763-95A (N/mil) |
|---|---|---|---|---|---|---|---|
| 1 | 2.0 | 32/45 | Yes (94.4%)*** | 31 | — | 545 | 98 |
| 2 | 2.0 | 35/51 | Yes (90.5%)*** | 23 | 31 | 598 | 114* |
| 3 | 2.3 | — | No (5%)*** | 22 | 36 | 673 | 54.9* |
| 4 | 1.96 | — | No (0%)*** | 31 | 39 | 566 | 102.6* |
| 5 | 2.4 | — | No (0%)*** | 54 | 58 | 791 | 100* 114.3* 137.2* |
| 6 | 2.2 | — | No (0%)*** | 61 | 68 | 625 | 138.7* 104.5* |
| 7 | 1.9 | — | No (0%)*** | 28 | 34 | 659 | 102* |
| 8 | 2.35 | 17/28 | — | 24.8 | — | — | 113* |
| 9 | 2.0 | 26/42 | — | — | — | — | 110* |
| 10 | 2.0 | — | — | — | — | — | — |
| 11 | 5.0 | — | Yes (unk) | 50 | 86 | 1470 | 105* |
| 12 | 2.18 | 32/40 | Yes (unk) | 20 | 38 | 840 | 116.3 |
| 13 | 2.03 | 35/39 | No (unk) | 22 | 35 | 732 | 73.9 |
| 14 | 2.18 | 22/30* | No (unk) | 23 | 44 | 732 | — |
| 15 | 2.47 | 50/50 | No (unk) | 279 | 330 | 685 | 71.9 |

-continued

| Bag of Example No. | Total Film Gauge (mils) | Free Shrink at 185° F. (% MD/% TD) | Straight, Full Length Manual MD Tear after shrinking in water at 185° F. | LD Tear Propagation Max Load (gmf, i.e., grams force) | LD Tear Propagation Energy to Break (gmf-in) | LD Tear Resistance Max Load (gmf) | Peak Load Impact Strength per mil, via ASTM D 3763-95A (N/mil) |
|---|---|---|---|---|---|---|---|
| 16 | 4.6 | — | Yes (unk) | 284 | 440 | 3110 | 155.0 |
| 17 | 2.42 | 24/36 | Yes (100%)** | 35 | — | 747 | — |
| 18 | 2.48 | 19/36 | Yes (100%)** | 205 | — | 797 | — |
| 19 | 2.48 | 20/35 | Yes (100%)** | 23 | — | 817 | — |
| 20 | — | — | Yes (unk) | — | — | — | — |
| 21 | 2.56 | 23/33 | Yes (100%)** | 21 | 30 | 676 | — |
| 22 | 2.53 | 24/36 | Yes (100%)** | 40 | — | 726 | — |
| 23 | 2.53 | 20/33 | Yes (100%)** | 21 | 29 | 724 | — |
| 24 | 2.5 | 23/34 | Yes (100%)** | 32 | 47 | 848 | — |
| 25 | 2.5 | 22/34 | Yes (100%)** | 22 | 35 | 707 | — |
| 26 | 2.51 | 24/32 | Yes (100%)** | 20 | 27 | 723 | — |
| 27 | 2.39 | 18/32 | Yes (100%)** | 13 | 23 | 843 | — |
| 28 | 2.36 | 15/34 | Yes (100%)** | 21 | — | 820 | — |
| 29 | 2.39 | 17/34 | Yes (100%)** | 17 | 30 | 643 | — |
| 30 | 2.29 | — | Yes (100%)** | 71.0 | 81 | 551 | — |
| 31 | 2.31 | — | Yes (100%)** | 15.3 | — | 557 | — |
| 32 | 2.18 | — | Yes (100%)** | 113.0 | 140 | 693 | — |
| 33 | 2.55 | — | Yes (100%)** | 55.0 | 50 | 427 | — |
| 34 | 2.41 | — | Yes (100%)** | 57.3 | 55 | 477 | — |
| 35 | 2.45 | — | Yes (100%)** | 40.2 | 46 | 638 | — |

*impact strength tested on different sample of film with same designation
**test results based on tearing 5 samples
***test results based on tearing 20 samples The various preferred features in preferred embodiments of the invention as set forth above are useful in combination with one another. Any of the various preferred film compositions (e.g., blend of ethylene/hexene copolymer and ethylene/vinyl acetate copolymer) are preferred in combination with any one or more of the various preferred film properties (e.g., thickness of from 1.5 to 5 mils, peak load impact strength of from 50 to 250 Newtons, etc.) and/or in combination with any one or more preferred types of packaging articles (e.g., end-seal bag, etc).

What is claimed is:

1. A heat-shrinkable packaging article comprising a heat-shrinkable multilayer film having an inside seal layer heat sealed to itself at a heat seal, the article comprising a first side, a second side, and a skirt or header outward of the heat seal, the skirt or header comprising an article edge and a first tear initiator, the first tear initiator being in the first side of the article, the article skirt or header also comprising a second tear initiator, the second tear initiator being in the second side of the article, the article being capable of having a manually-initiated, manually-propagated first tear in the first side of the article, and a manually-initiated and manually-propagated second tear in the second side of the article, the first tear and the second tear each being capable of being propagated in a machine direction from the respective first and second tear initiators, with each tear being propagated in the machine direction through the heat seal and down the length of the article, or across the article, with each tear being capable of being manually propagated in the machine direction through and to an opposite article edge after shrinking the film around a product, so that upon using the multilayer film to make a packaged product by providing the product inside the article with the article being sealed closed around the product so that a package is formed, and thereafter shrinking the film around the product, the resulting package can be manually opened, and the product readily removed from the article, by manually initiating machine-direction tears from the first and second tear initiators, with the tears being manually propagated through the seal and down the length of the article, for a distance up to the full length of the article and to the opposite edge of the article, with the heat-shrinkable multilayer film exhibiting a Peak Load Impact Strength of at least 50 Newtons per mil measured using ASTM D 3763-95A, with at least one layer of the multilayer film containing an incompatible polymer blend of from 80 to 35 weight percent ethylene/alpha-olefin copolymer with from 20 to 65 weight percent ethylene/unsaturated ester copolymer having an unsaturated ester content of from 12 to 30 weight percent based on copolymer weight, the multilayer film containing the blend in an amount of from 20 to 95 weight percent, based on the weight of the multilayer film, and wherein the multilayer film has been biaxially oriented in the solid state and has a total free shrink, as measured by ASTM D 2732, of from 15 percent to 120 percent at 185° F., and wherein the packaging article does not comprise a patch thereon, and wherein the multilayer film has a thickness, before shrinking, of from 1.5 to 10 mils.

2. The heat-shrinkable packaging article according to claim 1, wherein the ethylene/alpha-olefin copolymer comprises at least one member selected from the group consisting of:

(i) ethylene/hexene copolymer having a density of from about 0.90 g/cc to about 0.925 g/cc, and (ii) ethylene/octene copolymer having a density of from about 0.90 g/cc to about 0.925 g/cc.

3. The heat-shrinkable packaging article according to claim 2, wherein the incompatible polymer blend (A) comprises a blend of ethylene/alpha-olefin copolymer and ethylene/vinyl acetate copolymer having a vinyl acetate content of from 12 to 30 weight percent based on copolymer weight, the blend containing the ethylene/alpha-olefin copolymer in an amount of from 75 to 45 weight percent based on blend weight and the ethylene/vinyl acetate copolymer in an amount of from 25 to 55 weight percent based on blend weight, the multilayer film containing the blend in an amount of from 30 to 70 weight percent, based on the weight of the multilayer film, and wherein the multilayer film has been biaxially oriented in the solid state and has a total free shrink, as measured by ASTM D 2732, of from 20 percent to 105 percent at 185° F.

4. The heat-shrinkable packaging article according to claim 2, wherein the incompatible polymer blend (A) comprises a blend of ethylene/alpha-olefin copolymer and ethylene/vinyl acetate copolymer having a vinyl acetate content of from 12 to 30 weight percent, the blend containing the ethylene/alpha-olefin copolymer in an amount of from 70 to 50 percent based on blend weight and the ethylene/vinyl acetate copolymer in an amount of from 30 to 50 weight percent based on blend weight, the multilayer film containing the blend in an amount of from 30 to 70 weight percent, based on the weight of the multilayer film, and wherein the multilayer film has been biaxially oriented in the solid state and has a total free shrink, as measured by ASTM D 2732, of from 40 percent to 100 percent at 185° F.

5. The packaging article according to claim 1, wherein the packaging article is a lay-flat, end-seal bag made from a seamless tubing, the end-seal bag having an open top, first and second folded side edges, and an end seal across a bottom of the bag, with the first and second tear initiators being in the bag skirt that is outward of the end seal, with the first tear being a machine-direction tear of the film, and the second tear being a machine-direction tear of the film, with each tear being capable of being manually propagated down the length of the end-seal bag to the opposite edge of the end-seal bag.

6. The packaging article according to claim 1, wherein the packaging article is a lay-flat, side-seal bag made from a seamless tubing, the side-seal bag having an open top, a folded bottom edge, and first and second side seals with respective first and second bag skirts outward of respective first and second side seals, with the first and second tear initiators being in the first bag skirt and outward of the first side seal, with the first tear being a machine-direction tear and the second tear being a machine-direction tear, with each tear being capable of being manually propagated across the full width of the side-seal bag to the opposite edge of the side-seal bag.

7. The packaging article according to claim 1, wherein the packaging article is a lay-flat, side-seal bag made from a seamless tubing, the side-seal bag having an open top, a folded bottom edge, a first side seal with a first bag skirt outward thereof, a second side seal with a second bag skirt outward thereof, and a third seal that extends from the first side seal to the second side seal, the third seal being at an opposite end of the bag from the open top, the third seal having a third bag skirt outward thereof, the folded bottom edge being in the third bag skirt, the third bag skirt comprising the first and second tear initiators, with the first tear being a transverse-direction tear and the second tear being a transverse-direction tear, with the first and second tears each being capable of being manually propagated down the length of the side-seal bag and to the opposite edge of the side-seal bag.

8. The packaging article according to claim 1, wherein the packaging article is a lay-flat pouch made by heat sealing two flat films to one another, the pouch having an open top, a first side seal with a first bag skirt outward thereof, a second side seal with a second bag skirt outward thereof, a bottom seal with a third bag skirt outward thereof, the bottom seal extending from the first side seal to the second side seal, the bottom seal being at an opposite end of the bag from the open top, with at least one of the bag skirts having first and second tear initiators for tearing each of the two flat films in the machine direction.

9. The packaging article according to claim 1, wherein the heat-shrinkable multilayer film exhibits a Peak Load Impact Strength, determined using ASTM D 3763-95A, of from 50 to 250 Newtons per mil, and the multilayer film has a total thickness, before shrinking, of from 1.5 mils to 5 mils.

10. The packaging article according to claim 1, wherein the first tear initiator is coincident or substantially coincident with the second tear initiator.

11. The packaging article according to claim 10, the article further comprising a third tear initiator and a fourth tear initiator that is coincident or substantially coincident with the third tear initiator, with the first and second tear initiators being positioned in a skirt portion of the article or a header portion of the article for making a machine direction tear of the film, and with the third and fourth tear initiators being positioned in a skirt portion of the article for making a manual tear in a transverse direction of the film.

12. The heat-shrinkable bag according to claim 1, wherein upon making a package by placing a product inside the bag, evacuating the atmosphere from the bag, sealing the bag closed so that a package is formed, and shrinking the film around the product, the resulting package can be manually opened, and the product readily removed from the bag, by manually initiating tears from the first and second tear initiators.

13. The heat-shrinkable packaging article according to claim 1, wherein the packaging article further comprises a grip assister for assisting grip of the multilayer film during manual tearing.

14. A heat-shrinkable packaging article, comprising a heat-shrinkable multilayer film having an inside seal layer heat sealed to itself at a heat seal, the article comprising a first side, a second side, and a skirt or header outward of the heat seal, the skirt or header comprising an article edge and a first tear initiator, the first tear initiator being in the first side of the article, the article skirt or header also comprising a second tear initiator, the second tear initiator being in the second side of the article, the article being capable of having a manually-initiated, manually-propagated first tear in the first side of the article, and a manually-initiated and manually-propagated second tear in the second side of the article, the first tear and the second tear each being capable of being propagated in a machine direction from the respective first and second tear initiators, with each tear being propagated in the machine direction through the heat seal and down the length of the article, or across the article, with each tear being capable of being manually propagated in the machine direction through and to an opposite article edge after shrinking the film around a product, so that upon using the multilayer film to make a packaged product by providing the product inside the article with the article being sealed closed around the product so that a package is formed, and thereafter shrinking the film around the product, the resulting package can be manually opened, and the product readily removed from the article, by manually initiating machine-direction tears from the first and second tear initiators, with the tears being manually propagated through the seal and down the length of the article, for a distance up to the full length of the article and to the opposite edge of the article, with the heat-shrinkable multilayer film exhibiting a Peak Load Impact Strength of at least 50 Newtons per mil measured using ASTM D 3763-95A, with at least one layer of the multilayer film containing at least one incompatible polymer blend selected from the group consisting of:
  (A) a blend of from 80 to 35 weight percent ethylene homopolymer and/or ethylene/alpha-olefin copolymer with from 20 to 65 weight percent ethylene/unsaturated ester copolymer having an unsaturated ester content of at least 10 weight percent
  (B) a blend of ionomer resin with ethylene/unsaturated ester copolymer, and/or polybutylene, and/or propylene homopolymer and/or propylene copolymer;
  (C) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, anhydride-modified ethylene/alpha-olefin copolymer, and/or antiblock;
  (D) a blend of from 10 to 75 weight percent ethylene/unsaturated ester copolymer with from 90 to 15 weight percent polypropylene and/or propylene/ethylene copolymer, and/or polybutylene, and/or modified ethylene/alpha-olefin copolymer, and/or styrene homopolymer, and/or styrene/butadiene copolymer;
  (E) a blend of from 90 to 15 weight percent ethylene/alpha-olefin copolymer with from 10 to 75 weight percent polypropylene and/or polybutylene;
  (F) a blend of from 90 to 25 weight percent homogeneous propylene homopolymer and/or homogeneous propylene copolymer with from 10 to 75 weight percent homogeneous ethylene/alpha-olefin copolymer and/or ethylene/unsaturated ester copolymer;
  (G) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer;
  (H) a blend of polyamide with polystyrene and/or ethylene/alpha-olefin copolymer and/or ethylene/vinyl acetate copolymer and/or styrene/butadiene copolymer; and
  (I) a blend of polyamide 6 and polyamide 6I6T; and
  wherein the packaging article does not comprise a patch thereon, and wherein the multilayer film has a thickness, before shrinking, of from 1.5 to 10 mils, and wherein the packaging article further comprises a grip assister for assisting grip of the multilayer film during manual tearing, and wherein the grip assister comprises a partial hole cut having a hanging chad therein.

15. The heat-shrinkable packaging article according to claim 1, wherein the multilayer film comprises a barrier layer containing at least one member selected from the group consisting of polyvinylidene chloride, saponified ethylene/vinyl acetate copolymer, amorphous polyamide, polyamide MXD6, polyester, and polyacrylonitrile.

16. The heat-shrinkable packaging article according to claim 1, wherein the multilayer film comprises:
  (A) a first layer that is an outer food-contact layer and that also serves as a seal layer, the first layer comprising said incompatible polymer blend;
  (B) a second layer comprising ethylene/methyl acrylate copolymer;
  (C) a third layer comprising a blend of polyamide 6 with polyamide 6I,6T;
  (D) a fourth layer comprising EVOH;
  (E) a fifth layer comprising a blend of polyamide 6 with polyamide 6I,6T;
  (F) a sixth layer comprising ethylene/methyl acrylate copolymer; and
  (G) a seventh layer comprising a blend of low density polyethylene and linear low density polyethylene; and
  wherein the layers are present in the order of first/second/third/fourth/fifth/sixth/seventh.

17. The heat-shrinkable packaging article according to claim 1, wherein the multilayer film comprises:
  (A) a first layer that is an outer food-contact layer and that also serves as a seal layer, the first layer comprising said incompatible polymer blend;
  (B) a second layer comprising polyvinylidene chloride;
  (C) a third layer that comprises said incompatible polymer blend; and
  wherein the layers are present in the order of first/second/third.

18. The heat-shrinkable packaging article according to claim 1, wherein the multilayer film comprises:
  (A) a first layer that is an outer food-contact layer and that also serves as a seal layer, the first layer comprising a blend of homogeneous ethylene/alpha-olefin copolymer and linear low density polyethylene;
  (B) a second layer comprising said incompatible polymer blend;
  (C) a third layer comprising ethylene/vinyl acetate copolymer;
  (D) a fourth layer comprising polyvinylidene chloride;
  (E) a fifth layer comprising ethylene/vinyl acetate copolymer;
  (F) a sixth layer comprising said incompatible polymer blend; and (G) a seventh layer comprising a blend of homogeneous ethylene/alpha-olefin copolymer and linear low density polyethylene; and wherein the layers are present in the order of first/second/third/fourth/fifth/sixth/seventh.

19. The heat-shrinkable packaging article according to claim 1, wherein the heat-shrinkable film is a first heat-shrinkable film that is used to make a heat-shrinkable bag, the article further comprising a heat-shrinkable patch adhered to the bag, the patch being made from a second heat-shrinkable film, the patch covering at least a portion of a first tear line and/or a second tear line, the patch covering at least a portion of the heat seal, with the first and second tear initiators each being present in both the first heat-shrinkable film and the second heat-shrinkable film.

20. The packaging article according to claim 1, wherein the first tear initiator in a first side of the bag, the first tear initiator being positioned adjacent the top edge of the bag in a header region, the bag further comprising a second tear initiator in a second side of the bag, the second tear initiator also being positioned adjacent the top edge of the bag in the header region.

21. A process for making an easy-open packaged product, comprising:
(A) inserting a product into a lay-flat packaging article comprising a heat-shrinkable multilayer film, the packaging article having a first lay-flat side and a second lay-flat side;
(B) sealing the packaging article closed with at least one heat seal, thereby forming a packaged product in which the packaging article surrounds or substantially surrounds the product, with the packaging article having at least one header portion between the at least one heat seal and at least one edge of the package;
(C) making a first tear initiator at a first location of the packaging article that is, or later becomes, a header portion of the first lay-flat side of the packaging article, and a second tear initiator at a second location of the packaging article that is, or later becomes, the header portion of the second lay-flat side of the packaging article; and
(D) heating the heat-shrinkable film to shrink the packaging article around the product; and wherein the heat-shrinkable multilayer film exhibits a Peak Load Impact Strength, determined using ASTM D 3763-95A, of at least 50 Newtons per mil, and the heat-shrinkable, multilayer film is capable of having a manually-initiated, manually-propagated first tear in the first side of the packaging article, and a manually-initiated, manually-propagated second tear in the second side of the packaging article, the first tear and the second tear each being capable of being propagated in a machine direction from the respective first and second tear initiators, with each tear being propagated in the machine direction through the heat seal and across the respective side of the packaging article, or down the length of the respective side of the packaging article, with the first and second tears each being capable of being manually-propagated in the machine direction through and to an opposite edge of the packaging article after heating the heat-shrinkable film to shrink the film around the product, so that the packaging article can be manually opened, and the product removed therefrom, with the multilayer film having at least one layer containing an incompatible polymer blend of from 80 to 35 weight percent ethylene/alpha-olefin copolymer with from 20 to 65 weight percent ethylene/unsaturated ester copolymer having an unsaturated ester content of from 12 to 30 weight percent based on copolymer weight, the multilayer film containing the blend in an amount of from 20 to 95 weight percent, based on the weight of the multilayer film, and wherein the multilayer film has been biaxially oriented in the solid state and has a total free shrink, as measured by ASTM D 2732, of from 15 percent to 120 percent at 185° F., and wherein the packaging article does not comprise a patch thereon, and wherein the multilayer film has a thickness, before shrinking, of from 1.5 to 10 mils.

22. The process according to claim 21, wherein the packaging article is a seamless or backseamed lay-flat tubing, and after the product is inserted into the tubing, a first heat seal is made across the tubing on a first end of the product and a second heat seal is made across the tubing on a second end of the product.

23. The process according to claim 21, wherein the packaging article is a bag or pouch.

24. The process according to claim 21, further comprising evacuating atmosphere from within the packaging article after inserting the product into the packaging article, but before sealing the article closed.

25. The process according to claim 24, wherein the packaging article is an end-seal bag or a side-seal bag.

26. A plurality of heat-shrinkable bags in a continuous strand, each of the bags being connected to an adjacent bag along a weakened tear line, wherein each bag comprises a heat-shrinkable multilayer film having an inside seal layer heat sealed to itself at a heat seal, each bag further comprising a first side, a second side, an open top, and a bag skirt outward of the heat seal, the bag skirt comprising a edge of the packaging article and a first tear initiator, the first tear initiator being in the first side of the bag, the bag skirt also comprising a second tear initiator, the second tear initiator being in the second side of the bag, the bag being capable of having a manually-initiated, manually-propagated first tear in the first side of the bag, and a manually-initiated and manually-propagated second tear in the second side of the bag, the first tear and the second tear each being capable of being propagated from the respective first and second tear initiators, with each tear being propagated through the heat seal and across the bag, or down the length of the bag, with the tear being capable of being manually propagated through and to an opposite edge of the packaging article after shrinking the film around the article, so that upon making a package by placing a product inside the bag, sealing the bag closed so that a package is formed, and shrinking the film around the product, the resulting package can be manually opened, and the product readily removed from the bag, by manually initiating tears from the first and second tear initiators, with the tears being manually propagated through the seal and down the length of the article, for a distance up to the full length of the article, and to the opposite edge of the packaging article, and wherein the heat-shrinkable multilayer film exhibits a Peak Load Impact Strength, determined using ASTM D 3763-95A, of at least 50 Newtons per mil, the multilayer film having at least one layer containing an incompatible polymer blend of from 80 to 35 weight percent ethylene/alpha-olefin copolymer with from 20 to 65 weight percent ethylene/unsaturated ester copolymer having an unsaturated ester content of from 12 to 30 weight percent based on copolymer weight, the multilayer film containing the blend in an amount of from 20 to 95 weight percent, based on the weight of the multilayer film, and wherein the multilayer film has been biaxially oriented in the solid state and has a total free shrink, as measured by ASTM D 2732, of from 15 percent to 120 percent at 185° F., and
wherein the packaging article does not comprise a patch thereon, and the multilayer film has a thickness, before shrinking, of from 1.5 to 10 mils.

27. A heat-shrinkable packaging article comprising a heat-shrinkable multilayer film having an inside seal layer heat sealed to itself at a heat seal, the article comprising a first side, a second side, and a skirt or header outward of the heat seal, the skirt or header comprising an article edge and a first tear initiator, the first tear initiator being in the first side of the article, the article skirt or header also comprising a second tear initiator, the second tear initiator being in the second side of the article, the article being capable of having a manually-initiated, manually-propagated first tear in the first side of the article, and a manually-initiated and manually-propagated second tear in the second side of the article, the first tear and the second tear each being capable of being propagated in a machine direction from the respective first and second tear initiators, with each tear being propagated in the machine direction through the heat seal and down the length of the article, or across the article, with each tear being capable of being manually propagated in the machine direction through and to an opposite article edge after shrinking the film around a product, so that upon using the multilayer film to make a packaged product by providing the product inside the article with the article being sealed closed around the product so that a package is formed, and thereafter shrinking the film around the product, the resulting package can be manually opened, and the product readily removed from the article, by manually initiating machine-direction tears from the first and second tear initiators, with the tears being manually propagated through the seal and down the length of the article, for a distance up to the full length of the article and to the opposite edge of the article, with the heat-shrinkable multilayer film exhibiting a Peak Load Impact Strength of at least 50 Newtons per mil measured using ASTM D 3763-95A, with at least one layer of the multilayer film containing at least one incompatible polymer blend selected from the group consisting of:

(A) a blend of from 80 to 35 weight percent ethylene homopolymer and/or ethylene/alpha-olefin copolymer with from 20 to 65 weight percent ethylene/unsaturated ester copolymer having an unsaturated ester content of at least 10 weight percent;

(B) a blend of ionomer resin with ethylene/unsaturated ester copolymer, and/or polybutylene, and/or propylene homopolymer and/or propylene copolymer;

(C) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, anhydride-modified ethylene/alpha-olefin copolymer, and/or antiblock;

(D) a blend of from 10 to 75 weight percent ethylene/unsaturated ester copolymer with from 90 to 15 weight percent polypropylene and/or propylene/ethylene copolymer, and/or polybutylene, and/or modified ethylene/alpha-olefin copolymer, and/or styrene homopolymer, and/or styrene/butadiene copolymer;

(E) a blend of from 90 to 15 weight percent ethylene/alpha-olefin copolymer with from 10 to 75 weight percent polypropylene and/or polybutylene;

(F) a blend of from 90 to 25 weight percent homogeneous propylene homopolymer and/or homogeneous propylene copolymer with from 10 to 75 weight percent homogeneous ethylene/alpha-olefin copolymer and/or ethylene/unsaturated ester copolymer;

(G) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer;

(H) a blend of polyamide with polystyrene and/or ethylene/alpha-olefin copolymer and/or ethylene/vinyl acetate copolymer and/or styrene/butadiene copolymer; and (I) a blend of polyamide 6 and polyamide 6I6T; and the packaging article further comprising a first pair of grip assisters and a second pair of grip assisters, with each of the pairs of grip assisters being through both sides of the packaging article, with the first pair of grip assisters being on a first side of the first and second tear initiators and the second pair of grip assisters being on a second side of the first and second tear initiators, the first pair of grip assisters comprises a first partial hole cut through the first side of the article, with a first hanging chad therein, and a second partial hole cut through the second side of the article, with a second hanging chad therein, and the second pair of grip assisters comprises a third partial hole cut through the first side of the article, with a third hanging chad therein, and a fourth partial hole cut through the second side of the article, with a fourth hanging chad therein, and wherein the packaging article does not comprise a patch thereon, and wherein the multilayer film has a thickness, before shrinking, of from 1.5 to 10 mils.

* * * * *